US012676662B2

(12) United States Patent
Raghavan et al.

(10) Patent No.: US 12,676,662 B2
(45) Date of Patent: Jul. 7, 2026

(54) BEAM CORRELATION FOR CARRIER AGGREGATION

(71) Applicant: QUALCOMM Incorporated, San Diego, CA (US)

(72) Inventors: Vasanthan Raghavan, West Windsor Township, NJ (US); Tao Luo, San Diego, CA (US); Junyi Li, Franklin Park, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/156,962

(22) Filed: Jan. 25, 2021

(65) Prior Publication Data

US 2021/0234604 A1     Jul. 29, 2021

Related U.S. Application Data

(60) Provisional application No. 62/966,524, filed on Jan. 27, 2020.

(51) Int. Cl.
*H04B 7/08*          (2006.01)
*H04B 7/0456*      (2017.01)
            (Continued)

(52) U.S. Cl.
CPC ......... *H04B 7/0868* (2013.01); *H04B 7/0456* (2013.01); *H04B 7/0617* (2013.01); *H04L 27/2675* (2013.01)

(58) Field of Classification Search
CPC .. H04B 7/0868; H04B 7/0617; H04B 7/0456; H04B 7/088; H04L 27/2675; H04L 5/0023; H04L 5/0098; H04L 5/001
            (Continued)

(56) References Cited

U.S. PATENT DOCUMENTS 6,002,360 A     12/1999  Wolcott et al.
7,787,554 B1    8/2010   Nabar et al.
            (Continued)

FOREIGN PATENT DOCUMENTS

CN          1761182 A      4/2006
CN          201902262 U    7/2011
            (Continued)

OTHER PUBLICATIONS

Huawei, et al., "UL/DL BM for Latency/Overhead Reduction", 3GPP Draft, R1-1903974, 3GPP TSG RAN WG1 #96bis, 3rd Generation Partnership Project (3GPP), Mobile Competence Centre, 650, Route Des Lucioles, F-06921 Sophia-Antipolis Cedex, France, vol. RAN WG1, No. Xi'an, China, Apr. 8, 2019-Apr. 12, 2019, Apr. 7, 2019 (Apr. 7, 2019), XP051699387, 8 Pages, Retrieved from the Internet: URL:http://www.3gpp.org/ftp/Meetings%5F3GPP% 5FSYNC/RAN1/Docs/R1%2D1903974%2Ezip [retrieved on Apr. 7, 2019] the Whole Document.
            (Continued)

*Primary Examiner* — Fitwi Y Hailegiorgis
(74) *Attorney, Agent, or Firm* — Holland & Hart LLP/QUALCOMM Incorporated

(57)          ABSTRACT

Methods, systems, and devices for wireless communications are described, where a wireless communications system may be configured to support an evaluation of beam correlation, such as a correlation of reception directionality, in different component carriers that may be in the same frequency band or in different frequency bands. For example, a first device may simultaneously transmit different reference signals using different component carriers, and a second device may receive the different reference signals. The second device may determine a beam correlation metric, which may include various measures of how well-correlated the receive directions or codebooks are for the different reference sig-
            (Continued)

Transmit, based at least in part on a carrier aggregation configuration associated with a first component carrier and a second component carrier, a first reference signal to a second device over a first beam using the first component carrier during a first time interval ⟍ 1105

Transmit, based at least in part on the carrier aggregation configuration, a second reference signal to the second device over a second beam using the second component carrier during a second time interval that at least partially overlaps with the first time interval ⟍ 1110

Receive a response from the second device that is based at least in part on the first reference signal and the second reference signal ⟍ 1115

Transmitting signaling comprising parameters to enable carrier aggregation at the second device, the parameters associated with the carrier aggregation configuration based at least in part on the response from the second device ⟍ 1120

⟍ 1100 nals of the different bands. Such an evaluation may be used to support various configurations of the first device and the second device related to inter-band or intra-band carrier aggregation.

54 Claims, 14 Drawing Sheets

(51) Int. Cl.
　　*H04B 7/06*　　　　(2006.01)
　　*H04L 27/26*　　　　(2006.01)
(58) Field of Classification Search
　　USPC .......................................................... 375/347
　　See application file for complete search history.

(56)　　　　　　　　References Cited

U.S. PATENT DOCUMENTS

| | | | |
|---|---|---|---|
| 7,826,415 | B2 | 11/2010 | Oh et al. |
| 8,503,322 | B2* | 8/2013 | Krishnamurthy ... H04L 27/2647 |
| | | | 370/252 |
| 8,953,704 | B2 | 2/2015 | Yu et al. |
| 9,312,933 | B2 | 4/2016 | Zhang et al. |
| 9,363,683 | B2 | 6/2016 | Raghavan et al. |
| 9,509,382 | B1 | 11/2016 | Nabar et al. |
| 9,520,973 | B2 | 12/2016 | Kim et al. |
| 9,780,928 | B2 | 10/2017 | Moshfeghi |
| 9,806,777 | B1 | 10/2017 | Doostnejad et al. |
| 9,853,702 | B1 | 12/2017 | Liang et al. |
| 10,004,032 | B2 | 6/2018 | Islam et al. |
| 10,075,223 | B1 | 9/2018 | Pawar et al. |
| 10,425,878 | B2 | 9/2019 | Cezanne et al. |
| 10,425,901 | B2 | 9/2019 | Islam et al. |
| 10,462,796 | B2 | 10/2019 | Frenne et al. |
| 10,559,880 | B1 | 2/2020 | Garrett et al. |
| 10,574,321 | B2 | 2/2020 | Nilsson et al. |
| 10,841,914 | B2 | 11/2020 | Liou et al. |
| 10,879,627 | B1 | 12/2020 | Frigon et al. |
| 10,924,173 | B2 | 2/2021 | Bai et al. |
| 10,986,235 | B2 | 4/2021 | Seo et al. |
| 11,145,331 | B1 | 10/2021 | Nangare et al. |
| 11,438,877 | B2 | 9/2022 | Luo et al. |
| 12,284,059 | B1 | 4/2025 | Nangare et al. |
| 2006/0008275 | A1 | 1/2006 | Lacovara et al. |
| 2006/0039318 | A1 | 2/2006 | Oh et al. |
| 2007/0070927 | A1 | 3/2007 | Shoki et al. |
| 2008/0240208 | A1 | 10/2008 | Lou et al. |
| 2011/0069633 | A1 | 3/2011 | Schmidt et al. |
| 2011/0243040 | A1 | 10/2011 | Khan et al. |
| 2011/0255434 | A1 | 10/2011 | Ylitalo |
| 2011/0261894 | A1 | 10/2011 | Yu et al. |
| 2012/0015603 | A1 | 1/2012 | Proctor, Jr. et al. |
| 2012/0064841 | A1 | 3/2012 | Husted et al. |
| 2012/0140658 | A1 | 6/2012 | Kanzaki et al. |
| 2014/0011468 | A1 | 1/2014 | Park et al. |
| 2014/0206304 | A1 | 7/2014 | Zhang et al. |
| 2014/0219381 | A1 | 8/2014 | Yu et al. |
| 2014/0235287 | A1 | 8/2014 | Maltsev et al. |
| 2014/0241446 | A1 | 8/2014 | Zhang et al. |
| 2014/0294111 | A1 | 10/2014 | Zhang et al. |
| 2014/0363166 | A1 | 12/2014 | Lacovara |
| 2015/0092621 | A1 | 4/2015 | Jalloul et al. |
| 2015/0349863 | A1 | 12/2015 | El Ayach et al. |
| 2016/0020876 | A1 | 1/2016 | Raghavan et al. |
| 2016/0044517 | A1 | 2/2016 | Raghavan et al. |
| 2016/0112173 | A1 | 4/2016 | Wang et al. |
| 2016/0241317 | A1 | 8/2016 | Piazzi et al. |
| 2016/0242182 | A1 | 8/2016 | Chen et al. |
| 2017/0005958 | A1 | 1/2017 | Frenkel et al. |
| 2017/0013630 | A1 | 1/2017 | Franz et al. |
| 2017/0117947 | A1 | 4/2017 | Petersson et al. |
| 2017/0164226 | A1 | 6/2017 | Wei et al. |
| 2017/0194706 | A1 | 7/2017 | Lee et al. |
| 2017/0195998 | A1* | 7/2017 | Zhang ................... H04L 5/0057 |

| | | | |
|---|---|---|---|
| 2017/0294926 | A1 | 10/2017 | Islam et al. |
| 2017/0359826 | A1 | 12/2017 | Islam et al. |
| 2017/0364819 | A1 | 12/2017 | Yang |
| 2018/0062720 | A1 | 3/2018 | Islam et al. |
| 2018/0063693 | A1 | 3/2018 | Chakraborty et al. |
| 2018/0138962 | A1 | 5/2018 | Islam et al. |
| 2018/0183506 | A1 | 6/2018 | Hessler et al. |
| 2018/0227094 | A1 | 8/2018 | Liu et al. |
| 2018/0227772 | A1 | 8/2018 | Yu et al. |
| 2018/0249453 | A1 | 8/2018 | Nagaraja et al. |
| 2018/0249526 | A1 | 8/2018 | Nagaraja et al. |
| 2018/0278309 | A1 | 9/2018 | Raghavan et al. |
| 2018/0278316 | A1 | 9/2018 | Yang et al. |
| 2018/0278320 | A1 | 9/2018 | Chendamarai et al. |
| 2019/0044596 | A1 | 2/2019 | Bolotin et al. |
| 2019/0053220 | A1 | 2/2019 | Zhang et al. |
| 2019/0059056 | A1 | 2/2019 | Islam et al. |
| 2019/0069198 | A1 | 2/2019 | Gheorghiu et al. |
| 2019/0081691 | A1 | 3/2019 | Nagaraja et al. |
| 2019/0081753 | A1 | 3/2019 | Jung et al. |
| 2019/0103908 | A1 | 4/2019 | Yu et al. |
| 2019/0141552 | A1 | 5/2019 | Chen et al. |
| 2019/0150161 | A1 | 5/2019 | Cheng et al. |
| 2019/0174385 | A1 | 6/2019 | Sang et al. |
| 2019/0190582 | A1 | 6/2019 | Guo et al. |
| 2019/0239092 | A1 | 8/2019 | Zhou et al. |
| 2019/0268118 | A1 | 8/2019 | Sadiq et al. |
| 2019/0313389 | A1 | 10/2019 | John Wilson et al. |
| 2019/0349058 | A1 | 11/2019 | Raghavan et al. |
| 2019/0349863 | A1 | 11/2019 | Lim et al. |
| 2019/0393948 | A1 | 12/2019 | Zhao et al. |
| 2020/0015106 | A1 | 1/2020 | Lane et al. |
| 2020/0028545 | A1 | 1/2020 | Koskela et al. |
| 2020/0029274 | A1 | 1/2020 | Cheng et al. |
| 2020/0059280 | A1 | 2/2020 | Thurfjell et al. |
| 2020/0068644 | A1 | 2/2020 | Zhou et al. |
| 2020/0091978 | A1 | 3/2020 | Noh et al. |
| 2020/0136708 | A1 | 4/2020 | Pan et al. |
| 2020/0145079 | A1 | 5/2020 | Marinier et al. |
| 2020/0145929 | A1 | 5/2020 | Ryu et al. |
| 2020/0178134 | A1 | 6/2020 | Yang et al. |
| 2020/0178261 | A1 | 6/2020 | Ioffe et al. |
| 2020/0204336 | A1 | 6/2020 | Petersson et al. |
| 2020/0220603 | A1 | 7/2020 | Hao et al. |
| 2020/0220631 | A1 | 7/2020 | Onggosanusi et al. |
| 2020/0228190 | A1* | 7/2020 | Cirik ........................ H04L 5/10 |
| 2020/0259618 | A1 | 8/2020 | Yang et al. |
| 2020/0259703 | A1 | 8/2020 | Cirik et al. |
| 2020/0260300 | A1 | 8/2020 | Cirik et al. |
| 2020/0314906 | A1 | 10/2020 | Goyal et al. |
| 2020/0351798 | A1 | 11/2020 | Ji et al. |
| 2020/0358509 | A1 | 11/2020 | Wernersson et al. |
| 2020/0366348 | A1 | 11/2020 | Bolotin et al. |
| 2020/0367083 | A1 | 11/2020 | Hao et al. |
| 2020/0374806 | A1 | 11/2020 | Manolakos et al. |
| 2020/0374960 | A1 | 11/2020 | Deenoo et al. |
| 2020/0383060 | A1 | 12/2020 | Park et al. |
| 2020/0388935 | A1 | 12/2020 | Lee et al. |
| 2021/0021325 | A1 | 1/2021 | Davydov et al. |
| 2021/0022094 | A1 | 1/2021 | Luo et al. |
| 2021/0036741 | A1 | 2/2021 | Park et al. |
| 2021/0050898 | A1 | 2/2021 | Yu et al. |
| 2021/0068077 | A1 | 3/2021 | Raghavan et al. |
| 2021/0084672 | A1 | 3/2021 | Gulati et al. |
| 2021/0099958 | A1 | 4/2021 | Bae et al. |
| 2021/0105780 | A1 | 4/2021 | Jin et al. |
| 2021/0105860 | A1 | 4/2021 | Tsai et al. |
| 2021/0111779 | A1 | 4/2021 | Kundargi et al. |
| 2021/0119688 | A1 | 4/2021 | Enescu et al. |
| 2021/0127379 | A1 | 4/2021 | Harrebek et al. |
| 2021/0136598 | A1 | 5/2021 | Raghavan et al. |
| 2021/0144716 | A1 | 5/2021 | Choi et al. |
| 2021/0153085 | A1 | 5/2021 | Rahman et al. |
| 2021/0153209 | A1 | 5/2021 | Guan et al. |
| 2021/0159946 | A1 | 5/2021 | Raghavan et al. |
| 2021/0159966 | A1 | 5/2021 | Xi et al. |
| 2021/0160850 | A1 | 5/2021 | Akkarakaran et al. |
| 2021/0160881 | A1 | 5/2021 | Rahman et al. |
| 2021/0226681 | A1 | 7/2021 | Raghavan et al. |

(56) References Cited

U.S. PATENT DOCUMENTS

| | | |
|---|---|---|
| 2021/0234586 A1 | 7/2021 | Raghavan et al. |
| 2021/0234593 A1 | 7/2021 | Raghavan et al. |
| 2021/0234597 A1 | 7/2021 | Raghavan et al. |
| 2021/0234598 A1 | 7/2021 | Raghavan et al. |
| 2021/0234602 A1 | 7/2021 | Raghavan et al. |
| 2021/0235434 A1 | 7/2021 | Raghavan et al. |
| 2021/0250940 A1 | 8/2021 | Raghavan et al. |
| 2021/0251040 A1 | 8/2021 | Tang et al. |
| 2021/0265741 A1 | 8/2021 | Kenington |
| 2021/0329621 A1 | 10/2021 | Raghavan et al. |
| 2021/0359826 A1 | 11/2021 | Wang et al. |
| 2021/0410094 A1 | 12/2021 | Cui et al. |
| 2022/0006539 A1 | 1/2022 | Sun et al. |
| 2022/0021422 A1 | 1/2022 | Kim et al. |
| 2022/0070823 A1 | 3/2022 | Ma et al. |
| 2022/0086702 A1 | 3/2022 | Wang et al. |
| 2022/0149924 A1 | 5/2022 | Zhang et al. |
| 2022/0150717 A1 | 5/2022 | Geng et al. |
| 2022/0200146 A1 | 6/2022 | Du et al. |
| 2022/0201505 A1 | 6/2022 | Zhao et al. |
| 2022/0210810 A1 | 6/2022 | Khoshnevisan et al. |
| 2022/0210814 A1 | 6/2022 | Khoshnevisan |
| 2022/0224461 A1 | 7/2022 | Lee et al. |
| 2022/0278713 A1 | 9/2022 | Tsui |
| 2022/0278729 A1 | 9/2022 | Tsui et al. |
| 2022/0278875 A1 | 9/2022 | Tsui |
| 2022/0345908 A1 | 10/2022 | Takano et al. |
| 2023/0038585 A1 | 2/2023 | Tsui et al. |
| 2023/0039595 A1 | 2/2023 | Li et al. |
| 2023/0050488 A1 | 2/2023 | Tsui et al. |
| 2023/0051329 A1 | 2/2023 | Flordelis et al. |
| 2024/0027821 A1 | 1/2024 | Noguchi |
| 2024/0129922 A1 | 4/2024 | Raghavan et al. |
| 2025/0300712 A1 | 9/2025 | Raghavan et al. |
| 2025/0357978 A1 | 11/2025 | Raghavan et al. |

FOREIGN PATENT DOCUMENTS

| | | |
|---|---|---|
| CN | 109391984 A | 2/2019 |
| CN | 109792610 A | 5/2019 |
| CN | 110073609 A | 7/2019 |
| CN | 110419177 A | 11/2019 |
| CN | 113287349 B | 11/2022 |
| EP | 3167653 A1 | 5/2017 |
| EP | 3536101 A1 | 9/2019 |
| JP | 2001526510 A | 12/2001 |
| JP | 2013501480 A | 1/2013 |
| TW | 201902262 A | 1/2019 |
| TW | 201921882 A | 6/2019 |
| TW | 201937873 A | 9/2019 |
| WO | WO-2014130893 A2 | 8/2014 |
| WO | WO-2016000096 A1 | 1/2016 |
| WO | WO-2016005843 A1 | 1/2016 |
| WO | WO-2016148838 A1 | 9/2016 |
| WO | WO-2016207610 A1 | 12/2016 |
| WO | WO-2016209137 A1 | 12/2016 |
| WO | WO-2017007564 A1 | 1/2017 |
| WO | WO-2017204546 A1 | 11/2017 |
| WO | WO-2018075205 A1 | 4/2018 |
| WO | WO-2018085709 A1 | 5/2018 |
| WO | WO-2018128885 A1 | 7/2018 |
| WO | WO-2018144844 A1 | 8/2018 |
| WO | WO-2018215050 A1 | 11/2018 |
| WO | WO-2018219438 A1 | 12/2018 |
| WO | WO-2019014041 A1 | 1/2019 |
| WO | WO-2019029609 A1 | 2/2019 |
| WO | WO-2019140256 A1 | 7/2019 |
| WO | WO-2019192005 A1 | 10/2019 |
| WO | WO-2019213889 A1 | 11/2019 |
| WO | WO-2019231716 A1 | 12/2019 |
| WO | WO-2020020453 A1 | 1/2020 |
| WO | WO-2020096903 A1 | 5/2020 |
| WO | WO-2020101757 A1 | 5/2020 |
| WO | WO-2021041533 A1 | 3/2021 |
| WO | WO-2021144114 A1 | 7/2021 |
| WO | WO-2021154737 A9 | 9/2021 |
| WO | WO-2021228376 A1 | 11/2021 |
| WO | WO-2022170622 A1 | 8/2022 |
| WO | WO-2023096801 A1 | 6/2023 |

OTHER PUBLICATIONS

Lenovo, et al., "Discussion of Beam Failure Recovery for Carrier Aggregation", 3GPP Draft, 3GPP TSG RAN WG1 Meeting #92, R1-1804211_BFR, 3rd Generation Partnership Project (3GPP), Mobile Competence Centre, 650, Route Des Lucioles, F-06921 Sophia-Antipolis Cedex, France, vol. RAN WG1, No. Sanya, China, Apr. 16, 2018-Apr. 20, 2018, Apr. 6, 2018, XP051413160, 3 Pages, Retrieved from the Internet: URL:http://www.3gpp.org/ftp/tsg%5Fran/WG1%5FRL1/TSGR1%5F92b/Docs/, http://www.3gpp.org/ftp/tsg%5Fran/WG1%5FRL1/TSGR1%5F92b/Docs/, [retrieved on Apr. 6, 2018], p. 1, line 15-line 16 p. 2, line 6-line 16, the Whole Document.

Samsung: "Remaining Details on QCL", 3GPP Draft, 3GPP TSG RAN WG1 #90b, R1-1717634-QCL V2, 3rd Generation Partnership Project (3GPP), Mobile Competence Centre, 650, Route Des Lucioles, F-06921 Sophia-Antipolis Cedex, France, vol. RAN WG1, No. Prague, Czech Republic, Oct. 9, 2017-Oct. 13, 2017, Oct. 8, 2017 (Oct. 8, 2017), XP051340820, 9 Pages, Retrieved from the Internet: URL:http://www.3gpp.org/ftp/Meetings_3GPP_SYNC/RAN1/Docs/ retrieved on Oct. 8, 2017] p. 6-p. 7 p. 3.

Ericsson: "FFSs Regarding Early Measurement Configurations", 3GPP Draft, 3GPP TSG-RAN WG2#106, R2-1907254—FFSS Regarding Early Measurement Configurations, 3rd Generation Partnership Project (3GPP), Mobile Competence Centre, 650, Route Des Lucioles, F-06921 Sophia-Antipolis Cedex, vol. RAN WG2, No. Reno, Nevada, USA, May 13, 2019-May 17, 2019 May 13, 2019 (May 13, 2019), XP051730695, pp. 1-4, Retrieved from the Internet: URL:http://www.3gpp.org/ftp/Meetings%5F3GPP%5FSYNC/RAN2/Docs/R2%2D1907254%2Ezip [retrieved on May 13, 2019] p. 3, paragraph 2.3 p. 4, paragraph 2.4.

Huawei et al., "Low Latency of SCell Activation", 3GPP Draft, 3GPP TSG RAN WG1 Meeting #96bis, R1-1903992, 3rd Generation Partnership Project (3GPP), Mobile Competence Centre, 650, Route Des Lucioles, F-06921 Sophia-Antipolis Cedex, France, vol. RAN WG1, No. Xi 'an, China, Apr. 8, 2019-Apr. 12, 2019, Apr. 7, 2019 (Apr. 7, 2019), XP051699403, 6 Pages, Retrieved from the Internet: URL:http://www.3gpp.org/ftp/Meetings%5F3GPP%5FSYNC/RAN1/Docs/R1%2D1903992%2Ezip [retrieved on Apr. 7, 2019] p. 2, paragraph 2.3-p. 3, paragraph 2.4 p. 4, paragraph 3 figures 3-5.

International Search Report and Written Opinion—PCT/US2021/015100—ISA/EPO—dated Mar. 29, 2021.

Fraunhofer Iis, et al., "Discussion on Signaling of Beam Correspondence", 3GPP TSG RAN WG1 Meeting #94bis, 3GPP Draft; R1-1811086_Discussion_On_Signaling_of_Beam_Correspondence, 3rd Generation Partnership Project (3GPP), Mobile Competence Centre; 650, Route Des Lucioles; F-06921 Sophia-Antipolis Cedex, vol. RAN WG1, No. Chengdu, China; Oct. 8, 2018-Oct. 12, 2018, Sep. 28, 2018 (Sep. 28, 2018), 5 Pages, XP051518487, Retrieved from the Internet: URL: http://www.3gpp.org/ftp/tsg%5Fran/WG1%5FRL1/TSGR1%5F94b/Docs/R1%201811086%2Ezip [retrieved on Sep. 28, 2018], Sections 2-4; Figures 1-3.

Mediatek Inc: "Discussion on UL Beam Management Procedure", 3GPP TSG RAN WG1 Meeting #88, 3GPP Draft; R1-1702731 Discussion on UL Beam Management Procedure Final, 3rd Generation Partnership Project (3GPP), Mobile Competence Centre ; 650, Route Des Lucioles; F-06921 Sophia-Antipolis Cedex, vol. RAN WG1, No. Athens, Greece; Feb. 13, 2017-Feb. 17, 2017, Feb. 12, 2017 (Feb. 12, 2017), XP051209878, 4 Pages, Retrieved from the Internet: URL:http://www.3gpp.org/ftp/Meetings_3GPP_SYNC/RAN1/Docs/ [retrieved on Feb. 12, 2017], sections 2-4.

CATT: "Consideration on Multi-Beam Enhancements", 3GPP Draft; 3GPP TSG RAN WG1 Meeting #98, R1-1908603, 3rd Generation Partnership Project (3GPP), Mobile Competence Centre; 650, Route Des Lucioles; F-06921 Sophia-Antipolis Cedex; France, vol. RAN WG1, No. Prague, CZ; Aug. 26, 2019-Aug. 30, 2019, Aug. 17, 2019

(56) References Cited

OTHER PUBLICATIONS (Aug. 17, 2019), XP051765211, 7 Pages, Retrieved from the Internet: URL: http://www.3gpp.org/ftp/tsg_ran/WG1_RL1/TSGR1_98/Docs/R1-1908603.zip [retrieved on Aug. 17, 2019], chapter 3; pp. 3,4, p. 2, paragraph section 2.1-p. 3, paragraph section 2.2.

Motorola Mobility, et al., "Power Control for Multi-Panel Uplink Transmission", 3GPP TSG RAN WG1 AH-1901, 3GPP Draft; R1-1900944-PC-EMIMO-OTHER-FINAL, 3rd Generation Partnership Project (3GPP), Mobile Competence Centre; 650, Route Des Lucioles; F-06921 Sophia-Antipolis Cedex; France, vol. RAN WG1, No. Taipei; Jan. 21, 2019-Jan. 25, 2019, 4 Pages, Jan. 20, 2019 (Jan. 20, 2019), XP051593788, Retrieved from the Internet: URL: http://www.3gpp.org/ftp/Meetings%5F3GPP%5FSYNC/RAN1/Docs/R1%2D1900944%2Ezip [retrieved on Jan. 20, 2019] p. 2, paragraph section 2.1-p. 3, paragraph section 2.2.

Samsung: "Discussions on NR UL Multi-Panel/Multi-TRP", 3GPP TSG RAN WG1 Meeting #90, 3GPP Draft; R1-1713579 UL Multi TRP Panel V0, 3rd Generation Partnership Project (3GPP), Mobile Competence Centre 650, Route Des Lucioles; F-06921 Sophia-Antipolis Cedex; France, vol. RAN WG1, No. Prague, Czechia; Aug. 21, 2017-Aug. 25, 2017, 3 Pages, Aug. 20, 2017 (Aug. 20, 2017), XP051316379, Retrieved from the Internet: URL: http://www.3gpp.org/ftp/Meetings_3GPP_SYNC/RAN1/Docs/ [retrieved on Aug. 20, 2017] p. 2-p. 3, figure 2.

Interdigital., et al., "Views on Panel Activation and Deactivation", 3GPP TSG RAN WG1 #98, 3GPP Draft; R1-1908233 Views on Panel Activation and Deactivation, 3rd Generation Partnership Project (3GPP), Mobile Competence Centre, 650, Route Des Lucioles, F-06921 Sophia-Antipolis Cedex, France, vol. RAN WG1, No. Prague, CZ; Aug. 26, 2019-Aug. 30, 2019, Aug. 16, 2019 (Aug. 16, 2019), 6 Pages, XP051764847, Retrieved from the Internet: URL: http://www.3gpp.org/ftp/tsg_ran/WG1_RL1/TSGR1_98/Docs/R1-1908233.zip, [retrieved on Aug. 16, 2019], Section 2, Section 3 (p. 5, gNB-Driven), figures 1-3.

Du Y., et al., "Evaluation of PMI Feedback Schemes for MU-MIMO Pairing", IEEE Systems Journal, IEEE, US, vol. 4, No. 4, Dec. 1, 2010 (Dec. 1, 2010), XP011320688, DOI:10.1109/JSYST.2010. 2082111, pp. 505-510, ISSN: 1932-8184 p. 505.

Moderator (Samsung): "Moderator Summary for Multi-Beam Enhancement: Proposal Categorization", 3GPP TSG RAN WG1 #102-e, R1-2006985, e-Meeting, Aug. 17, 2020-Aug. 28, 2020, 27 Pages, Aug. 25, 2020 (Aug. 25, 2020) sections 1-2, section 4.1, the whole document.

Raghavan V., et al., "Antenna Placement and Performance Tradeoffs With Hand Blockage in Millimeter Wave Systems", IEEE, Apr. 2019 (Year: 2019), 16 Pages.

Ali A., et al., "Spatial Covariance Estimation for Millimeter Wave Hybrid Systems using Out-of-Band Information", May 2019, Center for Transportation Research, pp. 1-14.

Jain I. K., "Millimeter Wave Beam Training: A Survey", arXiv, Sep. 2018, 2 Pages.

Zheng Z., et al., "Time of Arrival and Time Sum of Arrival Based NLOS Identification and Localization", IEEE 2012, 5 Pages.

Nokia, et al., "On CSI-RS Design for DL Beam Management", 3GPP Draft, 3GPP TSG RAN WG1 #88, R1-1703179, Athens, Greece, Feb. 13-17, 2017, 14 Pages, Feb. 7, 2017.

Chen C., "Resolution to CIDs Related to Asymmetric Beamforming and Directional Allocation", IEEE 802.11-18/0158r3, Jan. 15, 2018, pp. 1-8.

Interdigital Inc: "Views on Panel Activation and Deactivation", 3GPP TSG RAN WG1 #98, R1-1908233, Prague, CZ, Aug. 26, 2019-Aug. 30, 2019, 6 Pages.

Franhofer Iis, et al., "Discussion on Signaling of Beam Correspondence", R1-1811086, 3GPP TSG RAN WG1 Meeting #94bis Chengdu, China Oct. 8-12, 2018, 5 Pages.

Mediatek Inc: "Discussion on UL Beam Management Procedure", R1-1702731, 3GPP TSG RAN WG1 Meeting #88 Athens; Greece, Feb. 13-17, 2017, 4 Pages.

Apple Inc: "FR2 DL Inter-Band CA Architecture Considerations", 3GPP RAN WG4 Meeting #93, R4-1913540, Reno, USA, Nov. 18-21, 2019, 8 Pages, Nov. 9, 2019.

Samsung: "Remaining Details on QCL", 3GPP TSG RAN WG1#90b, R1-1717634, Prague, Czech Republic, Oct. 9-13, 2017, 9 Pages, Oct. 3, 2017, Section 4, 4.2 Intercarrier QCL.

Apple: "Considerations on Multi-panel and MPE in FR2", 3GPP TSG RAN WG1 #96bis, R1-1904983, Xi'an, China, Apr. 8, 2019-Apr. 12, 2019, Mar. 30, 2019, pp. 1-7.

AT&T: "Beam Failure Recovery Mechanism and RLF", 3GPP TSG RAN WG2 NR-Adhoc, R2-1706680, Qingdao, China, Jun. 27, 2017-Jun. 29, 2017, Jun. 17, 2017, pp. 1-7.

CATT: "Discussion on Beam Recovery", 3GPP TSG RAN WG1 #AH_NR Meeting, R1-1700225, Spokane, USA, Jan. 16, 2017-Jan. 20, 2017, Jan. 10, 2017, 3 pages.

Huawei, et al., "Discussion on Link Recovery Procedure for Beam Blockage", 3GPP TSG RAN WG1 #88, R1-1701716, Athens, Greece, Feb. 13, 2017-Feb. 17, 2017, Feb. 6, 2017, 3 pages.

* cited by examiner

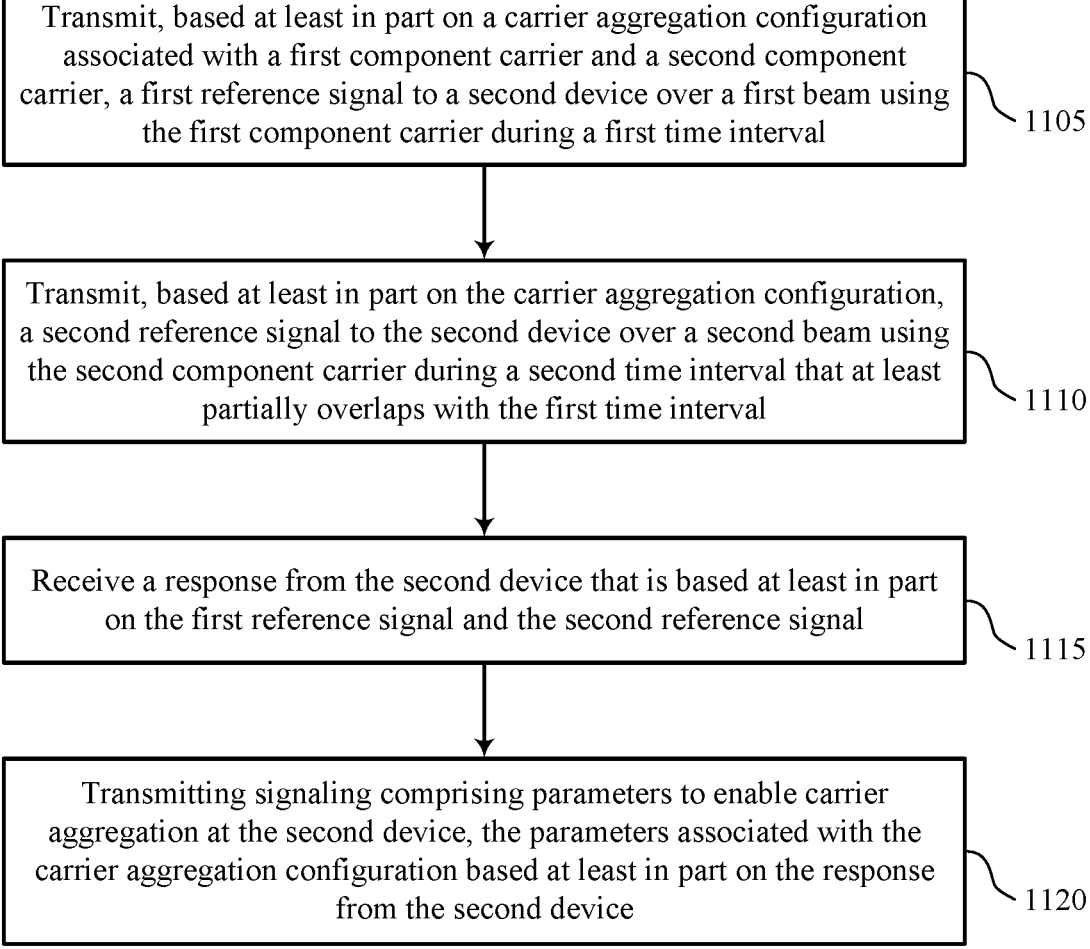

Transmit, based at least in part on a carrier aggregation configuration associated with a first component carrier and a second component carrier, a first reference signal to a second device over a first beam using the first component carrier during a first time interval ⌐ 1105

Transmit, based at least in part on the carrier aggregation configuration, a second reference signal to the second device over a second beam using the second component carrier during a second time interval that at least partially overlaps with the first time interval ⌐ 1110

Receive a response from the second device that is based at least in part on the first reference signal and the second reference signal ⌐ 1115

Transmitting signaling comprising parameters to enable carrier aggregation at the second device, the parameters associated with the carrier aggregation configuration based at least in part on the response from the second device ⌐ 1120

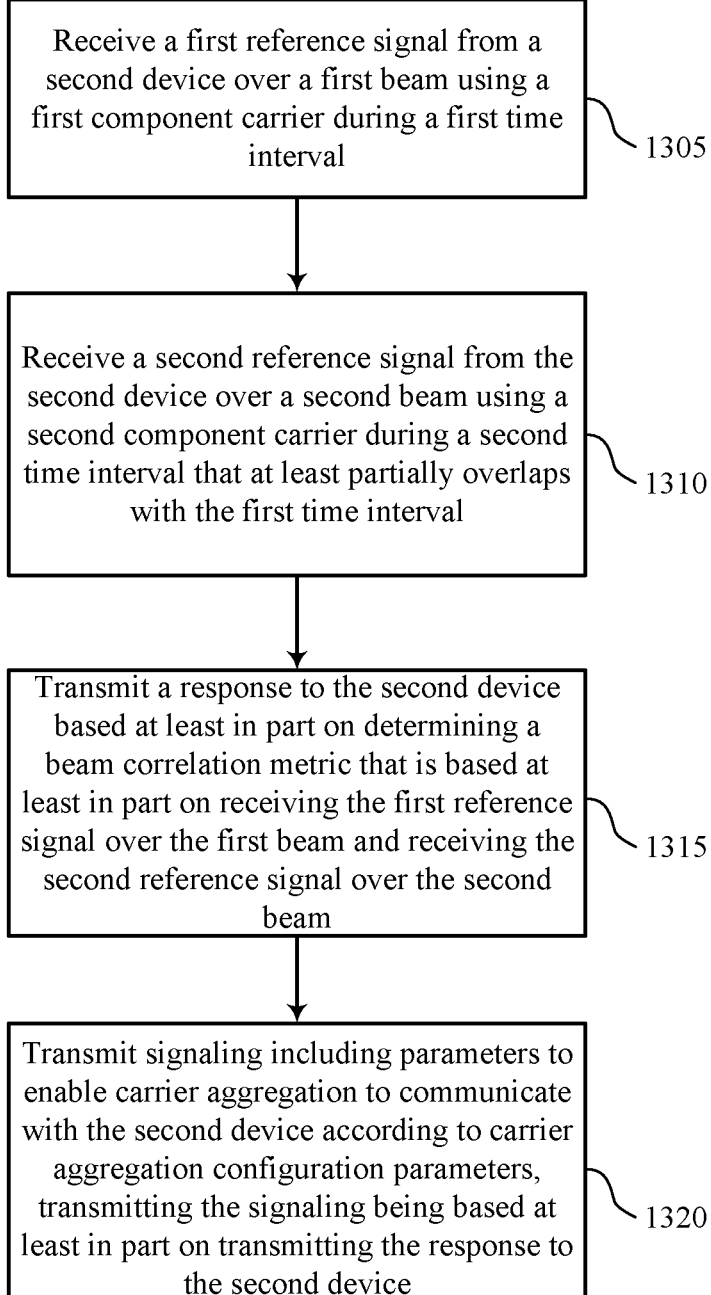

Receive a first reference signal from a second device over a first beam using a first component carrier during a first time interval ⟍1305

Receive a second reference signal from the second device over a second beam using a second component carrier during a second time interval that at least partially overlaps with the first time interval ⟍1310

Transmit a response to the second device based at least in part on determining a beam correlation metric that is based at least in part on receiving the first reference signal over the first beam and receiving the second reference signal over the second beam ⟍1315

Transmit signaling including parameters to enable carrier aggregation to communicate with the second device according to carrier aggregation configuration parameters, transmitting the signaling being based at least in part on transmitting the response to the second device ⟍1320

BEAM CORRELATION FOR CARRIER AGGREGATION

CROSS REFERENCE

The present Application for Patent claims the benefit of U.S. Provisional Patent Application No. 62/966,524 by RAGHAVAN et al., entitled "BEAM CORRELATION FOR CARRIER AGGREGATION," filed Jan. 27, 2020, assigned to the assignee hereof, and expressly incorporated by reference herein.

INTRODUCTION

The following relates to wireless communications and more specifically to techniques for managing beam correlation.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

A method for wireless communication is described. The method may include transmitting, based on a carrier aggregation configuration associated with a first component carrier and a second component carrier, a first reference signal to a second device over a first beam using the first component carrier during a first time interval, and transmitting, based on the carrier aggregation configuration, a second reference signal to the second device over a second beam using the second component carrier during a second time interval that at least partially overlaps with the first time interval. The method may further include receiving, at a first device, a response from the second device that is based on the first reference signal and the second reference signal, and transmitting signaling including parameters to enable carrier aggregation at the second device, the parameters associated with the carrier aggregation configuration based on the response from the second device.

An apparatus for wireless communication is described. The apparatus may include a processor and memory coupled to the processor. The processor and memory may be configured to transmit, based on a carrier aggregation configuration associated with a first component carrier and a second component carrier, a first reference signal to a second device over a first beam using the first component carrier during a first time interval, and transmit, based on the carrier aggregation configuration, a second reference signal to the second device over a second beam using the second component carrier during a second time interval that at least partially overlaps with the first time interval. The processor and memory may be further configured to receive, at a first device, a response from the second device that is based on the first reference signal and the second reference signal, and transmit signaling including parameters to enable carrier aggregation at the second device, the parameters associated with the carrier aggregation configuration based on the response from the second device.

Another apparatus for wireless communication is described. The apparatus may include means for transmitting, based on a carrier aggregation configuration associated with a first component carrier and a second component carrier, a first reference signal to a second device over a first beam using the first component carrier during a first time interval, and means for transmitting, based on the carrier aggregation configuration, a second reference signal to the second device over a second beam using the second component carrier during a second time interval that at least partially overlaps with the first time interval. The apparatus may further include means for receiving, at a first device, a response from the second device that is based on the first reference signal and the second reference signal, and means for transmitting signaling including parameters to enable carrier aggregation at the second device, the parameters associated with the carrier aggregation configuration based on the response from the second device.

A non-transitory computer-readable medium storing code for wireless communication is described. The code may include instructions executable by a processor to transmit, based on a carrier aggregation configuration associated with a first component carrier and a second component carrier, a first reference signal to a second device over a first beam using the first component carrier during a first time interval, and transmit, based on the carrier aggregation configuration, a second reference signal to the second device over a second beam using the second component carrier during a second time interval that at least partially overlaps with the first time interval. The code may further include instructions executable by a processor to receive, at a first device, a response from the second device that is based on the first reference signal and the second reference signal, and transmit signaling including parameters to enable carrier aggregation at the second device, the parameters associated with the carrier aggregation configuration based on the response from the second device.

In some examples of the method, apparatuses, and non-transitory computer-readable medium described herein, the receiving may include operations, features, means, or instructions for receiving a beam correlation metric from the second device that may be based on the first reference signal over the first beam and the second reference signal over the second beam.

In some examples of the method, apparatuses, and non-transitory computer-readable medium described herein, the transmitting signaling including the parameters to enable carrier aggregation may include operations, features, means, or instructions for determining to perform communications with the second device over the first beam using the first component carrier and over the second beam using the second component carrier according to the carrier aggregation configuration when the received beam correlation metric satisfies (e.g., is greater than or equal to) a threshold.

In some examples of the method, apparatuses, and non-transitory computer-readable medium described herein, the transmitting signaling including the parameters to enable carrier aggregation may include operations, features, means, or instructions for determining to refrain from communications with the second device over the first beam using the first component carrier and over the second beam using the second component carrier according to the carrier aggregation configuration when the received beam correlation metric does not satisfy (e.g., is less than or equal to) a threshold.

In some examples of the method, apparatuses, and non-transitory computer-readable medium described herein, the beam correlation metric may be based on an angle of separation between a first direction of peak received power at the second device of the first reference signal over the first beam and a second direction of peak received power at the second device of the second reference signal over the second beam.

In some examples of the method, apparatuses, and non-transitory computer-readable medium described herein, the beam correlation metric may be based on a difference between a first digital beamforming direction corresponding to a highest received power of the first reference signal at the second device and a second digital beamforming direction corresponding to a highest received power of the second reference signal at the second device.

In some examples of the method, apparatuses, and non-transitory computer-readable medium described herein, the beam correlation metric may be based on a comparison between a first analog beamforming codebook entry corresponding to a highest received power of the first reference signal at the second device and a second analog beamforming codebook entry corresponding to a highest received power of the second reference signal at the second device.

In some examples of the method, apparatuses, and non-transitory computer-readable medium described herein, the beam correlation metric may be based on a comparison between an analog beamforming codebook corresponding to a highest received power of the first reference signal at the second device and a digital beamforming direction corresponding to a highest received power of the second reference signal at the second device.

In some examples of the method, apparatuses, and non-transitory computer-readable medium described herein, receiving the response may include operations, features, means, or instructions for receiving an indication from the second device that the carrier aggregation configuration may be supported by the second device over the first beam and the second beam, and transmitting the signaling including the parameters to enable carrier aggregation at the second device associated with the carrier aggregation configuration may include operations, features, means, or instructions for determining to perform communications with the second device according to the carrier aggregation configuration based on the indication that the carrier aggregation configuration may be supported by the second device over the first beam and the second beam.

In some examples of the method, apparatuses, and non-transitory computer-readable medium described herein, transmitting the first reference signal may include operations, features, means, or instructions for transmitting the first reference signal during a first symbol duration, and transmitting the second reference signal may include operations, features, means, or instructions for transmitting the second reference signal during a second symbol duration that may be synchronized at the first device with the first symbol duration.

Some examples of the method, apparatuses, and non-transitory computer-readable medium described herein may further include operations, features, means, or instructions for transmitting the first reference signal includes transmitting the first reference signal using a first radio frequency (RF) chain, and transmitting the second reference signal includes transmitting the second reference signal using a second RF chain that may be different than the first RF chain.

Some examples of the method, apparatuses, and non-transitory computer-readable medium described herein may further include operations, features, means, or instructions for transmitting the first reference signal includes transmitting the first reference signal using a first RF chain, and transmitting the first reference signal includes transmitting the first reference signal using the first RF chain.

In some examples of the method, apparatuses, and non-transitory computer-readable medium described herein, transmitting the first reference signal may include operations, features, means, or instructions for transmitting the first reference signal over a first millimeter wave band, and transmitting the second reference signal may include operations, features, means, or instructions for transmitting the second reference signal over a second millimeter wave band that may be non-overlapping with the first millimeter wave band.

In some examples of the method, apparatuses, and non-transitory computer-readable medium described herein, transmitting the first reference signal may include operations, features, means, or instructions for transmitting the first reference signal using a first resource block, and transmitting the second reference signal may include operations, features, means, or instructions for transmitting the second reference signal using a second resource block that may be non-overlapping in a frequency domain with the first resource block.

In some examples of the method, apparatuses, and non-transitory computer-readable medium described herein, the transmitting signaling including the parameters to enable carrier aggregation may include operations, features, means, or instructions for configuring, at the first device, downlink communications with the second device according to the carrier aggregation configuration.

In some examples of the method, apparatuses, and non-transitory computer-readable medium described herein, transmitting the first reference signal may include operations, features, means, or instructions for transmitting a first channel state information reference signal (CSI-RS) over the first beam using the first component carrier, and transmitting the second reference signal may include operations, features, means, or instructions for transmitting a second CSI-RS over the second beam using the second component carrier.

In some examples of the method, apparatuses, and non-transitory computer-readable medium described herein, the transmitting signaling including the parameters to enable carrier aggregation may include operations, features, means, or instructions for configuring, at the first device, uplink communications with the second device according to the carrier aggregation configuration.

In some examples of the method, apparatuses, and non-transitory computer-readable medium described herein, transmitting the first reference signal may include operations, features, means, or instructions for transmitting a first sounding reference signal (SRS) over the first beam using the first component carrier, and transmitting the second reference signal may include operations, features, means, or instructions for transmitting a second SRS over the second beam using the second component carrier.

In some examples of the method, apparatuses, and non-transitory computer-readable medium described herein, the first component carrier and the second component carrier may be in different frequency bands.

In some examples of the method, apparatuses, and non-transitory computer-readable medium described herein, the first component carrier and the second component carrier may be in the same frequency band.

In some examples of the method, apparatuses, and non-transitory computer-readable medium described herein, the carrier aggregation configuration includes an inter-band carrier aggregation configuration.

In some examples of the method, apparatuses, and non-transitory computer-readable medium described herein, the carrier aggregation configuration includes an intra-band carrier aggregation configuration.

A method for wireless communication is described. The method may include receiving, at a first device, a first reference signal from a second device over a first beam using a first component carrier during a first time interval, and receiving, at the first device, a second reference signal from the second device over a second beam using a second component carrier during a second time interval that at least partially overlaps with the first time interval. The method may further include transmitting a response to the second device based on a beam correlation metric that is based on receiving the first reference signal over the first beam and receiving the second reference signal over the second beam. The method may further include transmitting signaling including parameters to enable carrier aggregation at the first device to communicate with the second device according to carrier aggregation configuration parameters, transmitting the signaling is based on transmitting the response to the second device.

An apparatus for wireless communication is described. The apparatus may include a processor and memory coupled to the processor. The processor and memory may be configured to receive, at a first device, a first reference signal from a second device over a first beam using a first component carrier during a first time interval, and receive, at the first device, a second reference signal from the second device over a second beam using a second component carrier during a second time interval that at least partially overlaps with the first time interval. The processor and memory may be further configured to transmit a response to the second device based on a beam correlation metric that is based on receiving the first reference signal over the first beam and receiving the second reference signal over the second beam. The processor and memory may be further configured to transmit signaling including parameters to enable carrier aggregation at the first device to communicate with the second device according to carrier aggregation configuration parameters, transmitting the signaling is based on transmitting the response to the second device.

Another apparatus for wireless communication is described. The apparatus may include means for receiving, at a first device, a first reference signal from a second device over a first beam using a first component carrier during a first time interval, and means for receiving, at the first device, a second reference signal from the second device over a second beam using a second component carrier during a second time interval that at least partially overlaps with the first time interval. The apparatus may further include means for transmitting a response to the second device based on a beam correlation metric that is based on receiving the first reference signal over the first beam and receiving the second reference signal over the second beam. The apparatus may further include means for transmitting signaling including parameters to enable carrier aggregation at the first device to communicate with the second device according to carrier aggregation configuration parameters, transmitting the signaling is based on transmitting the response to the second device.

A non-transitory computer-readable medium storing code for wireless communication is described. The code may include instructions executable by a processor to receive, at a first device, a first reference signal from a second device over a first beam using a first component carrier during a first time interval, and receive, at the first device, a second reference signal from the second device over a second beam using a second component carrier during a second time interval that at least partially overlaps with the first time interval. The code may further include instructions executable by a processor to transmit a response to the second device based on a beam correlation metric that is based on receiving the first reference signal over the first beam and receiving the second reference signal over the second beam. The code may further include instructions executable by a processor to transmit signaling including parameters to enable carrier aggregation at the first device to communicate with the second device according to carrier aggregation configuration parameters, transmitting the signaling is based on transmitting the response to the second device.

In some examples of the method, apparatuses, and non-transitory computer-readable medium described herein, transmitting the response may include operations, features, means, or instructions for transmitting a determined beam correlation metric to the second device, and transmitting the signaling including the parameters to enable carrier aggregation at the first device for communications with the second device according to the carrier aggregation configuration may include operations, features, means, or instructions for receiving configuration information from the second device that may be responsive to the transmitted beam correlation metric.

Some examples of the method, apparatuses, and non-transitory computer-readable medium described herein may further include operations, features, means, or instructions for determining the beam correlation metric based on an angle of separation between a first direction of peak received power at the first device of the first reference signal over the first beam and a second direction of peak received power at the first device of the second reference signal over the second beam.

Some examples of the method, apparatuses, and non-transitory computer-readable medium described herein may further include operations, features, means, or instructions for determining the beam correlation metric based on a difference between a first digital beamforming direction corresponding to a highest received power of the first reference signal at the first device and a second digital beamforming direction corresponding to a highest received power of the second reference signal at the first device.

Some examples of the method, apparatuses, and non-transitory computer-readable medium described herein may further include operations, features, means, or instructions for determining the beam correlation metric based on a comparison between a first analog beamforming codebook entry corresponding to a highest received power of the first reference signal at the first device and a second analog beamforming codebook entry corresponding to a highest received power of the second reference signal at the first device.

Some examples of the method, apparatuses, and non-transitory computer-readable medium described herein may further include operations, features, means, or instructions for determining the beam correlation metric based on a comparison between an analog beamforming codebook corresponding to a highest received power of the first reference signal at the first device and a digital beamforming direction corresponding to a highest received power of the second reference signal at the first device.

Some examples of the method, apparatuses, and non-transitory computer-readable medium described herein may further include operations, features, means, or instructions for determining, at the first device, that the beam correlation metric satisfies a threshold, where transmitting the response includes transmitting an indication that the beam correlation metric satisfies the threshold.

In some examples of the method, apparatuses, and non-transitory computer-readable medium described herein, the transmitting the indication that the beam correlation metric satisfies the threshold may include operations, features, means, or instructions for transmitting an indication that the carrier aggregation configuration may be supported by the first device over the first beam using the first component carrier and over the second beam using the second component carrier.

Some examples of the method, apparatuses, and non-transitory computer-readable medium described herein may further include operations, features, means, or instructions for determining, at the first device, that the beam correlation metric does not satisfy (e.g., is less than or equal to) a threshold, where transmitting the response includes transmitting an indication that the beam correlation metric does not satisfy (e.g., is less than or equal to) the threshold.

In some examples of the method, apparatuses, and non-transitory computer-readable medium described herein, the transmitting the indication that the beam correlation metric satisfies the threshold may include operations, features, means, or instructions for transmitting an indication to the second device to refrain from communication according to the carrier aggregation configuration over the first beam using the first component carrier and over the second beam using the second component carrier.

In some examples of the method, apparatuses, and non-transitory computer-readable medium described herein, receiving the first reference signal may include operations, features, means, or instructions for receiving the first reference signal during a first symbol duration, and receiving the second reference signal may include operations, features, means, or instructions for receiving the second reference signal during a second symbol duration that may be synchronized at the first device with the first symbol duration.

In some examples of the method, apparatuses, and non-transitory computer-readable medium described herein, receiving the first reference signal may include operations, features, means, or instructions for receiving the first reference signal using a first (RF) chain, and receiving the second reference signal may include operations, features, means, or instructions for receiving the second reference signal using a second RF chain that may be different than the first RF chain.

In some examples of the method, apparatuses, and non-transitory computer-readable medium described herein, receiving the first reference signal may include operations, features, means, or instructions for receiving the first reference signal using a first RF chain, and receiving the second reference signal may include operations, features, means, or instructions for receiving the second reference signal using the first RF chain.

In some examples of the method, apparatuses, and non-transitory computer-readable medium described herein, receiving the first reference signal may include operations, features, means, or instructions for receiving the first reference signal over a first millimeter wave band, and receiving the second reference signal may include operations, features, means, or instructions for receiving the second reference signal over a second millimeter wave band that may be non-overlapping with the first millimeter wave band.

In some examples of the method, apparatuses, and non-transitory computer-readable medium described herein, receiving the first reference signal may include operations, features, means, or instructions for receiving the first reference signal using a first resource block, and receiving the second reference signal may include operations, features, means, or instructions for receiving the second reference signal using a second resource block that may be non-overlapping in a frequency domain with the first resource block.

In some examples of the method, apparatuses, and non-transitory computer-readable medium described herein, the transmitting signaling including the parameters to enable carrier aggregation may include operations, features, means, or instructions for configuring the first device for downlink communications with the second device according to the carrier aggregation configuration.

In some examples of the method, apparatuses, and non-transitory computer-readable medium described herein, receiving the first reference signal may include operations, features, means, or instructions for receiving a first CSI-RS over the first beam using the first component carrier, and receiving the second reference signal may include operations, features, means, or instructions for receiving a second CSI-RS over the second beam using the second component carrier.

In some examples of the method, apparatuses, and non-transitory computer-readable medium described herein, the transmitting signaling including the parameters to enable carrier aggregation may include operations, features, means, or instructions for configuring the first device for uplink communications with the second device according to the carrier aggregation configuration.

In some examples of the method, apparatuses, and non-transitory computer-readable medium described herein, receiving the first reference signal may include operations, features, means, or instructions for receiving a first SRS over the first beam using the first component carrier, and receiving the second reference signal may include operations, features, means, or instructions for receiving a second SRS over the second beam using the second component carrier.

In some examples of the method, apparatuses, and non-transitory computer-readable medium described herein, the first component carrier and the second component carrier may be in different frequency bands.

In some examples of the method, apparatuses, and non-transitory computer-readable medium described herein, the first component carrier and the second component carrier may be in the same frequency band.

In some examples of the method, apparatuses, and non-transitory computer-readable medium described herein, the carrier aggregation configuration includes an inter-band carrier aggregation configuration.

In some examples of the method, apparatuses, and non-transitory computer-readable medium described herein, the carrier aggregation configuration includes an intra-band carrier aggregation configuration.

A method for wireless communication is described. The method may include determining, at a first device, a carrier aggregation configuration associated with a first component carrier and a second component carrier. The method may further include transmitting, based on identifying the carrier aggregation configuration, a first reference signal to a second device over a first beam using the first component carrier during a first time interval, and transmitting, based on identifying the carrier aggregation configuration, a second reference signal to the second device over a second beam using the second component carrier during a second time interval that at least partially overlaps with the first time interval. The method may further include receiving, at the first device, a response from the second device that is based on the first reference signal and the second reference signal, and configuring communications with the second device associated with the carrier aggregation configuration based on the response from the second device.

An apparatus for wireless communication is described. The apparatus may include a processor and memory coupled to the processor. The processor and memory may be configured to determine, at a first device, a carrier aggregation configuration associated with a first component carrier and a second component carrier. The processor and memory may be further configured to transmit, based on identifying the carrier aggregation configuration, a first reference signal to a second device over a first beam using the first component carrier during a first time interval, and transmit, based on identifying the carrier aggregation configuration, a second reference signal to the second device over a second beam using the second component carrier during a second time interval that at least partially overlaps with the first time interval. The processor and memory may be further configured to receive, at the first device, a response from the second device that is based on the first reference signal and the second reference signal, and configure communications with the second device associated with the carrier aggregation configuration based on the response from the second device.

Another apparatus for wireless communication is described. The apparatus may include means for determining, at a first device, a carrier aggregation configuration associated with a first component carrier and a second component carrier. The apparatus may further include means for transmitting, based on identifying the carrier aggregation configuration, a first reference signal to a second device over a first beam using the first component carrier during a first time interval, and means for transmitting, based on identifying the carrier aggregation configuration, a second reference signal to the second device over a second beam using the second component carrier during a second time interval that at least partially overlaps with the first time interval. The apparatus may further include means for receiving, at the first device, a response from the second device that is based on the first reference signal and the second reference signal, and means for configuring communications with the second device associated with the carrier aggregation configuration based on the response from the second device.

A non-transitory computer-readable medium storing code for wireless communication is described. The code may include instructions executable by a processor to determine, at a first device, a carrier aggregation configuration associated with a first component carrier and a second component carrier. The code may further include instructions executable by a processor to transmit, based on identifying the carrier aggregation configuration, a first reference signal to a second device over a first beam using the first component carrier during a first time interval, and transmit, based on identifying the carrier aggregation configuration, a second reference signal to the second device over a second beam using the second component carrier during a second time interval that at least partially overlaps with the first time interval. The code may further include instructions executable by a processor to receive, at the first device, a response from the second device that is based on the first reference signal and the second reference signal, and configure communications with the second device associated with the carrier aggregation configuration based on the response from the second device.

In some examples of the method, apparatuses, and non-transitory computer-readable medium described herein, receiving the response may include operations, features, means, or instructions for receiving a beam correlation metric from the second device that may be based on the first reference signal over the first beam and the second reference signal over the second beam.

In some examples of the method, apparatuses, and non-transitory computer-readable medium described herein, configuring communications with the second device associated with the carrier aggregation configuration may include operations, features, means, or instructions for determining to perform the communications with the second device over the first beam using the first component carrier and over the second beam using the second component carrier according to the carrier aggregation configuration when the received beam correlation metric satisfies (e.g., is greater than or equal to) a threshold.

In some examples of the method, apparatuses, and non-transitory computer-readable medium described herein, configuring communications with the second device associated with the carrier aggregation configuration may include operations, features, means, or instructions for determining to refrain from the communications with the second device over the first beam using the first component carrier and over the second beam using the second component carrier according to the carrier aggregation configuration when the received beam correlation metric does not satisfy (e.g., is less than or equal to) a threshold.

In some examples of the method, apparatuses, and non-transitory computer-readable medium described herein, the beam correlation metric may be based on an angle of separation between a first direction of peak received power at the second device of the first reference signal over the first beam and a second direction of peak received power at the second device of the second reference signal over the second beam.

In some examples of the method, apparatuses, and non-transitory computer-readable medium described herein, the beam correlation metric may be based on a difference between a first digital beamforming direction corresponding to a highest received power of the first reference signal at the second device and a second digital beamforming direction corresponding to a highest received power of the second reference signal at the second device.

In some examples of the method, apparatuses, and non-transitory computer-readable medium described herein, the beam correlation metric may be based on a comparison between a first analog beamforming codebook entry corresponding to a highest received power of the first reference signal at the second device and a second analog beamforming codebook entry corresponding to a highest received power of the second reference signal at the second device.

In some examples of the method, apparatuses, and non-transitory computer-readable medium described herein, the beam correlation metric may be based on a comparison between an analog beamforming codebook corresponding to a highest received power of the first reference signal at the second device and a digital beamforming direction corresponding to a highest received power of the second reference signal at the second device.

In some examples of the method, apparatuses, and non-transitory computer-readable medium described herein, receiving the response may include operations, features, means, or instructions for receiving an indication from the second device that the carrier aggregation configuration may be supported by the second device over the first beam and the second beam, and configuring communications with the second device associated with the carrier aggregation configuration may include operations, features, means, or instructions for determining to perform the communications with the second device according to the carrier aggregation configuration based on the indication that the carrier aggregation configuration may be supported by the second device over the first beam and the second beam.

In some examples of the method, apparatuses, and non-transitory computer-readable medium described herein, transmitting the first reference signal may include operations, features, means, or instructions for transmitting the first reference signal during a first symbol duration, and transmitting the second reference signal may include operations, features, means, or instructions for transmitting the second reference signal during a second symbol duration that may be synchronized at the first device with the first symbol duration.

Some examples of the method, apparatuses, and non-transitory computer-readable medium described herein may further include operations, features, means, or instructions for transmitting the first reference signal includes transmitting the first reference signal using a first radio frequency (RF) chain, and transmitting the second reference signal includes transmitting the second reference signal using a second RF chain that may be different than the first RF chain.

Some examples of the method, apparatuses, and non-transitory computer-readable medium described herein may further include operations, features, means, or instructions for transmitting the first reference signal includes transmitting the first reference signal using a first RF chain, and transmitting the first reference signal includes transmitting the first reference signal using the first RF chain.

In some examples of the method, apparatuses, and non-transitory computer-readable medium described herein, transmitting the first reference signal may include operations, features, means, or instructions for transmitting the first reference signal over a first millimeter wave band, and transmitting the second reference signal may include operations, features, means, or instructions for transmitting the second reference signal over a second millimeter wave band that may be non-overlapping with the first millimeter wave band.

In some examples of the method, apparatuses, and non-transitory computer-readable medium described herein, transmitting the first reference signal may include operations, features, means, or instructions for transmitting the first reference signal using a first resource block, and transmitting the second reference signal may include operations, features, means, or instructions for transmitting the second reference signal using a second resource block that may be non-overlapping in the frequency domain with the first resource block.

In some examples of the method, apparatuses, and non-transitory computer-readable medium described herein, configuring communications with the second device associated with the carrier aggregation configuration may include operations, features, means, or instructions for configuring, at the first device, downlink communications with the second device according to the carrier aggregation configuration.

In some examples of the method, apparatuses, and non-transitory computer-readable medium described herein, transmitting the first reference signal may include operations, features, means, or instructions for transmitting a first channel state information reference signal (CSI-RS) over the first beam using the first component carrier, and transmitting the second reference signal may include operations, features, means, or instructions for transmitting a second CSI-RS over the second beam using the second component carrier.

In some examples of the method, apparatuses, and non-transitory computer-readable medium described herein, configuring communications with the second device associated with the carrier aggregation configuration may include operations, features, means, or instructions for configuring, at the first device, uplink communications with the second device according to the carrier aggregation configuration.

In some examples of the method, apparatuses, and non-transitory computer-readable medium described herein, transmitting the first reference signal may include operations, features, means, or instructions for transmitting a first sounding reference signal (SRS) over the first beam using the first component carrier, and transmitting the second reference signal may include operations, features, means, or instructions for transmitting a second SRS over the second beam using the second component carrier.

In some examples of the method, apparatuses, and non-transitory computer-readable medium described herein, the first component carrier and the second component carrier may be in different frequency bands.

In some examples of the method, apparatuses, and non-transitory computer-readable medium described herein, the first component carrier and the second component carrier may be in the same frequency band.

In some examples of the method, apparatuses, and non-transitory computer-readable medium described herein, the carrier aggregation configuration includes an inter-band carrier aggregation configuration.

In some examples of the method, apparatuses, and non-transitory computer-readable medium described herein, the carrier aggregation configuration includes an intra-band carrier aggregation configuration.

A method for wireless communication is described. The method may include receiving, at a first device, a first reference signal from a second device over a first beam using a first component carrier during a first time interval, and receiving, at the first device, a second reference signal from the second device over a second beam using a second component carrier during a second time interval that at least partially overlaps with the first time interval. The method may further include determining, at the first device, a beam correlation metric that is based on receiving the first reference signal over the first beam and receiving the second reference signal over the second beam, and transmitting a response to the second device based on determining the beam correlation metric. The method may further include configuring the first device for communications with the second device according to a carrier aggregation configuration based on transmitting the response to the second device.

An apparatus for wireless communication is described. The apparatus may include a processor and memory coupled to the processor. The processor and memory may be configured to receive, at a first device, a first reference signal from a second device over a first beam using a first component carrier during a first time interval, and receive, at the first device, a second reference signal from the second device over a second beam using a second component carrier during a second time interval that at least partially overlaps with the first time interval. The processor and memory may be further configured to determine, at the first device, a beam correlation metric that is based on receiving the first reference signal over the first beam and receiving the second reference signal over the second beam, and transmit a response to the second device based on determining the beam correlation metric. The processor and memory may be further configured to configure the first device for communications with the second device according to a carrier aggregation configuration based on transmitting the response to the second device.

Another apparatus for wireless communication is described. The apparatus may include means for receiving, at a first device, a first reference signal from a second device over a first beam using a first component carrier during a first time interval, and means for receiving, at the first device, a second reference signal from the second device over a second beam using a second component carrier during a second time interval that at least partially overlaps with the first time interval. The apparatus may further include means for determining, at the first device, a beam correlation metric that is based on receiving the first reference signal over the first beam and receiving the second reference signal over the second beam, and means for transmitting a response to the second device based on determining the beam correlation metric. The apparatus may further include means for configuring the first device for communications with the second device according to a carrier aggregation configuration based on transmitting the response to the second device.

A non-transitory computer-readable medium storing code for wireless communication is described. The code may include instructions executable by a processor to receive, at a first device, a first reference signal from a second device over a first beam using a first component carrier during a first time interval, and receive, at the first device, a second reference signal from the second device over a second beam using a second component carrier during a second time interval that at least partially overlaps with the first time interval. The code may further include instructions executable by a processor to determine, at the first device, a beam correlation metric that is based on receiving the first reference signal over the first beam and receiving the second reference signal over the second beam, and transmit a response to the second device based on determining the beam correlation metric. The code may further include instructions executable by a processor to configure the first device for communications with the second device according to a carrier aggregation configuration based on transmitting the response to the second device.

In some examples of the method, apparatuses, and non-transitory computer-readable medium described herein, transmitting the response may include operations, features, means, or instructions for transmitting the determined beam correlation metric to the second device, and configuring the first device for communications with the second device according to the carrier aggregation configuration may include operations, features, means, or instructions for receiving configuration information from the second device that may be responsive to the transmitted beam correlation metric.

In some examples of the method, apparatuses, and non-transitory computer-readable medium described herein, determining the beam correlation metric may include operations, features, means, or instructions for determining the beam correlation metric based on an angle of separation between a first direction of peak received power at the first device of the first reference signal over the first beam and a second direction of peak received power at the first device of the second reference signal over the second beam.

In some examples of the method, apparatuses, and non-transitory computer-readable medium described herein, determining the beam correlation metric may include operations, features, means, or instructions for determining the beam correlation metric based on a difference between a first digital beamforming direction corresponding to a highest received power of the first reference signal at the first device and a second digital beamforming direction corresponding to a highest received power of the second reference signal at the first device.

In some examples of the method, apparatuses, and non-transitory computer-readable medium described herein, determining the beam correlation metric may include operations, features, means, or instructions for determining the beam correlation metric based on a comparison between a first analog beamforming codebook entry corresponding to a highest received power of the first reference signal at the first device and a second analog beamforming codebook entry corresponding to a highest received power of the second reference signal at the first device.

In some examples of the method, apparatuses, and non-transitory computer-readable medium described herein, determining the beam correlation metric may include operations, features, means, or instructions for determining the beam correlation metric based on a comparison between an analog beamforming codebook corresponding to a highest received power of the first reference signal at the first device and a digital beamforming direction corresponding to a highest received power of the second reference signal at the first device.

Some examples of the method, apparatuses, and non-transitory computer-readable medium described herein may further include operations, features, means, or instructions for determining, at the first device, that the beam correlation metric satisfies a threshold, where transmitting the response includes transmitting an indication that the beam correlation metric satisfies the threshold.

In some examples of the method, apparatuses, and non-transitory computer-readable medium described herein, transmitting the indication that the beam correlation metric satisfies the threshold may include operations, features, means, or instructions for transmitting an indication that the carrier aggregation configuration may be supported by the first device over the first beam using the first component carrier and over the second beam using the second component carrier.

Some examples of the method, apparatuses, and non-transitory computer-readable medium described herein may further include operations, features, means, or instructions for determining, at the first device, that the beam correlation metric does not satisfy (e.g., is less than or equal to) a threshold, where transmitting the response includes transmitting an indication that the beam correlation metric does not satisfy (e.g., is less than or equal to) the threshold.

In some examples of the method, apparatuses, and non-transitory computer-readable medium described herein, transmitting the indication that the beam correlation metric satisfies the threshold may include operations, features, means, or instructions for transmitting an indication to the second device to refrain from communication according to the carrier aggregation configuration over the first beam using the first component carrier and over the second beam using the second component carrier.

In some examples of the method, apparatuses, and non-transitory computer-readable medium described herein, receiving the first reference signal may include operations, features, means, or instructions for receiving the first reference signal during a first symbol duration, and receiving the second reference signal may include operations, features, means, or instructions for receiving the second reference signal during a second symbol duration that may be synchronized at the first device with the first symbol duration.

In some examples of the method, apparatuses, and non-transitory computer-readable medium described herein, receiving the first reference signal may include operations, features, means, or instructions for receiving the first reference signal using a first (RF) chain, and receiving the second reference signal may include operations, features, means, or instructions for receiving the second reference signal using a second RF chain that may be different than the first RF chain.

In some examples of the method, apparatuses, and non-transitory computer-readable medium described herein, receiving the first reference signal may include operations, features, means, or instructions for receiving the first reference signal using a first RF chain, and receiving the second reference signal may include operations, features, means, or instructions for receiving the second reference signal using the first RF chain.

In some examples of the method, apparatuses, and non-transitory computer-readable medium described herein, receiving the first reference signal may include operations, features, means, or instructions for receiving the first reference signal over a first millimeter wave band, and receiving the second reference signal may include operations, features, means, or instructions for receiving the second reference signal over a second millimeter wave band that may be non-overlapping with the first millimeter wave band.

In some examples of the method, apparatuses, and non-transitory computer-readable medium described herein, receiving the first reference signal may include operations, features, means, or instructions for receiving the first reference signal using a first resource block, and receiving the second reference signal may include operations, features, means, or instructions for receiving the second reference signal using a second resource block that may be non-overlapping in the frequency domain with the first resource block.

In some examples of the method, apparatuses, and non-transitory computer-readable medium described herein, configuring the first device for communications with the second device according to the carrier aggregation configuration may include operations, features, means, or instructions for configuring the first device for downlink communications with the second device according to the carrier aggregation configuration.

In some examples of the method, apparatuses, and non-transitory computer-readable medium described herein, receiving the first reference signal may include operations, features, means, or instructions for receiving a first CSI-RS over the first beam using the first component carrier, and receiving the second reference signal may include operations, features, means, or instructions for receiving a second CSI-RS over the second beam using the second component carrier.

In some examples of the method, apparatuses, and non-transitory computer-readable medium described herein, configuring the first device for communications with the second device according to the carrier aggregation configuration may include operations, features, means, or instructions for configuring the first device for uplink communications with the second device according to the carrier aggregation configuration.

In some examples of the method, apparatuses, and non-transitory computer-readable medium described herein, receiving the first reference signal may include operations, features, means, or instructions for receiving a first SRS over the first beam using the first component carrier, and receiving the second reference signal may include operations, features, means, or instructions for receiving a second SRS over the second beam using the second component carrier.

In some examples of the method, apparatuses, and non-transitory computer-readable medium described herein, the first component carrier and the second component carrier may be in different frequency bands.

In some examples of the method, apparatuses, and non-transitory computer-readable medium described herein, the first component carrier and the second component carrier may be in the same frequency band.

In some examples of the method, apparatuses, and non-transitory computer-readable medium described herein, the carrier aggregation configuration includes an inter-band carrier aggregation configuration.

In some examples of the method, apparatuses, and non-transitory computer-readable medium described herein, the carrier aggregation configuration includes an intra-band carrier aggregation configuration.

BRIEF DESCRIPTION OF THE DRAWINGS

FIGS. 11 through 14 show flowcharts illustrating methods that support beam correlation for carrier aggregation in accordance with one or more aspects of the present disclosure.

DETAILED DESCRIPTION

Figure 1:
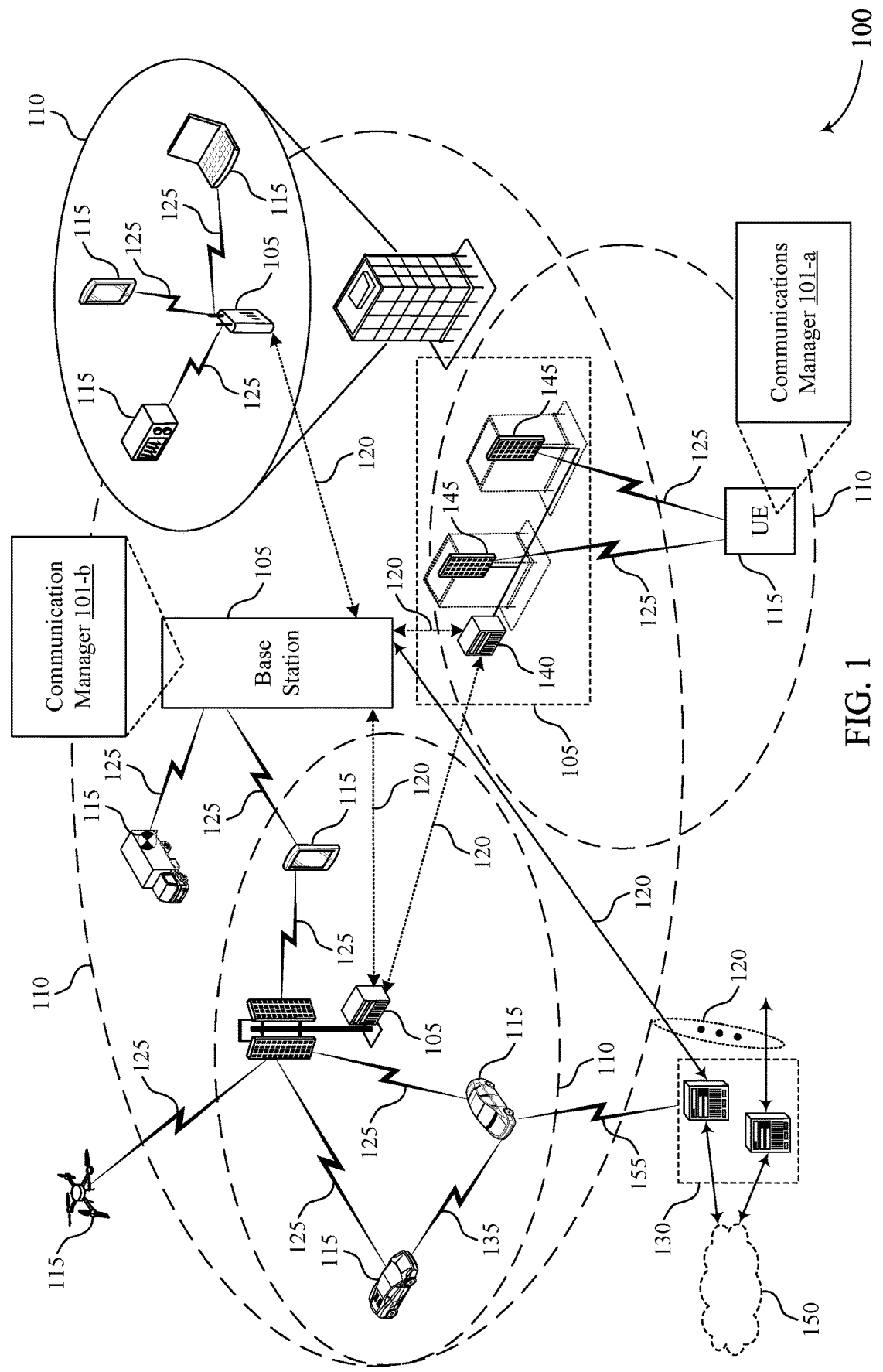
FIG. 1 illustrates an example of a wireless communications system that supports beam correlation for carrier aggregation in accordance with one or more aspects of the present disclosure.

Wireless communications systems may support signaling in various frequency bands, which may correspond to various organizations of radio frequency (RF) or other frequency bands. In some examples, signaling in different frequency bands, or portions thereof (e.g., different component carriers), may experience different signal propagation characteristics or distortions, such as different power-angle-delay profiles (PADP) or other phenomena that distort signals differently at different frequencies. For example, communications in relatively higher frequencies may be more sensitive to environmental factors such as oxygen, water vapor, or other environmental properties of the materials encountered in propagation. Such differences may be associated with signals at different frequencies having different attenuation or directionality characteristics, among other differences. In various examples, communications in different frequencies that are transmitted by a transmitting device in a same direction (e.g., having same directions of highest transmit power) may or may not be received at a receiving device with same or similar directions of highest received power.

Some wireless communications systems may employ carrier aggregation techniques where communications are conveyed between devices using multiple component carriers simultaneously or concurrently. In some examples, such techniques may be configured to increase a throughput of information between devices as compared with communications using a single component carrier. Carrier aggregation techniques may be applied across one or more frequency bands. In some examples, carrier aggregation techniques performed using component carriers in the same frequency band may be referred to as "intra-band" carrier aggregation. In some examples, carrier aggregation techniques performed using component carriers in different frequency bands (e.g., two or more frequency bands that are non-overlapping in the frequency domain) may be referred to as "inter-band" carrier aggregation.

In some cases, carrier aggregation may rely on or may otherwise performed when signals using different bands are received in a same or similar direction (e.g., having directions of highest received power that are within a threshold angle of separation, using receive beams or directions that are well-correlated). For example, carrier aggregation may be associated with favorable spectral efficiency when directions of reception at a receiving device can use a same cluster in the channel, a same or similar set of beamforming weights steering peak energy towards the same or similar direction(s), a same or similar modulation and coding scheme (MCS), or other correlated configurations or characteristics at a receive device. When these or other criteria for supporting carrier aggregation are not satisfied (e.g., when beams or directions of different bands are not well-correlated), it may be preferable to perform carrier aggregation using a different set of transmit or receive beams, or refrain from performing communications according to carrier aggregation. Thus, procedures and metrics for evaluating beam correlation may be beneficial for supporting various aspects of carrier aggregation, including various examples of inter-band carrier aggregation of intra-band carrier aggregation.

In accordance with techniques disclosed herein, devices of a wireless communications system may be configured to support an evaluation of beam correlation (e.g., a correlation of reception directionality), which may be used to support various configurations related to inter-band carrier aggregation or intra-band carrier aggregation (e.g., carrier aggregation configurations). For example, a first device (e.g., a transmitting device) may simultaneously (e.g., concurrently, at the same time, in overlapping time intervals) transmit different reference signals using different component carriers (e.g., in different frequency bands, in the same frequency band), where the transmissions may be performed over transmission beams that may or may not be aligned from the first device. A second device (e.g., a receiving device) may receive the different reference signals, which may include a determination, for each of the reference signals, of a peak receive direction for the respective reference signal, or a set of beamforming weights associated with a peak received power of the respective reference signal. The second device may determine a beam correlation metric, which may include various measures of how well-correlated the receive directions or beam weights are for the different reference signals of the different component carriers. The second device may transmit a response to the first device, which may include the beam correlation metric itself, or some other indicator associated with beam correlation (e.g., whether the second device would support inter-band or intra-band carrier aggregation using the different transmit or receive beams). One or both of the first device or the second device may subsequently perform various communication configurations related to carrier aggregation, such as determining whether to perform or refrain from performing communications according to an inter-band carrier aggregation configuration or an intra-band carrier aggregation configuration.

Particular aspects of the subject matter described herein may be implemented to realize one or more results. The described techniques may support results in determining carrier aggregation parameters by increasing reliability and decreasing latency among other results.

Aspects of the disclosure are initially described in the context of wireless communications systems and examples of signaling between devices of wireless communications systems that may support evaluations of beam correlation for carrier aggregation. Aspects of the disclosure are further illustrated by and described with reference to apparatus diagrams, system diagrams, and flowcharts that relate to beam correlation for carrier aggregation.

FIG. 1 illustrates an example of a wireless communications system 100 that supports beam correlation for carrier aggregation in accordance with one or more aspects of the present disclosure. The wireless communications system 100 may include one or more base stations 105, one or more UEs 115, and a core network 130. In some examples, the wireless communications system 100 may be a LTE network, an LTE-A network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links. A UE 115 may communicate with the core network 130 through a communication link 155.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, an IAB node or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, a machine type communications (MTC) device, or a consumer premises equipment (CPE), among other examples, which may be implemented in various objects such as appliances, or vehicles, meters, among other examples.

The UEs 115 described herein may be able to communicate with various types of devices, such as other UEs 115 that may sometimes act as relays as well as the base stations

105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers or component carriers. The terms "carrier" or "component carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, 5G-NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an absolute radio frequency channel number (ARFCN), an evolved universal mobile telecommunication system terrestrial radio access (E-UTRA) absolute radio frequency channel number (EARFCN), a new radio absolute radio frequency channel number (NR-ARFCN)) and may be positioned according to a channel raster for discovery by the UEs 115. In some examples, different frequency bands may be associated with or otherwise organized to different sets or groups of frequency channels (e.g., different sets of ARFCNs), and the different frequency bands may be non-overlapping in the frequency domain. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, 80, or 200 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM DFT-S-OFDM). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers. In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 MHz to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an EHF region of the spectrum (e.g., from 30 GHz to 300 GHz), also known as the millimeter band (e.g., millimeter wave band). In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a set of beamforming weights associated with a particular orientation (e.g., with respect to the antenna array of the transmitting device or receiving device, or with respect to some other orientation) or an entry from a beamforming codebook (e.g., analog beamforming codebook entry) that may be associated with a set of beamforming weights or other parameters.

A base station 105 or a UE 115 may use beam sweeping techniques as part of beamforming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions or according to different codebooks. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets, different receive codebooks) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In accordance with examples disclosed herein, devices of the wireless communications system 100 may be configured to support an evaluation of beam correlation (e.g., a correlation of reception directionality), which may be used to support various configurations related to inter-band or intra-band carrier aggregation. For example, a first device (e.g., a transmitting device, which may be a base station 105 or a UE 115) may simultaneously transmit different reference signals using different component carriers, where the transmissions may be performed over transmission beams that may or may not be aligned from the first device. A second device (e.g., a receiving device, which may be a base station 105 or a UE 115) may receive the different reference signals, which may include a determination, for each of the reference signals, of a peak received signal direction for the respective reference signal, or a set of beam weights associated with a peak received power of the respective reference signal. The second device may determine a beam correlation metric, which may include various measures of how well-correlated the receive directions or beam weights are for the different reference signals of the different component carriers. The second device may transmit a response to the first device, which may include the beam correlation metric itself, or some other indicator associated with beam correlation (e.g., whether the second device would support inter-band carrier aggregation or intra-band carrier aggregation using the different transmit or receive beams). One or both of the first device or the second device can subsequently perform various communication configurations related to carrier aggregation, such as determining whether to perform or refrain from performing communications according to an inter-band carrier aggregation configuration or an intra-band carrier aggregation configuration.

In various examples, a communication manager 101 may be included in a device to support beam correlation evaluation for carrier aggregation, which may or may not be associated with specific configurations or operations for uplink carrier aggregation or downlink carrier aggregation. For example, a UE 115 may include a communications manager 101-a, or a base station may include a communications manager 110-b.

In some examples, a communication manager 101 may determine an carrier aggregation configuration (e.g., an inter-band carrier aggregation configuration, an intra-band carrier aggregation configuration) associated with a first component carrier and a second component carrier. The communication manager 101 may transmit, based on identifying the carrier aggregation configuration, a first reference signal to another device (e.g., a UE 115, a base station 105) over a first beam using the first component carrier during a first time interval, and transmit a second reference signal to the other device over a second beam using the second component carrier during a second time interval that overlaps with the first time interval. In some examples, the communication manager 101 may receive a response from the other device that is based on the first reference signal and the second reference signal (e.g., based on an evaluation of the reference signals over the different beams), and the communication manager 101 may configure communications with the other device associated with the carrier aggregation configuration based on the response from the other device.

In some examples, a communication manager 101 may receive a first reference signal from another device (e.g., a UE 115, a base station 105) over a first beam using a first component carrier during a first time interval, receive a second reference signal from the other device over a second beam using a second component carrier during a second time interval that overlaps with the first time interval. The communication manager 101 may determine a beam correlation metric that is based on receiving the first reference signal over the first beam and receiving the second reference signal over the second beam. In some examples, the beam correlation metric may be associated with an evaluation of directions, or similarity thereof, of highest signal reception strength for each of the reference signals. In some examples, the beam correlation metric may be associated with an evaluation of reception beam weights, or similarity thereof, associated with highest signal reception strength for each of the reference signals. In some examples, the communication manager 101 may transmit a response to the other device based on determining the beam correlation metric (e.g., transmitting the beam correlation metric, transmitting an indication of how well-correlated the beams are from the perspective of a receiving device). In some examples, the communication manager 101 may configure the associated device for communications with the other device according to an inter-band carrier aggregation configuration or an intra-band carrier aggregation configuration based on transmitting the response to the other device.

Figure 2:
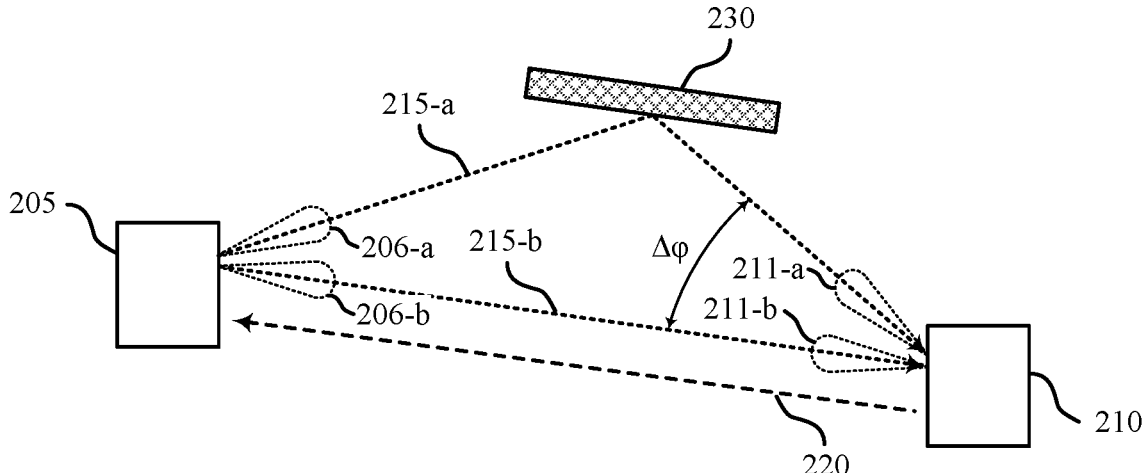
FIG. 2 illustrates an example of a wireless communications system that supports beam correlation for carrier aggregation in accordance with one or more aspects of the present disclosure.

FIG. 2 illustrates an example of a wireless communications system 200 that supports beam correlation for carrier aggregation in accordance with one or more aspects of the present disclosure. In some examples, the wireless communications system 200 may implement aspects of wireless communications system 100. The wireless communications system 200 may support various examples of reference signal transmissions using different component carriers to evaluate a correlation of beams or other measure of receive directions or codebooks using different component carriers.

The wireless communications system 200 may include a first device 205 (e.g., a transmitting device, a reference signal transmitter) and a second device 210 (e.g., a receiving device, a reference signal transmitter), where the first device 205 and the second device 210 may refer to various types of devices according to different types of configuration. For example, when the described reference signals are associated with downlink transmission, the first device 205 may be a base station 105 and the second device 210 may be a UE 115. When reference signals are associated with uplink transmission, the first device 205 may be a UE 115 and the second device may be a base station 105. When reference signals are associated with sidelink or D2D or M2M transmission, the first device 205 may be a first UE 115 and the second device may be a second UE. When reference signals are associated with IAB transmission, the first device 205 may be a first base station 105 and the second device may be a second base station 105. In other examples, the first device 205 and the second device 210 may refer to these or other types of devices that may perform techniques for beam correlation evaluation in accordance with the examples disclosed herein. In some examples, the first device 205, the second device 210, or both, may be referred to as a millimeter wave device.

The wireless communications system 200 may be configured for communications according to various frequency bands, or portions thereof (e.g., component carriers), which may include licensed bands or unlicensed or shared bands. In one example, a frequency band may refer to a frequency range (FR), which may include a set of frequency channels (e.g., a set of ARFCNs), and such frequency ranges may be non-overlapping in the frequency domain. For example, the wireless communications system 200 may support communications using a frequency range FR1, corresponding to a frequency band between 410 MHz and 7.125 GHz, a frequency range FR2, corresponding to a frequency band between 24.250 GHz and 52.600 GHz, a frequency range FR4, corresponding to a frequency band between 52.6 GHz and 71 GHz or 114.25 GHz, or various combinations of FR1, FR2, FR4, or other frequency ranges.

The first device 205 and the second device 210 may each be configured with a multi-antenna array that supports directional transmission, directional reception, or both. In some examples, the first device 205 or the second device 210 may be configured with a first multi-antenna array associated with one frequency band, and a second multi-antenna array for another frequency band. Such a configuration may be one example of a device having different RF chains for different frequency bands, but different RF chains may additionally or alternatively refer to different power amplifiers (PAs), different low noise amplifiers (LNAs), or other components related to RF signal processing. In some examples, components of an RF chain may be used for communications and for other purposes. For example, some automotive applications may include radar systems that support location or proximity detection, and such a radar system may additionally be used for performing communications in a radar band (e.g., a 77 GHz band), where such communications may include an inter-band carrier configuration including the radar band and another frequency band. Although some examples of a first device 205 or a second device 210 may include multiple RF chains, which respectively may be associated with (e.g., tailored to, calibrated or configured for, corresponding to) different frequency bands, other examples of a first device 205 or a second device 210 may include an RF chain that supports communications over multiple frequency bands.

In some examples, the first device 205 and the second device 210 may be configured to support intra-band carrier aggregation, which may refer to simultaneous communications over two or more component carriers of the same frequency band. Additionally or alternatively, the first device 205 and the second device 210 may be configured to support inter-band carrier aggregation, which may refer to simultaneous communications over two or more component carriers of different frequency bands. In one example of carrier aggregation (e.g., intra-band carrier aggregation or inter-band carrier aggregation), simultaneous communications may be supported over a first carrier or channel associated with a first band (e.g., a lower carrier frequency), referred to herein as $Band_1$, and a second carrier or channel associated with a second band (e.g., an upper carrier frequency), referred to herein as $Band_2$. In various examples, $Band_1$ and $Band_2$ may refer to different frequency bands or the same frequency band.

In some examples, carriers or channels of $Band_1$ and $Band_2$ may refer to different frequency ranges (e.g., different ones of FR1, FR2, or FR4). In one illustrative example, communications over $Band_1$ may be associated with a carrier or channel of FR1 (e.g., a 2.9 GHz band) and communications over $Band_2$ may be associated with a carrier or channel of FR2 (e.g., a 28 or a 39 GHz band). In another example, communications over $Band_1$ may be associated with a carrier or channel of FR2 (e.g., a 28 GHz band) and communications over $Band_2$ may be associated with a carrier or channel of FR4 (e.g., a 60 GHz band).

In some examples, carriers or channels of $Band_1$ and $Band_2$ may refer to the same frequency range (e.g., a same one of FR1, FR2, or FR4). In one illustrative example, communications over $Band_1$ may be associated with a first carrier or channel of FR2 (e.g., a 28 GHz band) and communications over $Band_2$ may be associated with a second carrier or channel of FR2 (e.g., a 39 GHz band). In another example, communications over $Band_1$ may be associated with a first carrier or channel of FR4 (e.g., a 60 GHz band) and communications over $Band_2$ may be associated with a second carrier or channel of FR4 (e.g., a 66 GHz band). Although examples are provided for inter-band and intra-band carrier aggregation over two component carriers, the described techniques may be applied to any quantity of component carriers or frequency bands used in a carrier aggregation configuration, whether in a same frequency range or in two or more different frequency ranges.

In some examples of carrier aggregation, multiple RF chains may be used to steer energy towards the same direction or cluster across bands. Broadly, a cluster may refer to a property of the wireless channel between the transmitting device (e.g., the first device 205, the second device 210, a base station, a UE) and the receiving device (e.g., the first device 205, the second device 210, a base station, a UE). A "cluster" is a standard term in channel modeling and MIMO processing for distinct objects or surfaces (e.g., reflectors such as glass windows/panes, lamp posts, or diffraction objects such as building corners, foliage) within a channel environment that allow propagation from the transmitting device to the receiving device. For example, carrier aggregation including a 28 GHz band and a 39 GHz band may include using a different RF chain for each band, where such a coexistence may include various power or thermal considerations. In some examples, carrier aggregation may be improved by having well-correlated beams (e.g., directionally similar receive directions for the different component carriers or different frequency bands, from the perspective of the second device 210), and the first device 205 and the second device 210 may support a quantification or other evaluation of correlation between beams used in the associated component carriers or frequency bands.

In one example, carrier aggregation may include a first component carrier or channel of a 28 GHz band and a second component carrier or channel of a 39 GHz band, and a relatively narrower beam at 39 GHz may be aligned along a different direction (e.g., at the second device 210) than a relatively wider beam at 28 GHz. In some examples, such beam alignment may be related to clusters in the channel observed by the second device 210 that are intended to be excited by the beams at the two frequencies being aligned in different directions (e.g., due to different antennas or antenna arrays being aligned along different directions from the second device 210). Moreover, PADP may be different between the 28 GHz band and the 39 GHz band depending on material properties, environmental degradation (e.g., due to oxygen or water vapor along a signal propagation path), fading, blockage, polarization-dependent losses, and others, which may be specific to certain frequency bands, subbands, or component carriers. Thus, for these and other reasons, transmissions of different component carriers may be associated with directions of peak received power (e.g., at the second device 210) being aligned in different directions.

To support various configurations of carrier aggregation (e.g., inter-band carrier aggregation, intra-band carrier aggregation), the wireless communications system 200 may be configured to transmit different reference signals on different component carriers to support an evaluation of beam correlation or other reception correlation from the perspective of the second device 210. For example, the first device 205 may be configured to transmit a first reference signal 215-a over a carrier or channel of a first band (e.g., $Band_1$) and transmit a second reference signal 215-b over a carrier or channel of a second band (e.g., $Band_2$) that may or may not be the same as the first band.

The first reference signal 215-a and the second reference signal 215-b may be transmitted concurrently, simultaneously, or according to some other degree of overlapping time intervals. For example, communications using the first component carrier and the second component carrier may be synchronized (e.g., in time, such as an inter-band or intra-band synchronization, an inter-cell or intra-cell synchronization, or other synchronization), such that resource blocks or other allocation intervals of the first component carrier and of the second component carrier are aligned in the time domain (e.g., having a same beginning time, having a same ending time, spanning a same duration in time, from the perspective of the first device 205 or the second device 210). In some examples, the first reference signal 215-*a* and the second reference signal 215-*b* may be transmitted by the first device 205 in a same TTI, or portion thereof (e.g., transmitting the first reference signal 215-*a* and the second reference signal 215-*b* in the same symbol duration or symbol period). In some examples, the first reference signal 215-*a* and the second reference signal 215-*b* may be transmitted over otherwise simultaneous durations or during respective durations that are otherwise overlapping in time.

The first reference signal 215-*a* may be transmitted by the first device 205-*a* using a first transmit beam 206-*a*, or otherwise directionally transmitted using a first entry from a transmit codebook (e.g., an entry of an analog or digital codebook associated with a first direction of transmission) and the second reference signal 215-*b* may be transmitted by the first device 205 using a second transmit beam 206-*b*, or otherwise directionally transmitted using a second entry of the transmit codebook (e.g., an entry of an analog or digital codebook associated with a second direction of transmission). Although it may be beneficial to carrier aggregation for the second device 210 to receive the first reference signal 215-*a* and the second reference signal 215-*b* along a same direction or similar directions (e.g., receive directions), the first reference signal 215-*a* and the second reference signal 215-*b* may be transmitted in the same direction or in different directions. For example, the first transmit beam 206-*a* and the second transmit beam 206-*b* may be a same transmit beam, or otherwise aligned in a same direction, or the first transmit beam 206-*a* and the second transmit beam 206-*b* may be different transmit beams, or otherwise aligned in different directions. In some cases, the first transmit beam 206-*a* may represent, or otherwise be transmitted using a first component carrier and the second transmit beam may represent, or otherwise be transmitted using a second component carrier, based at least in part on a carrier aggregation configuration.

In various examples, the respective directions for transmitting the first reference signal 215-*a* and the second reference signal 215-*b* may be based on alignments of different antenna arrays associated with the different bands, directional transmission resolution or granularity associated with transmitting over the different component carriers or different frequency bands, or other hardware of processing configurations or capabilities associated with the different component carriers or frequency bands. In some examples, the first device 205 may be aware of signal propagation differences between the first component carrier and the second component carrier (e.g., based on a beam training operation between the first device 205 and the second device 210), such as an electromagnetic property change due to a reflection surface 230 or other signal propagation distortion or attenuation that is relevant to the transmission of the first reference signal 215-*a*, but not the transmission of the second reference signal 215-*b*. Thus, in some examples, the first device 205 may separately determine or adjust transmission directions of one or both of the first reference signal 215-*a* or the second reference signal 215-*b* accordingly (e.g., to support receive directions at the second device 210 being relatively well-aligned or otherwise correlated).

The type of reference signal employed by the wireless communications system 200 to support the described techniques may be based on the device type of the first device 205 or the second device 210, or a type of communications between the first device 205 and the second device 210, or a combination thereof. For example, when the first device 205 is a base station 105, or the reference signals 215-*a* and 215-*b* are transmitted in a downlink or backhaul configuration or direction, the reference signals 215-*a* and 215-*b* may be channel state information reference signal (CSI-RS) transmissions over the first component carrier and the second component carrier by the first device 205. In another example, when the first device 205 is a UE 115, or the reference signals 215-*a* and 215-*b* are transmitted in an uplink or sidelink configuration or direction, the reference signals 215-*a* and 215-*b* may be SRS transmissions over the first component carrier and the second component carrier by the first device 205.

The hardware configuration used by the first device 205 to transmit the reference signals 215-*a* and 215-*b* may be based on the device type of the first device 205, or a hardware capability of the first device 205, or both. For example, the first device 205 may be a UE 115 having a single RF chain, and the first reference signal 215-*a* and the second reference signal 215-*b* may be transmitted on the first component carrier and the second component carrier, respectively, using the same single RF chain. In some examples, such a transmission may include applying a same M-sequence, a same Gold sequence, or a same pseudo-random sequence for each of the first reference signal 215-*a* and the second reference signal 215-*b*, where such sequences may be selected or applied to support a degree of orthogonality between transmissions. In another example, the first device 205 may be a UE 115 having multiple RF chains, and the first reference signal 215-*a* and the second reference signal 215-*b* may be transmitted on the first component carrier and the second component carrier, respectively, using the same RF chain or different RF chains. In other examples, the first device 205 may be a base station 105 having multiple RF chains, and the first reference signal 215-*a* and the second reference signal 215-*b* may be transmitted on the first component carrier and the second component carrier, respectively, using the same RF chain or different RF chains. In examples where different RF chains are used by the first device 205 for the first reference signal 215-*a* and the second reference signal 215-*b*, such transmissions may include applying same or different M-sequences, same or different Gold sequences, or same or different pseudo-random sequence for each of the first reference signal 215-*a* and the second reference signal 215-*b*.

The first reference signal 215-*a* may be received by the second device 210 using a first receive beam 211-*a*, or otherwise directionally received using a first entry in a receive codebook (e.g., an analog or digital codebook associated with a first direction of reception) and the second reference signal 215-*b* may be received by the second device 210 using a second receive beam 211-*b*, or otherwise directionally received using a second entry in the receive codebook (e.g., an analog or digital codebook associated with a second direction of reception, which may or may not be the same codebook that is associated with receiving the first reference signal). The reception of the first reference signal 215-*a* and the second reference signal 215-*b* may be evaluated at the second device 210, which may include an evaluation of how well-correlated the beams or directions of highest received power are between the first reference signal 215-*a* and the second reference signal 215-*b*. For example, the second device 210 may receive the first reference signal 215-*a* and, as part of the reception, the second device 210 may determine (e.g., explicitly or implicitly), a direction (e.g., of the receive beam 211-*a*) associated with a highest received power of the first reference signal 215-*a*. Likewise, the second device 210 may receive the second reference signal 215-*b* and, as part of the reception, the second device 210 may determine (e.g., explicitly or implicitly), a direction (e.g., of the receive beam 211-*b*) associated with a highest received power of the second reference signal 215-*b*. The highest received power may be a highest received power relative to receive powers associated with other received reference signals.

The first reference signal 215-*a* and the second reference signal 215-*b* may be received concurrently, simultaneously, or according to other degrees of overlapping time intervals. For example, when the first reference signal 215-*a* and the second reference signal 215-*b* are transmitted simultaneously, the first reference signal 215-*a* and the second reference signal 215-*b* may be received simultaneously (e.g., when a signal propagation delay between the first device 205 and the second device 210 is the same for the first component carrier and the second component carrier). In other examples, when the first reference signal 215-*a* and the second reference signal 215-*b* are transmitted simultaneously, the first reference signal 215-*a* and the second reference signal 215-*b* may not be received simultaneously (e.g., when a signal propagation delay between the first device 205 and the second device 210 is different between the first component carrier and the second component carrier). However, in various examples (e.g., whether or not the first reference signal 215-*a* and the second reference signal 215-*b* are transmitted simultaneously), at least a portion of the first reference signal 215-*a* and the second reference signal 215-*b* may be received concurrently, or during overlapping time intervals. In some cases, a relative delay between receiving the first reference signal 215-*a* and the second reference signal 215-*b* may be determined and considered (e.g., applied at the second device 210 to signal processing of or evaluation between the first reference signal 215-*a* and the second reference signal 215-*b*). In other examples, a relative signal propagation delay between the first component carrier and the second component carrier may be determined and considered (e.g., at the first device 205), which may include transmitting the first reference signal 215-*a* and the second reference signal 215-*b* over different durations in an effort to synchronize their reception (e.g., at the second device 210).

A type of procedure used by the second device 210 to evaluate the direction of reception of the first reference signal 215-*a* or the second reference signal 215-*b* may be based on the device type of the first device 205 or the second device 210, or a type of communications between the first device 205 and the second device 210, or a combination thereof. For example, when the second device 210 is a UE 115, or when the reference signals 215-*a* and 215-*b* are transmitted in a downlink direction, the second device 210 may receive signaling (e.g., CSI-RS signaling or other reference signaling) as part of a P-1, P-2, or P-3 signaling or operational sequence that supports transmit and receive beam refinement between the first device 205 and the second device 210.

In P-1 signaling, the first device 205 (e.g., a base station 105) may transmit using a set of relatively wide transmission beams and the second device 210 (e.g., a UE 115) may receive using one or more relatively wide reception beams, which may support establishing an initial communications link between the first device 205 and the second device 210. In some examples, P-1 signaling may be used to enable UE measurement on different transmission beams to support selection of base station or TRP transmission beams or UE reception beams. For beamforming at a base station 105 or a TRP, P-1 operations may include intra-TRP or inter-TRP transmission beam sweep from a set of different beams (e.g., transmit beams). For beamforming at a UE 115, P-1 operations may include a UE receiving beam sweep from a set of different beams (e.g., receive beams).

In P-2 signaling, the first device 205 may transmit using a set of relatively narrow transmission beams and the second device 210 may measure respective signal strengths of each of the set of transmission beams and signal or otherwise indicate a preferred one of the set of transmission beams. In some examples, P-2 signaling may be used to enable UE measurement on different transmission beams to possibly change transmission beams (e.g., inter-TRP or intra-TRP transmission beams). In some cases, such a selection may be made from a smaller set of beams for beam refinement than in P-1. In some examples, P-2 operations may be considered as a subset of P-1 operations.

In P-3 signaling the first device 205 may transmit using a relatively narrow transmission beam (e.g., as selected or indicated by the second device 210) and the second device 210 may measure respective signal strengths of each of a set of relatively narrow reception beams, which may or may not be signaled or indicated back to the first device 205. In some examples, P-3 signaling may be used to enable UE measurement on the same transmission beam to change a receive beam at a UE 115 in cases where a UE 115 uses beamforming.

In some examples, transmission of the first reference signal 215-*a* and the second reference signal 215-*b* may implement aspects of P-1 or P-2 signaling, where the operations of P-1 signaling or P-2 signaling are performed simultaneously (e.g., in a same symbol period) and in different component carriers or different frequency bands (e.g., in BWPs of two or more different frequency bands, in different RBs in the frequency domain). As part of performing P-1 or P-2 operations, the second device 210 (e.g., a UE 115) may determine a reception directionality associated with each of the first reference signal 215-*a* (e.g., a direction of the first receive beam 211-*a*) and the second reference signal 215-*b* (e.g., a direction of the second receive beam 211-*b*). In some examples according to the described techniques, the second device 210 (e.g., a UE 115) may be expected to have multiple RF chains with which the second device 210 can process the first reference signal 215-*a* and the second reference signal 215-*b* (e.g., to separately determine respective reception directions), and estimate or otherwise evaluate a beam correlation metric. If the second device 210 (e.g., a UE 115) has only a single RF chain, a different procedure may be employed (e.g., according to U-1 or U-2 signaling or operations).

In another example, when the second device 210 is a base station 105, or when the reference signals 215-*a* and 215-*b* are transmitted in an uplink direction, the second device 210 may receive signaling (e.g., SRS signaling or other reference signaling) as part of a U-1, U-2, or U-3 signaling or operational sequence which supports transmit and receive beam refinement between the first device 205 and the second device 210. In some examples, U-1, U-3, and U-2 signaling or operations may be similar to P-1, P-2, and P-3 signaling or operations, respectively, but with a reversed perspective (e.g., in an uplink direction rather than a downlink direction).

In some examples, transmission of the first reference signal 215-a and the second reference signal 215-b may implement aspects of U-1 or U-3 signaling, where the operations of U-1 signaling or U-3 signaling are performed simultaneously (e.g., in a same symbol period) and in different component carriers or different frequency bands (e.g., in BWPs of two or more different frequency bands, in different RBs in the frequency domain). As part of performing U-1 or U-3 operations, the second device 210 (e.g., a base station 105) may determine a reception directionality associated with each of the first reference signal 215-a (e.g., a direction of the first receive beam 211-a) and the second reference signal 215-b (e.g., a direction of the second receive beam 211-b). In some examples according to the described techniques, the second device 210 (e.g., a base station 105) may be expected to have multiple RF chains with which the second device 210 can process the first reference signal 215-a and the second reference signal 215-b (e.g., to separately determine respective reception directions), and estimate or otherwise evaluate a beam correlation metric. In some examples, the first device 205 (e.g., a UE 115) may only have a single RF chain, but the example approach of using U-1 or U-3 signaling or operations may still be applicable at the second device 210 (e.g., a base station 105) having multiple RF chains.

In some examples, a type of procedure used by the second device 210 to evaluate the direction of reception of the first reference signal 215-a or the second reference signal 215-b may be based on a hardware capability or configuration of the second device 210. In various examples, the type of procedure used by the second device 210 to determine directionality of receiving over the first component carrier and the second component carrier (e.g., for the first reference signal 215-a and the second reference signal 215-b) may be the same, or the type of procedure used by the second device 210 to determine directionality of receiving over the first component carrier and the second component carrier (e.g., for the first reference signal 215-a and the second reference signal 215-b) may be different, which may be related to the hardware capability or configuration supported in the respective component carriers (e.g., in respective frequency bands).

In one example, the second device 210 may be configured to support digital beamforming for a respective component carrier (e.g., a respective frequency band), which may support aspects of performing a directional (e.g., continuous) reception sweep. For example, for one or both of the first component carrier or the second component carrier, the second device may sweep through different beam weights to determine a spectrogram of received power (e.g., associated with the receiving the first reference signal 215-a or receiving the second reference signal 215-b) versus reception direction. The second device 210 may accordingly determine a direction (e.g., an angle) of peak received power of a respective reference signal 215 based on a respective spectrogram. Thus, in some examples, the second device 210 may support a digital beamforming capability that allows search of peak energy received over different directions. Such techniques may be applied in an FR1+FR2 carrier aggregation, or an FR1+FR4 carrier aggregation, where digital beamforming is possible in one or both of $Band_1$ or $Band_2$, and may support a direct comparison between determined angles of peak received power.

In another example, the second device 210 may additionally or alternatively be configured to support analog or hybrid beamforming for a respective component carrier (e.g., a respective frequency band), which may support aspects of performing a reception codebook sweep. For example, for one or both of the first component carrier or the second component carrier, the second device 210 may sweep through different analog reception codebooks to determine a received power (e.g., associated with the receiving the first reference signal 215-a or receiving the second reference signal) associated with each of the different entries in the analog reception codebook. A codebook entry having a highest received power for a respective reference signal may thus be determined to correspond to a directionality of receiving the respective reference signal. In some examples, the second device 210 may sweep through different codebook entries of beam weights to identify a preferred codebook entry using RSRP, SINR, or a combination thereof, as a metric for determining a preferred codebook entry. Thus, in some examples, the second device 210 may support an analog or hybrid beamforming capability that uses beam scanning over analog or hybrid beamforming codebook entries.

Although described in the context of analog receive beamforming, the second device 210 may perform a similar determination by sweeping through digital reception codebooks. In some examples, each codebook entry may be implicitly or explicitly associated with a respective reception direction, which may be used in an evaluation of correlation between receive codebook entries associated with peak received power of the first reference signal 215-a and the second reference signal 215-b. For example, $f_{low}$ and $f_{high}$ may be used to denote the preferred learned beams or codebook entries for the two component carriers (e.g., of one or more frequency bands) at the second device 210. Such techniques may be applied in an FR2+FR2 carrier aggregation (e.g., using a 28 GHz band and a 39 GHz band), or an FR2+FR4 carrier aggregation (e.g., using a 28 GHz band and a 60 GHz band, using a 39 GHz band and a 60 GHz band, etc.).

In some examples, digital beamforming may be associated with relatively higher cost, complexity, power consumption or thermal considerations (e.g., related to a relatively higher quantity of RF chains), particularly at relatively higher frequencies or higher frequency bands. Thus, in some examples of the second device 210, digital beamforming may be supported at relatively lower frequencies (e.g., a relatively lower-frequency component carrier, a relatively lower frequency band) and analog beamforming may be supported at relatively higher frequencies (e.g., a relatively higher-frequency component carrier, a relatively higher frequency band). In such examples, a respective metric of directionality may be normalized between a digital beamforming technique and an analog beamforming technique to support an evaluation of reception correlation between the first component carrier and the second component carrier. Thus, in some examples, the second device 210 may support a beam correlation evaluation that is based on a comparison between a digital beamforming capability at the second device 210 that is used to determine the direction of peak received power of the first reference signal 215-a (e.g., using a relatively lower-frequency component carrier or relatively lower frequency band) and an analog beamforming capability at the second device 210 that is used to determine the direction of peak received power of the second reference signal 215-*b* (e.g., using a relatively higher-frequency component carrier or higher frequency band).

An evaluation of beam correlation may be determined (e.g., explicitly or implicitly) based on an angle of separation (e.g., $\Delta\varphi$) between a direction of peak reception power of the first reference signal 215-*a* and a direction of peak reception power of the second reference signal 215-*b*. In some examples, a beam correlation metric may be calculated as a cosine of the angle difference (e.g., from the perspective of the second device 210). For example, an azimuth direction of receiving the first reference signal 215-*a* at the second device 210 may be determined as $\varphi_{Band1}$ (e.g., as an angle of peak received power from a received power spectrogram, as an angle corresponding to a codebook entry associated with highest received power, where the highest received power may be a highest received power relative to receive powers associated with other received reference signals) and an azimuth direction of receiving the second reference signal 215-*b* at the second device 210 may be determined as $\varphi_{Band2}$, and a beam correlation metric may be determined as $\cos(\varphi_{Band1}-\varphi_{Band2})$.

In some examples, an elevation angle (e.g., from the perspective of the second device 210) may be considered, where an elevation direction of receiving the first reference signal 215-*a* may be determined as $\theta_{Band1}$ and an elevation direction of receiving the second reference signal 215-*b* may be determined as $\theta_{Band2}$. In some examples, considering both azimuth and elevation angles (e.g., where $(\varphi_{Band1}, \theta\varphi_{Band1})$ and $(\varphi_{Band2}, \theta_{Band2})$ denote the azimuth and elevation angle pair towards which these beams steer peak energy), a beam correlation metric may be determined as $\cos(\varphi_{Band1}-\varphi_{Band2})*\cos(\theta_{Band1}-\theta_{Band2})$. In other words, a relatively greater beam correlation may be determined if $(\theta_{Band1}, \varphi_{Band1})$ and $(\theta_{Band2}, \varphi_{Band2})$ are relatively close together, and a relatively lower beam correlation may be determined if $(\theta_{Band1}, \varphi_{Band1})$ and $(\theta_{Band2}, \varphi_{Band2})$ are relatively far apart.

The first device 205 and the second device 210 may be configured for various aspects of carrier aggregation (e.g., inter-band carrier aggregation, intra-band carrier aggregation) based on the evaluation of beam correlation at the second device 210. For example, when a determined beam correlation metric satisfies a threshold (e.g., is at or above a threshold correlation indicating a sufficient degree of correlation), spectral efficiency of applying inter-band or intra-band carrier aggregation in the first component carrier and the second component carrier may be favorable, and the first device 205 and the second device may proceed with carrier aggregation using the first component carrier and the second component carrier. In some examples, a determination to proceed (e.g., a comparison with a threshold) may be performed by the second device 210 and signaled to the first device 205 (e.g., in a response 220 signaling a support of the second device 210 for configuring or performing inter-band or intra-band carrier aggregation using the first component carrier and the second component carrier). In some examples, a determination to proceed (e.g., a comparison with a threshold) may be performed at the first device 205 based on a beam correlation metric communicated from the second device 210 (e.g., in a response 220), and signaled to the second device 210 (e.g., as an explicit indication by the first device 205 of inter-band or intra-band carrier aggregation, as an implicit indication related to simultaneous scheduling by the first device 205 in the first component carrier and the second component carrier).

When a determined beam correlation metric does not satisfy a threshold (e.g., is at or below a threshold correlation indicating an insufficient degree of correlation), the first device 205 and the second device 210 may refrain from performing carrier aggregation using the first component carrier and the second component carrier. For example, when a beam correlation metric does not satisfy a threshold, communications using different component carriers or different frequency bands may involve imbalanced power, imbalanced modulation and coding schemes, or other asymmetries (e.g., between component carriers, between frequency bands), which may degrade spectral efficiency at the cost of energy efficiency.

In some examples, a determination to refrain from performing intra-band carrier aggregation using a first component carrier and a second component carrier may include a determination to attempt intra-band carrier aggregation using different frequency component carriers, or a determination to refrain from intra-band carrier aggregation (e.g., until a later time, until signal propagation conditions change or improve). In some examples, a determination to refrain from performing inter-band carrier aggregation using a first frequency band and a second frequency band may include a determination to attempt inter-band carrier aggregation using different frequency bands, a determination to refrain from inter-band carrier aggregation, or a determination to perform intra-band carrier aggregation (e.g., until a later time, until signal propagation conditions change or improve).

In some examples, when a determined beam correlation metric does not satisfy a threshold (e.g., is at or below a threshold correlation, indicates an insufficient degree of correlation between directions of peak received power), the second device 210 may reevaluate reception at different directions in an effort to balance reception using the first component carrier and the second component carrier. For example, the described techniques may include the second device 210 determining a sub-optimal reception direction for one or both the first component carrier and the second component carrier, where the suboptimal reception directions may be relatively better aligned to each other (e.g., better correlated than peak reception directions). In some examples, despite receiving signaling at less than optimal signal quality, such a tradeoff may support improved spectral utilization by leveraging inter-band carrier aggregation more efficiently.

Figure 3:
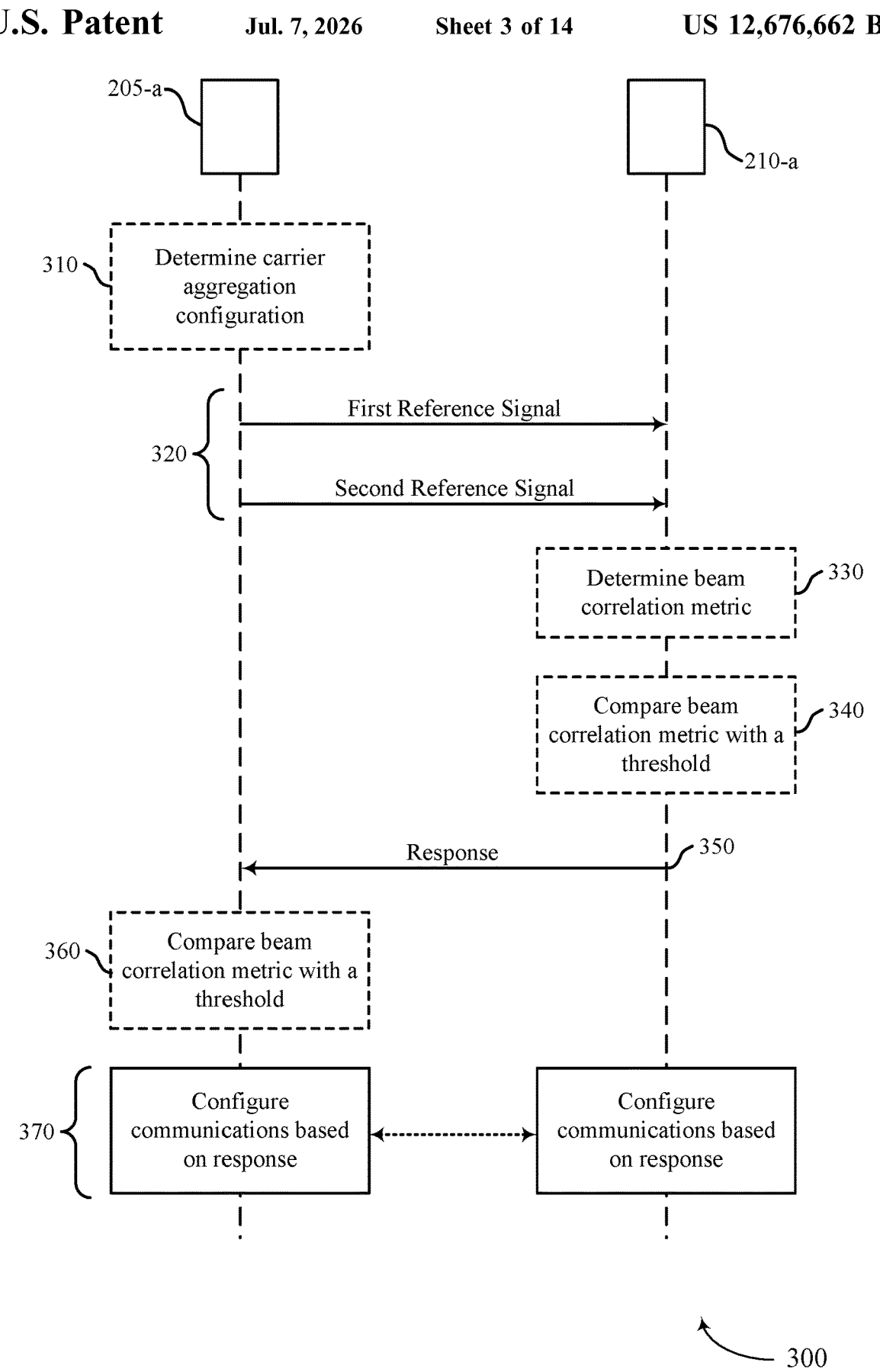
FIG. 3 illustrates an example of a wireless communications system and corresponding operations that support beam correlation for carrier aggregation in accordance with one or more aspects of the present disclosure.

FIG. 3 illustrates an example of a wireless communications system 300 and corresponding operations that support beam correlation for carrier aggregation in accordance with one or more aspects of the present disclosure. In some examples, the wireless communications system 300 may implement aspects of wireless communications systems 100 or 200. The wireless communications system 300 may include a first device 205-*a* and a second device 210-*a*, which may be examples of a first device 205 and a second device 210 described with reference to FIG. 2.

At 310, the first device 205-*a* may determine an carrier aggregation configuration. The carrier aggregation configuration may be associated with a first component carrier and a second component carrier. For example, the first device 205-*a* may determine an inter-band carrier aggregation configuration, an intra-band carrier aggregation configuration, or both. In some examples, the first device 205-*a* may determine a direction of communications with the 210-*a*, which may be associated with direction-specific signaling or procedures. For example, aspects of a carrier aggregation configuration may be determined based on whether communications with the second device 210-*a* are uplink communications, downlink communications, sidelink or D2D communications, or backhaul communications. In some examples, aspects of a carrier aggregation configuration may be determined based on whether the first device 205-*a* is a base station 105 or a UE 115. Additionally or alternatively, aspects of a carrier aggregation configuration may be determined based on whether the second device 210-*a* is a base station 105 or a UE 115.

In some examples, aspects of a carrier aggregation configuration may be determined based on one or more of the frequency bands available for inter-band or intra-band carrier configuration (e.g., an FR1+FR2 configuration, an FR1+FR4 configuration, an FR2+FR2 configuration, an FR2+FR4 configuration, an FR4+FR4 configuration, etc.). In some examples, determining a carrier aggregation configuration may include selecting one or more component carriers or channels for transmitting reference signals, which may or may not include performing contention resolution procedures to access the selected component carrier or channel.

In some examples, aspects of an inter-band or intra-band carrier aggregation configuration may be determined based on a capability of the second device 210-*a*. For example, the second device 210-*a* may indicate (e.g., via RRC signaling) a general capability for supporting inter-band or intra-band carrier aggregation, or a capability for supporting inter-band or intra-band carrier aggregation in certain frequency bands (e.g., based on band-specific hardware or processing capabilities at the second device 210-*a*).

At 320, the first device 205-*a* may transmit a first reference signal (e.g., a first reference signal 215-*a* described with reference to FIG. 2) over a first transmit beam using a first component carrier and transmit a second reference signal (e.g., a second reference signal 215-*b* described with reference to FIG. 2) over a second transmit beam using a second component carrier. The transmission by the first device 205-*a* may be based on the carrier aggregation configuration determined at 310, such as using frequency bands, or channels or component carriers thereof, selected or identified as part of the carrier aggregation configuration, or based on identifying that the second device 210-*a* may be configured to perform or capable of performing inter-band or intra-band carrier aggregation. The carrier aggregation configuration may be associated with a first component carrier and a second component carrier. The first reference signal and the second reference signal transmitted at 320 may accordingly be received at the second device 210-*a*, which may include determining a respective directionality or codebook associated with a peak received power of each of the first reference signal and the second reference signal (e.g., a first receive beam and a second receive beam, respectively).

The transmission of the first and second reference signals at 320 may have various degrees of overlap in the time domain (e.g., the second time interval may at least partially overlap with the first time interval). For example, the first reference signal and the second reference signal may be transmitted simultaneously, such as during a same symbol duration or period that is synchronized between the first component carrier and the second component carrier. In some examples, the type of reference signals transmitted may be based on a type of device performing the transmitting (e.g., a type of the first device 205-*a*), or a direction of communications. For example, when the reference signals are transmitted in an uplink direction, the transmitting of reference signals at 320 may include transmitting at least two SRSs in time over different RBs (e.g., in the frequency domain) of different BWPs of the two component carriers. When the reference signals are transmitted in a downlink direction, the transmitting of reference signals at 320 may include transmitting at least two CSI-RSs in time over different RBs (e.g., in the frequency domain) of different BWPs of the two component carriers.

At 330, the second device 210-*a* may determine a beam correlation metric. For example, the second device 210-*a* may determine a cosine of an angle of separation between a first receiving direction associated with receiving the first reference signal (e.g., a first receive beam) and a second receiving direction associated with receiving the second reference signal (e.g., a second receive beam). Such an angle of separation may be determined explicitly (e.g., as a comparison between angles of peak received power determined by respective spectrograms) or implicitly (e.g., as a comparison between angles associated with different codebook entries corresponding to a peak received power of the first reference signal and the second reference signal.

In some examples, at 340, the second device 210-*a* may compare the beam correlation metric (e.g., as determined at 330) with a threshold. For example, the second device 210-*a* may determine whether the beam correlation metric determined at 330 satisfies a threshold (e.g., indicates that reception directions are within a threshold amount of separation) or does not satisfy a threshold (e.g., indicates that reception directions are outside a threshold amount of separation).

At 350, the second device 210-*a* may transmit a response to the first device 205-*a* that is based on the first reference signal and the second reference signal. In some examples, the response of 350 may include a beam correlation metric itself (e.g., as determined at 330). In some cases, the beam correlation metric may be based on receiving the first reference signal over the first beam and receiving the second reference signal over the second beam. In some examples (e.g., following a comparison with a threshold at 340), the second device 210-*a* may transmit a result of such a comparison, such as an indication of whether or not receive directions are sufficiently correlated, whether or not the second device 210-*a* supports inter-band or intra-band carrier aggregation using the first component carrier and the second component carrier (e.g., using the first transmit beam and the second transmit beam, using the first receive beam and the second receive beam, using a first frequency band and a second frequency band), or other indications.

In some examples (e.g., when the response 350 includes a beam correlation metric), at 360, the first device 205-*a* may compare the beam correlation metric (e.g., as transmitted at 350) with a threshold. For example, the first device 205-*a* may determine whether the beam correlation metric transmitted at 350 satisfies a threshold (e.g., indicates that reception directions are within a threshold amount of separation) or does not satisfy a threshold (e.g., indicates that reception directions are outside a threshold amount of separation). In some examples, the first device 205-*a* may determine whether or not receive directions are sufficiently correlated at the second device 210-*a*, whether or not to proceed with inter-band or intra-band carrier aggregation using the first component carriers and the second component carrier (e.g., using the first transmit beam and the second transmit beam, using a first frequency band and a second frequency band), or other indications.

At 370, the first device 205-*a* and the second device 210-*a* may configure for communications with each other, which may include various configurations relative to inter-band or intra-band carrier aggregation. For example, when a determined beam correlation metric satisfies a threshold (e.g., as determined at 340 or at 360), the first device 205-*a* and the second device 210-*a* may be configured to proceed with inter-band or intra-band carrier aggregation using the first component carrier and the second component carrier. When a determined beam correlation metric does not satisfy a threshold (e.g., as determined at 340 or at 360), the first device 205-*a* and the second device 210-*a* may be configured to refrain from inter-band or intra-band carrier aggregation using the first component carrier and the second component carrier (at least according to the beam configurations used to transmit and receive the first and second reference signals).

In some examples, a configuration at 370 may include configuring the first device 205-*a* to transmit inter-band or intra-band carrier aggregation communications over the first transmit beam using the first component carrier (e.g., similar to the transmission of the first reference signal at 320) and to transmit over the second transmit beam using the second component carrier (e.g., similar to the transmission of the second reference signal at 320). Likewise, in some examples, a configuration at 370 may include configuring the second device 210-*a* to receive inter-band or intra-band carrier aggregation communications over the first receive beam using the first component carrier (e.g., similar to the reception of the first reference signal of 320) and to receive over the second receive beam using the second component carrier (e.g., similar to the reception of the second reference signal of 320).

In some examples, configurations at 370 may include signaling between the first device 205-*a* and the second device 210-*a*. For example, configuring communications may include transmitting signaling, to the second device 210-*a* from the first device 205-*a*, including parameters to enable carrier aggregation with device 210-*a*, where the parameters may be associated with the carrier aggregation configuration based on the response from the second device 210-*a*. In another example, configuring communications may include transmitting signaling, from the second device 210-*a* to the first device 205-*a*, including parameters to enable carrier aggregation at the first device 205-*a* to communicate with the second device 210-*a*. In another example, when the first device 205-*a* compares a beam correlation metric with a threshold, or otherwise evaluates whether to proceed with inter-band or intra-band carrier aggregation, the first device 205-*a* may signal, to the second device, an indication to proceed with inter-band or intra-band carrier aggregation. Such an indication may be an explicit indication that the first device 205-*a* will be transmitting information signaling according to an inter-band or intra-band carrier aggregation configuration, which may include an indication of the related component carriers or frequency bands, or may rely on an assumption that frequency bands, or carriers or channels thereof, would be the same as those used in the transmission of the first and second reference signals. In some examples, such an indication may be an implicit indication, such as a scheduling of resources by the first device 205-*a* that is associated with transmissions in the first component carrier and the second component carrier.

In some examples, configurations at 370 may not include further signaling between the first device 205-*a* and the second device 210-*a*. For example, when the second device 210-*a* compares a beam correlation metric with a threshold, or otherwise evaluates whether to proceed with inter-band or intra-band carrier aggregation, the second device 210-*a* may assume, based on transmitting the response at 350, that the second device 210-*a* should be configured according to the inter-band or intra-band carrier aggregation configuration (e.g., using the first receive beam for the first component carrier and the second receive beam for the second component carrier).

When a determined beam correlation metric does not satisfy a threshold (e.g., as determined at 340 or at 360), the first device 205-*a*, or the second device 210-*a*, or both may proceed with operations directed to identifying different component carriers, different frequency bands, or different beams to support a different inter-band or intra-band carrier aggregation configuration. For example, the second device 210-*a* may reevaluate a beam correlation metric using suboptimal beams, associated with receiving reference signals at a power below a peak received power. In another example, the first device 205-*a* may attempt to transmit reference signals using a different combination of component carriers, a different combination of one or more frequency bands, or a different combination of one or more different transmit beams.

Figure 4:
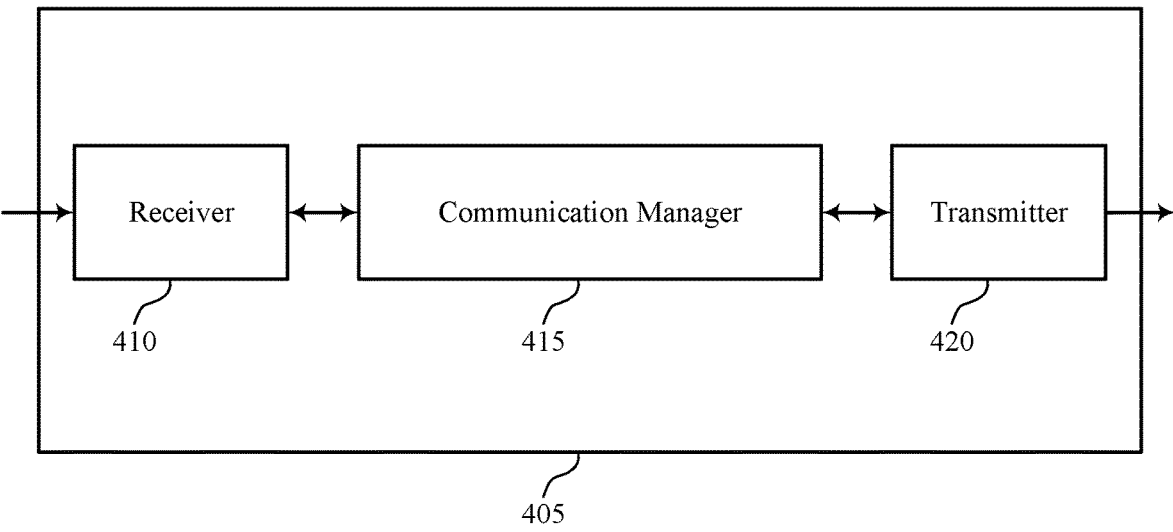
FIG. 4 shows a block diagram of a device that supports beam correlation for carrier aggregation in accordance with one or more aspects of the present disclosure.

FIG. 4 shows a block diagram 400 of a device 405 that supports beam correlation for carrier aggregation in accordance with one or more aspects of the present disclosure. The device 405 may be an example of aspects of a UE 115 or base station 105 as described herein. The device 405 may include a receiver 410, a communication manager 415, and a transmitter 420. The device 405 may also include a processor. Each of these components may be in communication with one another (e.g., via one or more buses).

The receiver 410 may receive information such as packets, user data, or control information associated with various information channels (e.g., control channels, data channels, and information related to beam correlation for carrier aggregation, etc.). Information may be passed on to other components of the device 405. The receiver 410 may be an example of aspects of the transceiver 915 described with reference to FIG. 9. The receiver 410 may utilize a single antenna or a set of antennas. The receiver 410 may include one or more RF chains, and when multiple RF chains are included, the receiver 410 may support separate receptions at different ones of the multiple RF chains.

The communications manager 415 may be an example of means for performing various aspects of determining a beam correlation parameter as described herein. The communications manager 415, or its sub-components, may be implemented in hardware (e.g., in communications management circuitry). The circuitry may include of processor, digital signal processor (DSP), an application-specific integrated circuit (ASIC), a field programmable gate array (FPGA) or other programmable logic device, discrete gate or transistor logic, discrete hardware components, or any combination thereof designed to perform the functions described in the present disclosure.

In another implementation, the communications manager 415, or its sub-components, may be implemented in code (e.g., as communications management software or firmware) executed by a processor, or any combination thereof. If implemented in code executed by a processor, the functions of the communications manager 415, or its sub-components may be executed by a general-purpose processor, a DSP, an ASIC, an FPGA or other programmable logic device.

In some examples, the communication manager 415 may be configured to perform various operations (e.g., receiving, determining, transmitting, configuring) using or otherwise in cooperation with the receiver 410, the transmitter 420, or both.

The communication manager 415, or its sub-components, may be physically located at various positions, including being distributed such that portions of functions are implemented at different physical locations by one or more physical components. In some examples, the communication manager 415, or its sub-components, may be a separate and distinct component in accordance with various aspects of the present disclosure. In some examples, the communication manager 415, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 420 may transmit signals generated by other components of the device 405. In some examples, the transmitter 420 may be collocated with a receiver 410 in a transceiver module. For example, the transmitter 420 may be an example of aspects of the transceiver 915 described with reference to FIG. 9 or the transceiver 1020 described with reference to FIG. 10. The transmitter 420 may utilize a single antenna or a set of antennas. The transmitter 420 may include one or more RF chains, and when multiple RF chains are included, the transmitter 420 may support separate transmissions at different ones of the multiple RF chains.

In some examples, the communication manager 415 may determine a carrier aggregation configuration associated with a first component carrier and a second component carrier. In some examples, the communication manager 415 may transmit, based on a carrier aggregation configuration associated with a first component carrier and a second component carrier, a first reference signal to another device over a first beam using the first component carrier during a first time interval, transmit, based on the carrier aggregation configuration, a second reference signal to the other device over a second beam using the second component carrier during a second time interval that at least partially overlaps with the first time interval, receive a response from the other device that is based on the first reference signal and the second reference signal, and transmit signaling including parameters to enable carrier aggregation at the other device, the parameters associated with the carrier aggregation configuration based on the response from the other device.

In some examples, the communication manager 415 may receive a first reference signal from another device over a first beam using a first component carrier during a first time interval, and receive a second reference signal from the other device over a second beam using a second component carrier during a second time interval that at least partially overlaps with the first time interval. In some examples, the communication manager 415 may determine a beam correlation metric that is based on receiving the first reference signal over the first beam and receiving the second reference signal over the second beam. In some examples, the communication manager 415 may transmit a response to the other device based on a beam correlation metric that is based on receiving the first reference signal over the first beam and receiving the second reference signal over the second beam. The communication manager 415 may transmit signaling including the parameters to enable carrier aggregation at the device 405 to communicate with the other device according to carrier aggregation configuration parameters, transmitting the signaling may be based on transmitting the response to the other device.

The communications manager 415 as described herein may be implemented to realize one or more potential results. One implementation may allow the device 405 to more efficiently determine carrier aggregation communication parameters for communicating with one or more other devices. For example, a device 405 may receive simultaneous reference signals from a second device that the device 405 may use to determine a beam correlation metric for communicating with the second device.

Based on implementing the beam correlation determination techniques as described herein, a processor of a UE 115 (e.g., controlling the receiver 410, the transmitter 420, or the transceiver 915 as described with reference to FIG. 9) may increase reliability and efficiency in the communication of reference signals between a device 405 and one or more other devices, and the determination of carrier aggregation parameters for communications between the device 405 and one or more other devices.

Figure 5:
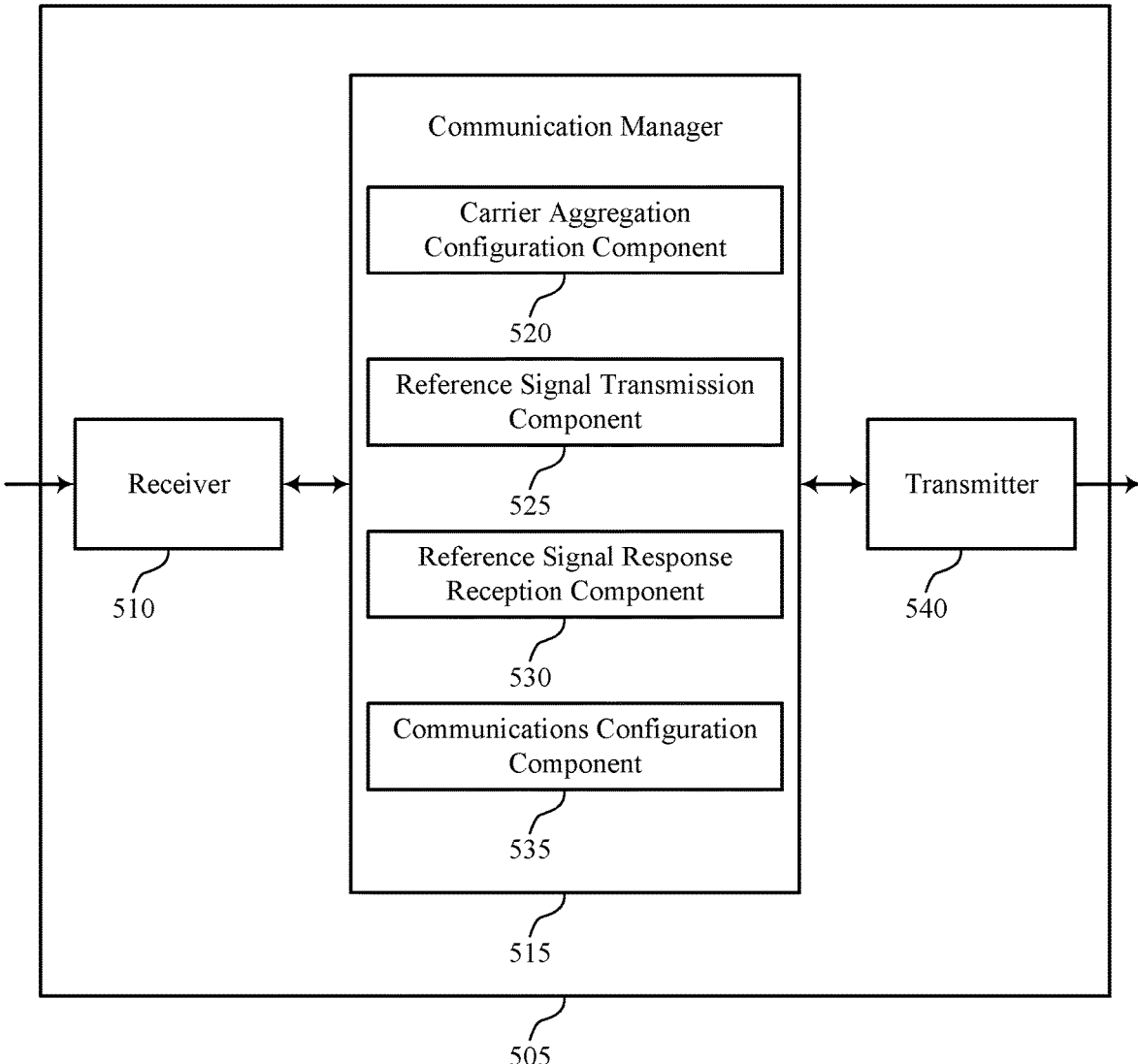
FIG. 5 shows a block diagram of a device that supports beam correlation for carrier aggregation in accordance with one or more aspects of the present disclosure.

FIG. 5 shows a block diagram 500 of a device 505 that supports beam correlation for carrier aggregation in accordance with one or more aspects of the present disclosure. The device 505 may be an example of aspects of a device 405, a UE 115, or a base station 105 as described herein. The device 505 may include a receiver 510, a communication manager 515, and a transmitter 540. The device 505 may also include a processor. Each of these components may be in communication with one another (e.g., via one or more buses).

The receiver 510 may receive information such as packets, user data, or control information associated with various information channels (e.g., control channels, data channels, and information related to beam correlation for carrier aggregation, etc.). Information may be passed on to other components of the device 505. The receiver 510 may be an example of aspects of the transceiver 915 described with reference to FIG. 9 or the transceiver 1020 described with reference to FIG. 10. The receiver 510 may utilize a single antenna or a set of antennas. The receiver 510 may include one or more RF chains, and when multiple RF chains are included, the receiver 510 may support separate receptions at different ones of the multiple RF chains.

The transmitter 540 may transmit signals generated by other components of the device 505. In some examples, the transmitter 540 may be collocated with a receiver 510 in a transceiver module. For example, the transmitter 540 may be an example of aspects of the transceiver 915 described with reference to FIG. 9 or the transceiver 1020 described with reference to FIG. 10. The transmitter 540 may utilize a single antenna or a set of antennas. The transmitter 540 may include one or more RF chains, and when multiple RF chains are included, the transmitter 540 may support separate transmissions at different ones of the multiple RF chains.

The communication manager 515 may be an example of aspects of the communication manager 415 as described herein. The communication manager 515 may include a carrier aggregation configuration component 520, a reference signal transmission component 525, a reference signal response reception component 530, and a communications configuration component 535. The communication manager 515 may be an example of aspects of the communication manager 910 or 1010 as described herein.

The carrier aggregation configuration component 520 may determine a carrier aggregation configuration associated with a first component carrier and a second component carrier.

The reference signal transmission component 525 may transmit, based on a carrier aggregation configuration associated with a first component carrier and a second component carrier, a first reference signal to another device over a first beam using the first component carrier during a first time interval and a second reference signal to the other device over a second beam using the second component carrier during a second time interval that at least partially overlaps with the first time interval.

The reference signal response reception component 530 may receive a response from the other device that is based on the first reference signal and the second reference signal.

The communications configuration component 535 may configure communications with the other device associated with the carrier aggregation configuration based on the response from the other device. In some examples, the communications configuration component 535 may transmit signaling including parameters to enable carrier aggregation at the other device, the parameters associated with the carrier aggregation configuration based on the response from the other device.

Figure 6:
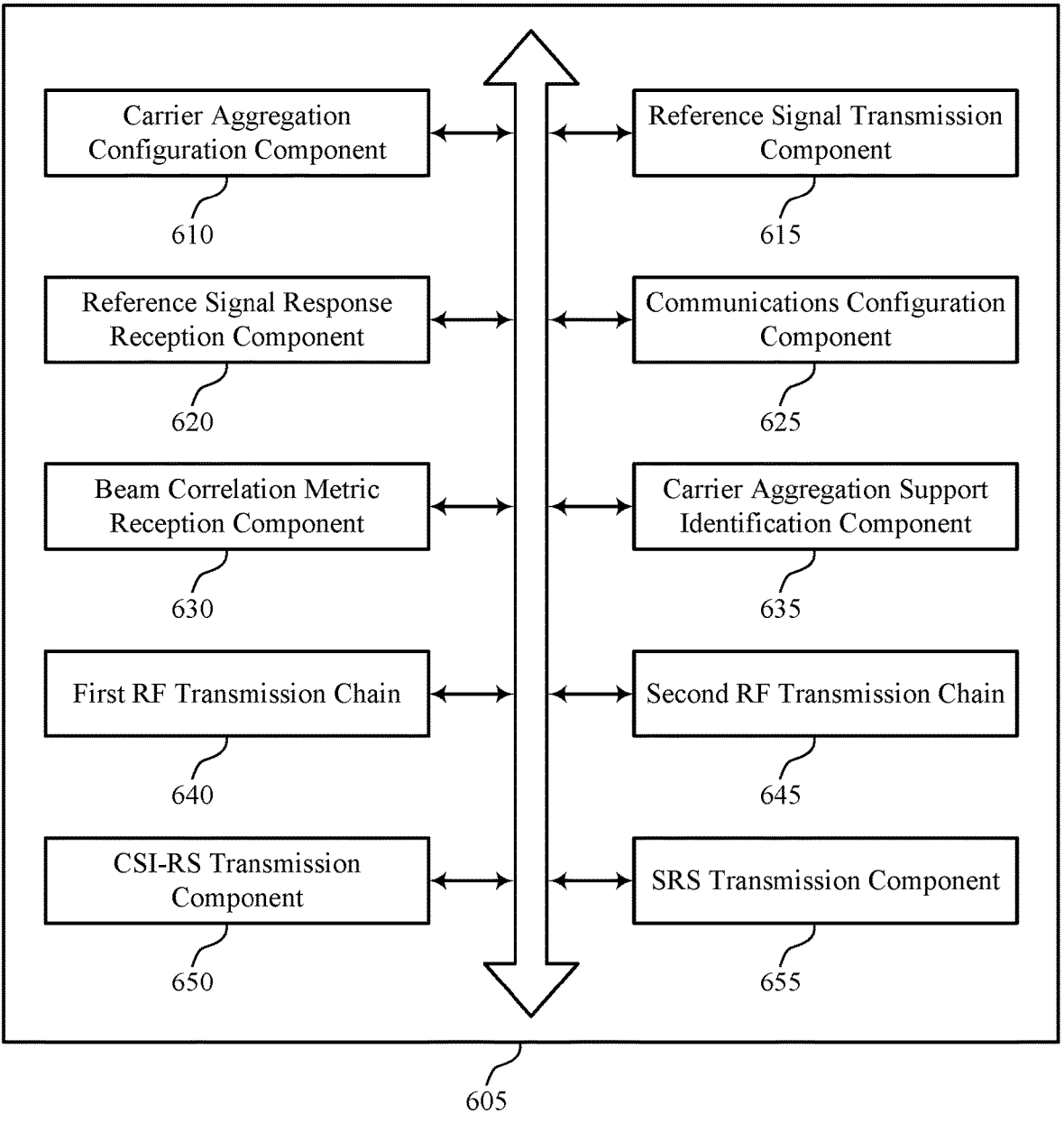
FIG. 6 shows a block diagram of a communication manager that supports beam correlation for carrier aggregation in accordance with one or more aspects of the present disclosure.

FIG. 6 shows a block diagram 600 of a communication manager 605 that supports beam correlation for carrier aggregation in accordance with one or more aspects of the present disclosure. The communication manager 605 may be an example of aspects of a communication manager 415, a communication manager 515, a communication manager 910, or a communication manager 1010 described herein. The communication manager 605 may include a carrier aggregation configuration component 610, a reference signal transmission component 615, a reference signal response reception component 620, a communications configuration component 625, a beam correlation metric reception component 630, a carrier aggregation support identification component 635, a first RF transmission chain 640, a second RF transmission chain 645, a CSI-RS transmission component 650, and an SRS transmission component 655. Each of these modules may communicate, directly or indirectly, with one another (e.g., via one or more buses).

The carrier aggregation configuration component 610 may determine, at a first device, a carrier aggregation configuration associated with a first component carrier and a second component carrier. In various examples, the carrier aggregation configuration may include an inter-band carrier aggregation configuration, an intra-band carrier aggregation configuration, or both. In various examples, the first component carrier and the second component carrier may be in different frequency bands or the same frequency band.

The reference signal transmission component 615 may transmit, based on a carrier aggregation configuration associated with a first component carrier and a second component carrier, a first reference signal to a second device over a first beam using the first component carrier during a first time interval.

In some examples, the reference signal transmission component 615 may transmit, based on the carrier aggregation configuration, a second reference signal to the second device over a second beam using the second component carrier during a second time interval that at least partially overlaps with the first time interval.

In some examples, transmitting the first reference signal includes transmitting the first reference signal during a first symbol duration, and transmitting the second reference signal includes transmitting the second reference signal during a second symbol duration that is synchronized at the first device with the first symbol duration. In some examples, the first symbol duration and the second symbol duration may span a same time interval (e.g., based on the synchronization). In some examples, the first time interval and the second time interval may be the same time interval.

In some examples, transmitting the first reference signal includes transmitting the first reference signal over a first millimeter wave band, and transmitting the second reference signal includes transmitting the second reference signal over a second millimeter wave band that is non-overlapping with the first millimeter wave band.

In some examples, transmitting the first reference signal includes transmitting the first reference signal using a first resource block, and transmitting the second reference signal includes transmitting the second reference signal using a second resource block that is non-overlapping in the frequency domain with the first resource block.

In some examples, transmitting the first reference signal includes transmitting the first reference signal using the first RF transmission chain 640 and transmitting the second reference signal includes transmitting the second reference signal using the second RF transmission chain 645. In some examples, transmitting the first reference signal includes transmitting the first reference signal using the first RF transmission chain 640 and transmitting the second reference signal includes transmitting the second reference signal using the first RF transmission chain 640. In some examples, transmitting the first reference signal includes transmitting the first reference signal using the second RF transmission chain 645 and transmitting the second reference signal includes transmitting the second reference signal using the second RF transmission chain 645. Although the first RF transmission chain 640 and the second RF transmission chain 645 are illustrated as being part of the communication manager 605, in some examples, at least a portion of the first RF transmission chain 640 and the second RF transmission chain 645 may be considered to be part of a transmitter (e.g., within the illustrative boundaries of a transmitter 420 or 540 as described with reference to FIGS. 4 and 5)

The reference signal response reception component 620 may receive, at a first device, a response from the second device that is based on the first reference signal and the second reference signal.

The communications configuration component 625 may configure communications with the second device associated with the carrier aggregation configuration based on the response from the second device. In some examples, the communications configuration component 625 may transmit signaling including parameters to enable carrier aggregation at the second device, the parameters associated with the carrier aggregation configuration based on the response from the second device.

In some examples, the communications configuration component 625 may determine to perform communications with the second device over the first beam using the first component carrier and over the second beam using the second component carrier according to the carrier aggregation configuration when the received beam correlation metric satisfies (e.g., is greater than or equal to) a threshold.

In some examples, the communications configuration component 625 may determine to refrain from communications with the second device over the first beam using the first component carrier and over second beam using the second component carrier according to the carrier aggregation configuration when the received beam correlation metric does not satisfy (e.g., is less than or equal to) a threshold.

In some examples, transmitting the signaling including parameters to enable carrier aggregation includes determining to perform the communications with the second device over the first beam using the first component carrier and over the second beam using the second component carrier according to the carrier aggregation configuration based on an indication that the carrier aggregation configuration is supported by the second device over the first beam and the second beam.

In some examples, transmitting the signaling including parameters to enable carrier aggregation includes refraining from performing the communications with the second device over the first beam using the first component carrier and over the second beam using the second component carrier according to the carrier aggregation configuration based on an indication that the carrier aggregation configuration is not supported by the second device over the first beam and the second beam.

In some examples (e.g., when the communication manager 605 is associated with a base station or IAB node), the communications configuration component 625 may configure, at the first device, downlink communications with the second device according to the carrier aggregation configuration.

In some examples (e.g., when the communication manager 605 is associated with a UE or CPE), the communications configuration component 625 may configure, at the first device, uplink communications with the second device according to the carrier aggregation configuration.

The beam correlation metric reception component 630 may receive a beam correlation metric from the second device that is based on the first reference signal over the first beam and the second reference signal over the second beam. In some examples, the beam correlation metric may be based on an angle of separation between a first direction of peak received power at the second device of the first reference signal over the first beam and a second direction of peak received power at the second device of the second reference signal over the second beam. In some examples, the beam correlation metric may be based on a difference between a first digital beamforming codebook entry or direction corresponding to a highest received power of the first reference signal at the second device and a second digital beamforming codebook entry or direction corresponding to a highest received power of the second reference signal at the second device. In some examples, the beam correlation metric may be based on a comparison between a first analog beamforming codebook entry or direction corresponding to a highest received power of the first reference signal at the second device and a second analog beamforming codebook entry or direction corresponding to a highest received power. In some examples, the beam correlation metric may be based on a comparison between an analog beamforming codebook or direction corresponding to a highest received power of the first reference signal at the second device and a digital beamforming codebook or direction corresponding to a highest received power of the second reference signal at the second device.

The carrier aggregation support identification component 635 may receive an indication from the second device that the carrier aggregation configuration is or is not supported by the second device over the first beam and the second beam.

In some examples, to transmit a first and second reference signal, the CSI-RS transmission component 650 may transmit a first CSI-RS over the first beam using the first component carrier, and transmit a second CSI-RS over the second beam using the second component carrier.

In some examples, to transmit a first and second reference signal, the SRS transmission component 655 may transmit a first SRS over the first beam using the first component carrier, and transmit a second SRS over the second beam using the second component carrier.

Figure 7:
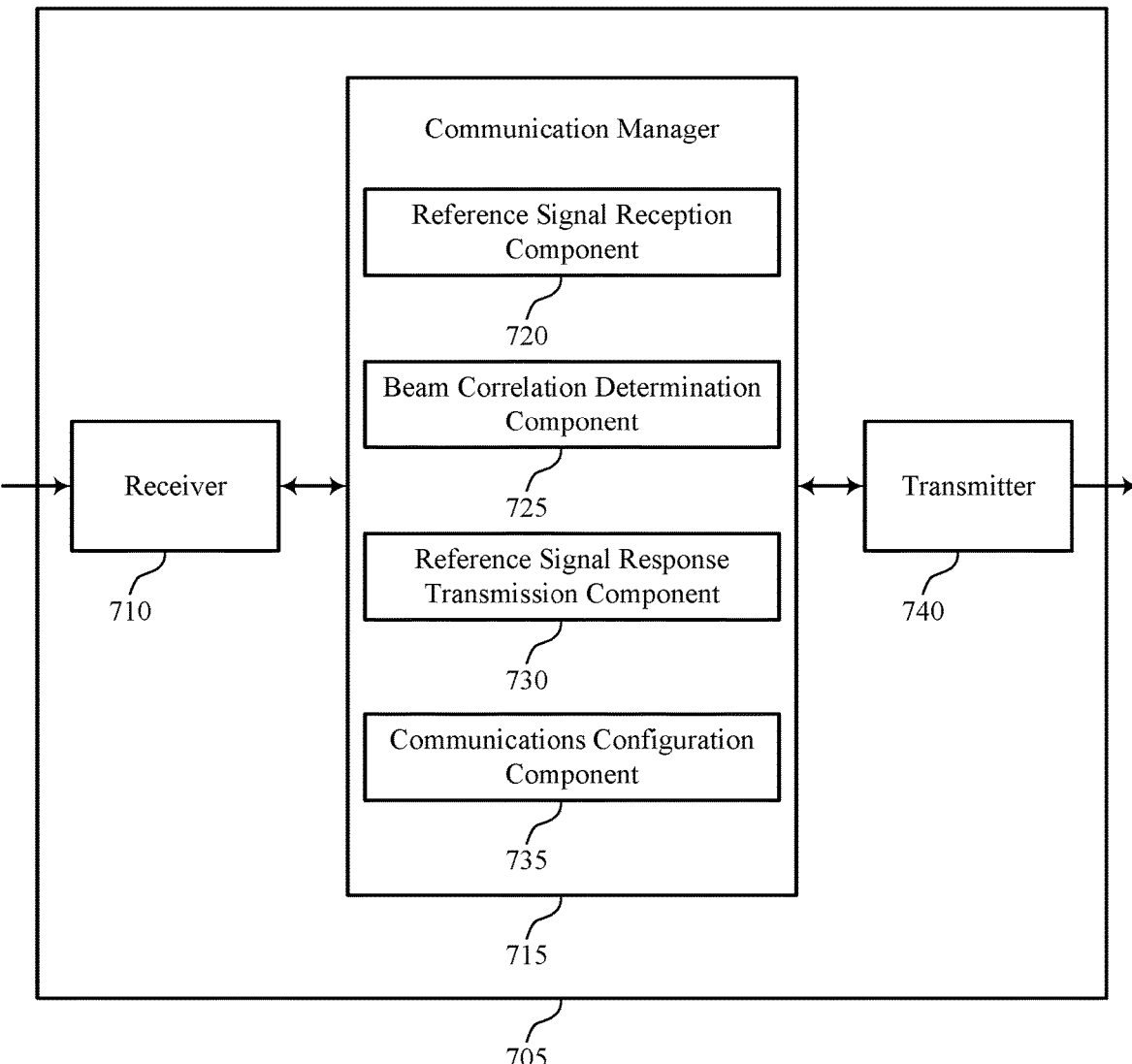
FIG. 7 shows a block diagram of a device that supports beam correlation for carrier aggregation in accordance with one or more aspects of the present disclosure.

FIG. 7 shows a block diagram 700 of a device 705 that supports beam correlation for carrier aggregation in accordance with one or more aspects of the present disclosure. The device 705 may be an example of aspects of a device 405, a UE 115, or a base station 105 as described herein. The device 705 may include a receiver 710, a communication manager 715, and a transmitter 740. The device 705 may also include a processor. Each of these components may be in communication with one another (e.g., via one or more buses).

The receiver 710 may receive information such as packets, user data, or control information associated with various information channels (e.g., control channels, data channels, and information related to beam correlation for carrier aggregation, etc.). Information may be passed on to other components of the device 705. The receiver 710 may be an example of aspects of the transceiver 915 described with reference to FIG. 9 or the transceiver 1020 described with reference to FIG. 10. The receiver 710 may utilize a single antenna or a set of antennas. The receiver 710 may include one or more RF chains, and when multiple RF chains are included, the receiver 710 may support separate receptions at different ones of the multiple RF chains.

The transmitter 740 may transmit signals generated by other components of the device 705. In some examples, the transmitter 740 may be collocated with a receiver 710 in a transceiver module. For example, the transmitter 740 may be an example of aspects of the transceiver 915 described with reference to FIG. 9 or the transceiver 1020 described with reference to FIG. 10. The transmitter 740 may utilize a single antenna or a set of antennas. The transmitter 740 may include one or more RF chains, and when multiple RF chains are included, the transmitter 740 may support separate transmissions at different ones of the multiple RF chains.

The communication manager 715 may be an example of aspects of the communication manager 415 as described herein. The communication manager 715 may include a reference signal reception component 720, a beam correlation determination component 725, a reference signal response transmission component 730, and a communications configuration component 735. The communication manager 715 may be an example of aspects of the communication manager 910 or 1010 as described herein.

The reference signal reception component 720 may receive a first reference signal from another device over a first beam using a first component carrier during a first time interval and receive a second reference signal from the other device over a second beam using a second component carrier during a second time interval that at least partially overlaps with the first time interval.

The beam correlation determination component 725 may determine a beam correlation metric that is based on receiving the first reference signal over the first beam and receiving the second reference signal over the second beam.

The reference signal response transmission component 730 may transmit a response to the other device based on a beam correlation metric that is based on receiving the first reference signal over the first beam and receiving the second reference signal over the second beam.

The communications configuration component 735 may configure the device 705 for communications with the other device according to a carrier aggregation configuration based on transmitting the response to the other device. In some examples, the communications configuration component 735 may transmit signaling including parameters to enable carrier aggregation at the device 705 to communicate with the other device according to carrier aggregation configuration parameters, transmitting the signaling may be based on transmitting the response to the other device.

Figure 8:
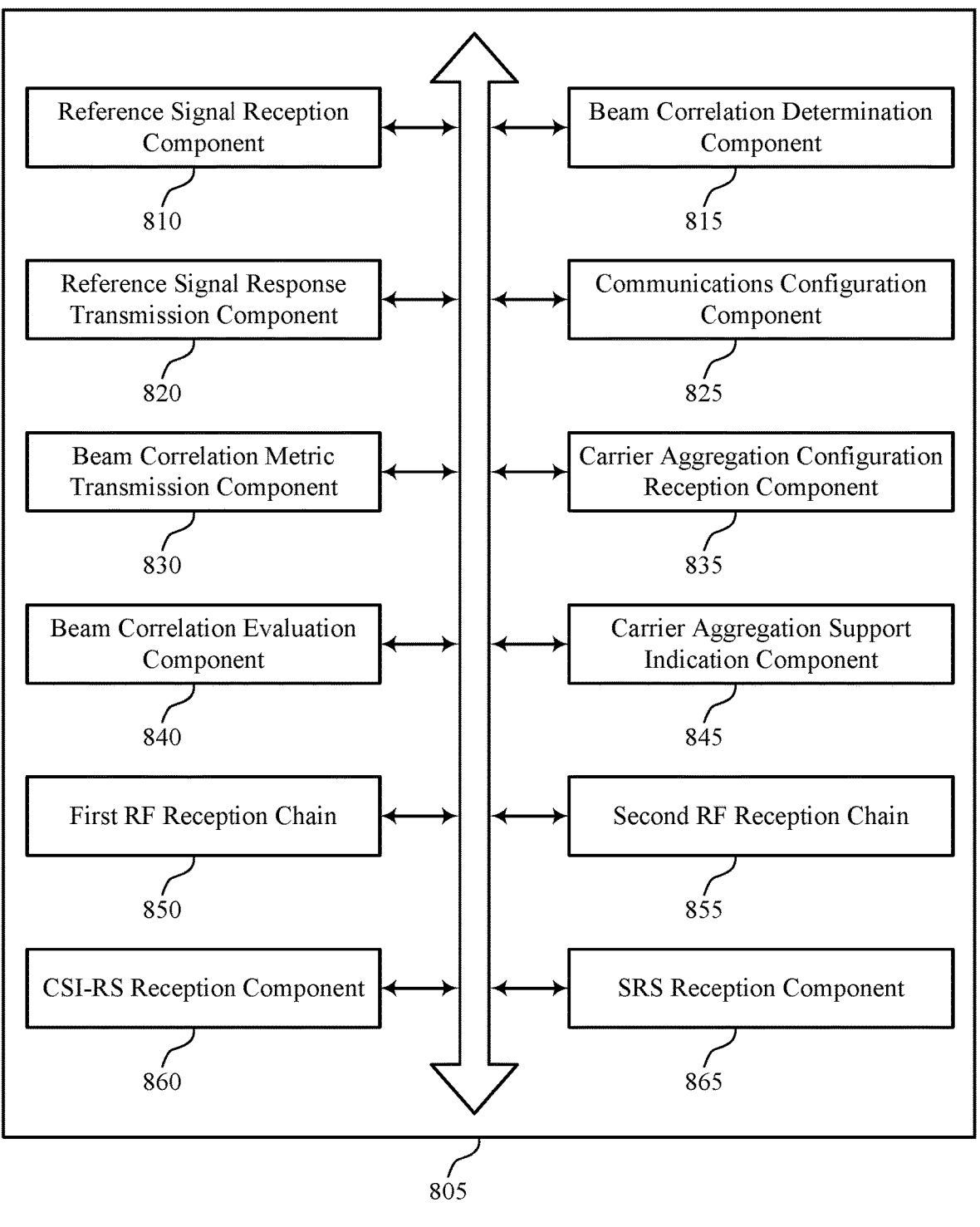
FIG. 8 shows a block diagram of a communication manager that supports beam correlation for carrier aggregation in accordance with one or more aspects of the present disclosure.

FIG. 8 shows a block diagram 800 of a communication manager 805 that supports beam correlation for carrier aggregation in accordance with one or more aspects of the present disclosure. The communication manager 805 may be an example of aspects of a communication manager 415, a communication manager 715, a communication manager 910, or a communication manager 1010 described herein. The communication manager 805 may include a reference signal reception component 810, a beam correlation determination component 815, a reference signal response transmission component 820, a communications configuration component 825, a beam correlation metric transmission component 830, a carrier aggregation configuration reception component 835, a beam correlation evaluation component 840, a carrier aggregation support indication component 845, a first RF reception chain 850, a second RF reception chain 855, a CSI-RS reception component 860, and an SRS reception component 865. Each of these modules may communicate, directly or indirectly, with one another (e.g., via one or more buses).

The reference signal reception component 810 may receive, at a first device, a first reference signal from a second device over a first beam using a first component carrier during a first time interval.

In some examples, the reference signal reception component 810 may receive, at the first device, a second reference signal from the second device over a second beam using a second component carrier during a second time interval that at least partially overlaps with the first time interval. In various examples, the second component carrier may be included in a different frequency band than the first component carrier, or in the same frequency band as the first component carrier.

In some examples, receiving the first reference signal includes receiving the first reference signal during a first symbol duration and receiving the second reference signal includes receiving the second reference signal during a second symbol duration that is synchronized at the first device with the first symbol duration. In some examples, the first symbol duration and the second symbol duration may span a same time interval (e.g., based on the synchronization).

In some examples, receiving the first reference signal includes receiving the first reference signal over a first millimeter wave band and receiving the second reference signal includes receiving the second reference signal over a second millimeter wave band that is non-overlapping with the first millimeter wave band.

In some examples, receiving the first reference signal includes receiving the first reference signal using a first resource block, and receiving the second reference signal includes receiving the second reference signal using a second resource block that is non-overlapping in a frequency domain with the first resource block.

In some examples, receiving the first reference signal includes receiving the first reference signal using the first RF reception chain 850, and receiving the second reference signal includes receiving the second reference signal using the second RF reception chain 855. In some examples, receiving the first reference signal includes receiving the first reference signal using the first RF reception chain 850, and receiving the second reference signal includes receiving the second reference signal using the first RF reception chain 850. In some examples, receiving the first reference signal includes receiving the first reference signal using the second RF reception chain 855, and receiving the second reference signal includes receiving the second reference signal using the second RF reception chain 855. Although the first RF reception chain 850 and the second RF reception chain 855 are illustrated as being part of the communication manager 805, in some examples, at least a portion of the first RF reception chain 850 and the second RF reception chain 855 may be considered to be part of a receiver (e.g., within the illustrative boundaries of a receiver 410 or 710 as described with reference to FIGS. 4 and 7)

The beam correlation determination component 815 may determine, at the first device, a beam correlation metric that is based on receiving the first reference signal over the first beam and receiving the second reference signal over the second beam.

In some examples, the beam correlation determination component 815 may determine the beam correlation metric based on an angle of separation between a first direction of peak received power at the first device of the first reference signal over the first beam and a second direction of peak received power at the first device of the second reference signal over the second beam.

In some examples, the beam correlation determination component 815 may determine the beam correlation metric based on a difference between a first digital beamforming codebook entry or direction corresponding to a highest received power of the first reference signal at the first device and a second digital beamforming codebook entry or direction corresponding to a highest received power of the second reference signal at the first device.

In some examples, the beam correlation determination component 815 may determine the beam correlation metric based on a comparison between a first analog beamforming codebook entry or direction corresponding to a highest received power of the first reference signal at the first device and a second analog beamforming codebook entry or direction corresponding to a highest received power of the second reference signal at the first device.

In some examples, the beam correlation determination component 815 may determine the beam correlation metric based on a comparison between an analog beamforming codebook entry or direction corresponding to a highest received power of the first reference signal at the first device and a digital beamforming codebook entry or direction corresponding to a highest received power of the second reference signal at the first device.

The reference signal response transmission component 820 may transmit a response to the second device based on a beam correlation metric that is based on receiving the first reference signal over the first beam and receiving the second reference signal over the second beam.

The communications configuration component 825 may configure the first device for communications with the second device according to a carrier aggregation configuration based on transmitting the response to the second device. In various examples, the configuring may include an inter-band carrier aggregation configuration, an intra-band carrier aggregation configuration, or both. In some examples, the communications configuration component 825 may transmit signaling including parameters to enable carrier aggregation at the first device to communicate with the second device according to carrier aggregation configuration parameters, transmitting the signaling may be based on transmitting the response to the second device.

In some examples (e.g., when the communication manager 805 is associated with a UE or CPE), the communications configuration component 825 may configure the first device for downlink communications with the second device according to the carrier aggregation configuration.

In some examples (e.g., when the communication manager 805 is associated with a base station or IAB node), the communications configuration component 825 may configure the first device for uplink communications with the second device according to the carrier aggregation configuration.

The beam correlation metric transmission component 830 may transmit (e.g., in cooperation with the reference signal response transmission component 820) the determined beam correlation metric to the second device.

The carrier aggregation configuration reception component 835 may receive configuration information from the second device that is responsive to the transmitted beam correlation metric, and configuring the first device for communications with the second device according to the carrier aggregation configuration may be based on the configuration information.

In some examples, the beam correlation evaluation component 840 may determine, at the first device, that the beam correlation metric satisfies (e.g., is greater than or equal to) a threshold. In some examples, the beam correlation evaluation component 840 may transmit (e.g., in cooperation with the reference signal response transmission component 820) an indication that the beam correlation metric satisfies (e.g., is greater than or equal to) the threshold.

In some examples, the beam correlation evaluation component 840 may determine, at the first device, that the beam correlation metric does not satisfy (e.g., is less than or equal to) a threshold. In some examples, the beam correlation evaluation component 840 may transmit (e.g., in cooperation with the reference signal response transmission component 820) an indication that the beam correlation metric does not satisfy (e.g., is less than or equal to) the threshold.

In some examples, the carrier aggregation support indication component 845 may transmit (e.g., in cooperation with the reference signal response transmission component 820) an indication that the carrier aggregation configuration is supported by the first device over the first beam (e.g., using the first component carrier) and over the second beam (e.g., using the second component carrier).

In some examples, the carrier aggregation support indication component 845 may transmit (e.g., in cooperation with the reference signal response transmission component 820) an indication to the second device to refrain from communication according to the carrier aggregation configuration over the first beam (e.g., using the first component carrier) and over the second beam (e.g., using the second component carrier).

In some examples, to receive a first and second reference signal, the CSI-RS reception component 860 may receive a first channel state information reference signal (CSI-RS) over the first beam using the first component carrier and receive a second CSI-RS over the second beam using the second component carrier.

In some examples, to receive a first and second reference signal, the SRS reception component 865 may receive a first SRS over the first beam using the first component carrier, and receive a second SRS over the second beam using the second component carrier.

Figure 9:
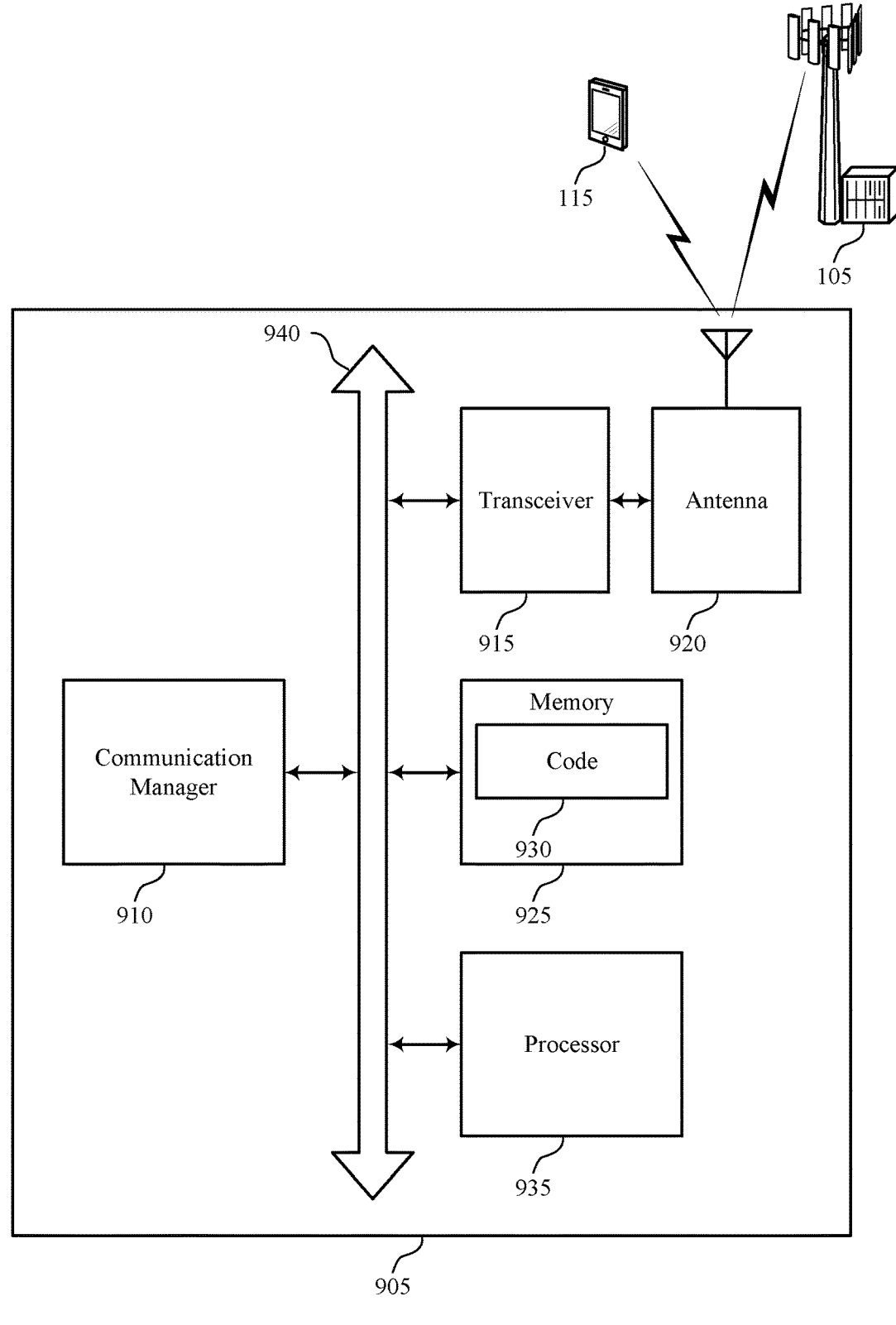
FIG. 9 shows a diagram of a system including a UE that supports beam correlation for carrier aggregation in accordance with one or more aspects of the present disclosure.

FIG. 9 shows a diagram of a system 900 including a device 905 that supports beam correlation for carrier aggregation in accordance with one or more aspects of the present disclosure. The device 905 may be an example of or include the components of device 405, device 505, a device 705, or a UE 115 as described herein. The device 905 may include components for bi-directional voice and data communications including components for transmitting and receiving communications, including a communication manager 910, a transceiver 915, an antenna 920, memory 925, and a processor 935. These components may be in electronic communication via one or more buses (e.g., bus 940).

The transceiver 915 may communicate bi-directionally, via one or more antennas, wired, or wireless links as described herein. For example, the transceiver 915 may represent a wireless transceiver and may communicate bi-directionally with another wireless transceiver. The transceiver 915 may also include a modem to modulate the packets and provide the modulated packets to the antennas for transmission, and to demodulate packets received from the antennas. The transceiver 915 may include one or more RF chains, and when multiple RF chains are included, the transceiver 915 may support separate transmissions or receptions at different ones of the multiple RF chains. In some examples, multiple RF chains may be co-located in a single transceiver component, or different ones of multiple RF chains may be separately located in different transceiver components of the device 905. In some examples, different transceiver components of the device 905 may be associated with different directions of transmission or reception.

In some cases, the device 905 may include a single antenna 920. However, in some cases the device may have more than one antenna 920, which may be capable of concurrently transmitting or receiving multiple wireless transmissions. In some examples, different antennas 920 may be co-located with different transceiver components of the device 905, and different antennas 920 may or may not be associated with different directions of transmission or reception.

The memory 925 may include random-access memory (RAM) and read-only memory (ROM). The memory 925 may store computer-readable, computer-executable code 930 including instructions that, when executed, cause the processor to perform various functions described herein. In some cases, the memory 925 may contain, among other things, a basic input/output system (BIOS) which may control basic hardware or software operation such as the interaction with peripheral components or devices.

The code 930 may include instructions to implement aspects of the present disclosure, including instructions to support wireless communications. The code 930 may be stored in a non-transitory computer-readable medium such as system memory or other type of memory. In some cases, the code 930 may not be directly executable by the processor 935 but may cause a computer (e.g., when compiled and executed) to perform functions described herein.

The processor 935 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 935 may be configured to operate a memory array using a memory controller. In other cases, a memory controller may be integrated into the processor 935. The processor 935 may be configured to execute computer-readable instructions stored in a memory (e.g., the memory 925) to cause the device 905 to perform various functions (e.g., functions or tasks supporting beam correlation for carrier aggregation).

In some examples, the communication manager 910 may determine a carrier aggregation configuration associated with a first component carrier and a second component carrier. In some examples, the communication manager 910 may transmit, based on a carrier aggregation configuration associated with a first component carrier and a second component carrier, a first reference signal to another device (e.g., a UE 115, a base station 105) over a first beam using the first component carrier during a first time interval, transmit, based on the carrier aggregation configuration, a second reference signal to the other device over a second beam using the second component carrier during a second time interval that at least partially overlaps with the first time interval, receive a response from the other device that is based on the first reference signal and the second reference signal, and transmit signaling including parameters to enable carrier aggregation at the other device, the parameters associated with the carrier aggregation configuration based on the response from the other device.

In some examples, the communication manager 910 may receive a first reference signal from another device (e.g., a UE 115, a base station 105) over a first beam using a first component carrier during a first time interval, receive a second reference signal from the other device over a second beam using a second component carrier during a second time interval that at least partially overlaps with the first time interval. In some examples, the communication manager 910 may determine a beam correlation metric that is based on receiving the first reference signal over the first beam and receiving the second reference signal over the second beam. In some examples, the communication manager 910 may transmit a response to the other device based on a beam correlation metric that is based on receiving the first reference signal over the first beam and receiving the second reference signal over the second beam and transmit signaling including parameters to enable carrier aggregation at the device 905 to communicate with the other device according to carrier aggregation configuration parameters, transmitting the signaling may be based on transmitting the response to the other device.

Figure 10:
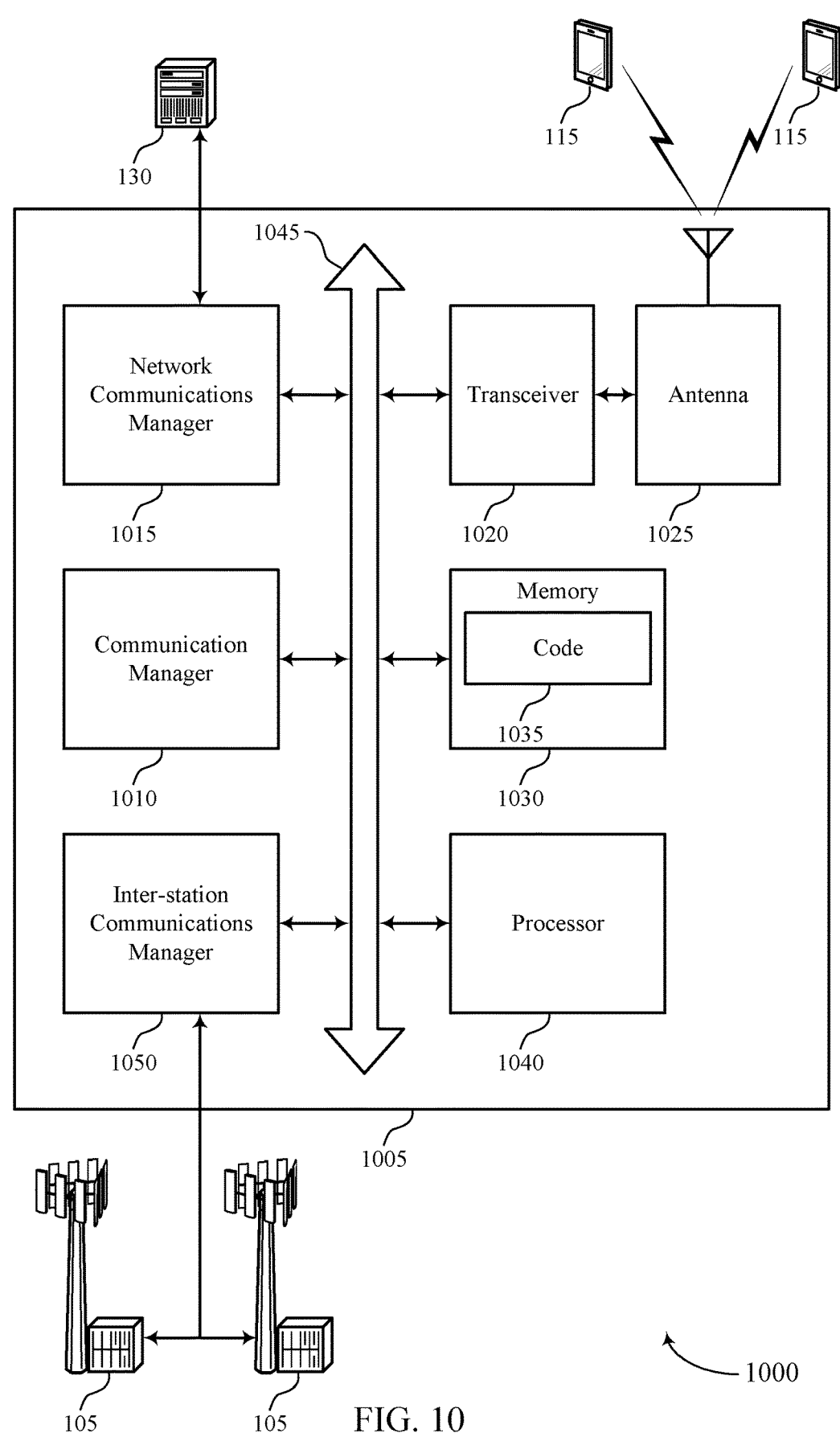
FIG. 10 shows a diagram of a system including a base station that supports beam correlation for carrier aggregation in accordance with one or more aspects of the present disclosure.

FIG. 10 shows a diagram of a system 1000 including a device 1005 that supports beam correlation for carrier aggregation in accordance with one or more aspects of the present disclosure. The device 1005 may be an example of or include the components of device 405, device 505, device 705, or a base station 105 as described herein. The device 1005 may include components for bi-directional voice and data communications including components for transmitting and receiving communications, including a communication manager 1010, a network communications manager 1015, a transceiver 1020, an antenna 1025, memory 1030, an inter-station communications manager 1050, and a processor 1040. These components may be in electronic communication via one or more buses (e.g., bus 1045).

The network communications manager 1015 may manage communications with the core network (e.g., via one or more wired backhaul links). For example, the network communications manager 1015 may manage the transfer of data communications for client devices, such as one or more UEs 115.

The transceiver 1020 may communicate bi-directionally, via one or more antennas, wired, or wireless links as described herein. For example, the transceiver 1020 may represent a wireless transceiver and may communicate bi-directionally with another wireless transceiver. The transceiver 1020 may also include a modem to modulate the packets and provide the modulated packets to the antennas for transmission, and to demodulate packets received from the antennas. The transceiver 1020 may include one or more RF chains, and when multiple RF chains are included, the transceiver 1020 may support separate transmissions or receptions at different ones of the multiple RF chains. In some examples, multiple RF chains may be co-located in a single transceiver component, or different ones of multiple RF chains may be separately located in different transceiver components of the device 1005. In some examples, different transceiver components of the device 1005 may be associated with different directions of transmission or reception.

In some cases, the device 1005 may include a single antenna 1025. However, in some cases, the device may have more than one antenna 1025, which may be capable of concurrently transmitting or receiving multiple wireless transmissions. In some examples, different antennas 1025 may be co-located with different transceiver components of the device 1005, and different antennas 1025 may or may not be associated with different directions of transmission or reception.

The memory 1030 may include RAM and ROM. The memory 1030 may store computer-readable, computer-executable code 1035 including instructions that, when executed, cause the processor to perform various functions described herein. In some cases, the memory 1030 may contain, among other things, a BIOS which may control basic hardware or software operation such as the interaction with peripheral components or devices.

The code 1035 may include instructions to implement aspects of the present disclosure, including instructions to support wireless communications. The code 1035 may be stored in a non-transitory computer-readable medium such as system memory or other type of memory. In some cases, the code 1035 may not be directly executable by the processor 1040 but may cause a computer (e.g., when compiled and executed) to perform functions described herein.

The processor 1040 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting beam correlation for carrier aggregation).

The inter-station communications manager 1050 may manage communications with other base station 105, and may include a controller or scheduler for controlling communications with UEs 115 in cooperation with other base stations 105. For example, the inter-station communications manager 1050 may coordinate scheduling for transmissions to UEs 115 for various interference mitigation techniques such as beamforming or joint transmission. In some examples, the inter-station communications manager 1050 may provide an X2 interface within an LTE/LTE-A wireless communication network technology to provide communication between base stations 105.

In some examples, the communication manager 1010 may determine a carrier aggregation configuration associated with a first component carrier and a second component carrier. In some examples, the communication manager 1010 may transmit, based on a carrier aggregation configuration associated with a first component carrier and a second component carrier, a first reference signal to another device (e.g., a UE 115, a base station 105) over a first beam using the first component carrier during a first time interval, transmit, based on the carrier aggregation configuration, a second reference signal to the other device over a second beam using the second component carrier during a second time interval that at least partially overlaps with the first time interval, receive a response from the other device that is based on the first reference signal and the second reference signal, and transmit signaling including parameters to enable carrier aggregation at the other device, the parameters associated with the carrier aggregation configuration based on the response from the other device.

In some examples, the communication manager 1010 may receive a first reference signal from another device (e.g., a UE 115, a base station 105) over a first beam using a first component carrier during a first time interval, and receive a second reference signal from the other device over a second beam using a second component carrier during a second time interval that at least partially overlaps with the first time interval. In some examples, the communication manager 1010 may determine a beam correlation metric that is based on receiving the first reference signal over the first beam and receiving the second reference signal over the second beam. In some examples, the communication manager 1010 may transmit a response to the other device based on a beam correlation metric that is based on receiving the first reference signal over the first beam and receiving the second reference signal over the second beam, and transmit signaling including parameters to enable carrier aggregation at the device 1005 to communicate with the other device according to carrier aggregation configuration parameters, transmitting the signaling may be based on transmitting the response to the other device.

FIG. 11 shows a flowchart illustrating a method 1100 that supports beam correlation for carrier aggregation in accordance with one or more aspects of the present disclosure. The operations of method 1100 may be implemented by a UE 115 or base station 105 or its components as described herein. For example, the operations of method 1100 may be performed by a communication manager as described with reference to FIGS. 1 through 10. In some examples, a UE or base station may execute a set of instructions to control the functional elements of the UE or base station to perform the described functions. Additionally or alternatively, a UE or base station may perform aspects of the described functions using special-purpose hardware.

In some cases, the UE or base station may determine (e.g., at a first device) a carrier aggregation configuration associated with a first component carrier and a second component carrier. Such operations of may be performed according to the methods described herein. In some examples, aspects of such operations may be performed by a carrier aggregation configuration component as described with reference to FIGS. 1 through 10.

At 1105, the UE or base station may transmit, based at least in part on a carrier aggregation configuration associated with a first component carrier and a second component carrier, a first reference signal to a second device over a first beam using the first component carrier during a first time interval. The operations of 1105 may be performed according to the methods described herein. In some examples, aspects of the operations of 1105 may be performed by a reference signal transmission component as described with reference to FIGS. 1 through 10.

At 1110, the UE or base station may transmit, based at least in part on the carrier aggregation configuration, a second reference signal to the second device over a second beam using the second component carrier during a second time interval that at least partially overlaps with the first time interval. The operations of 1110 may be performed according to the methods described herein. In some examples, aspects of the operations of 1110 may be performed by a reference signal transmission component as described with reference to FIGS. 1 through 10.

At 1115, the UE or base station may receive (e.g., at a first device) a response from the second device that is based at least in part on the first reference signal and the second reference signal. The operations of 1115 may be performed according to the methods described herein. In some examples, aspects of the operations of 1115 may be performed by a reference signal response reception component as described with reference to FIGS. 1 through 10.

At 1120, the UE or base station may transmit signaling including parameters to enable carrier aggregation at the second device, the parameters associated with the carrier aggregation configuration based at least in part on the response from the second device. The operations of 1120 may be performed according to the methods described herein. In some examples, aspects of the operations of 1120 may be performed by a communications configuration component as described with reference to FIGS. 1 through 10.

Figure 12:
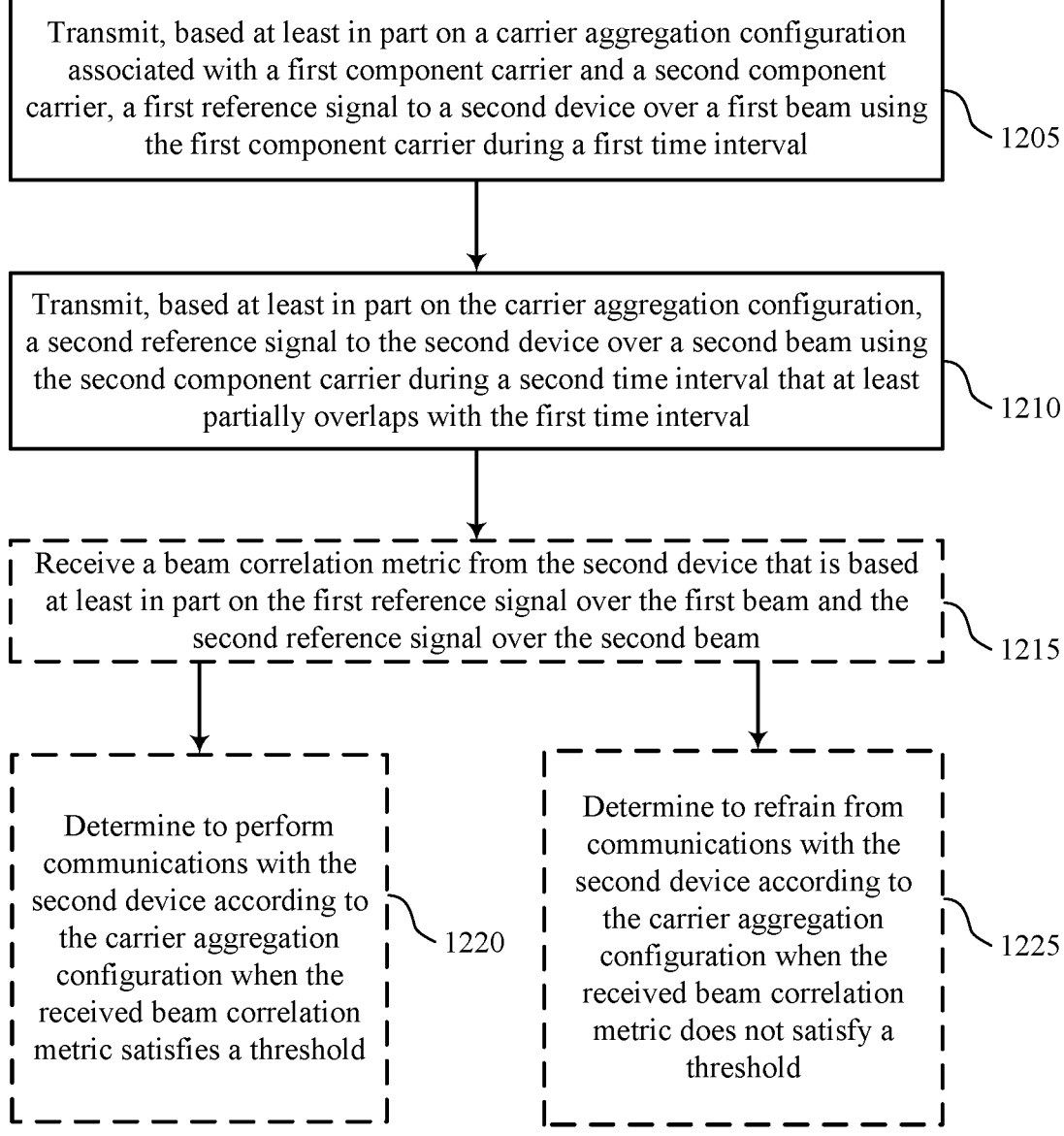

FIG. 12 shows a flowchart illustrating a method 1200 that supports beam correlation for carrier aggregation in accordance with one or more aspects of the present disclosure. The operations of method 1200 may be implemented by a UE 115 or base station 105 or its components as described herein. For example, the operations of method 1200 may be performed by a communication manager as described with reference to FIGS. 1 through 10. In some examples, a UE or base station may execute a set of instructions to control the functional elements of the UE or base station to perform the described functions. Additionally or alternatively, a UE or base station may perform aspects of the described functions using special-purpose hardware.

In some cases, the UE or base station may determine (e.g., at a first device) a carrier aggregation configuration associated with a first component carrier and a second component carrier. Such operations may be performed according to the methods described herein. In some examples, aspects of such operations may be performed by a carrier aggregation configuration component as described with reference to FIGS. 1 through 10.

At 1205, the UE or base station may transmit, based at least in part on a carrier aggregation configuration associated with a first component carrier and a second component carrier, a first reference signal to a second device over a first beam using the first component carrier during a first time interval. The operations of 1205 may be performed according to the methods described herein. In some examples, aspects of the operations of 1205 may be performed by a reference signal transmission component as described with reference to FIGS. 1 through 10.

At 1210, the UE or base station may transmit, based at least in part on the carrier aggregation configuration, a second reference signal to the second device over a second beam using the second component carrier during a second time interval that at least partially overlaps with the first time interval. The operations of 1210 may be performed according to the methods described herein. In some examples, aspects of the operations of 1210 may be performed by a reference signal transmission component as described with reference to FIGS. 1 through 10.

At 1215, the UE or base station may receive a beam correlation metric from the second device that is based at least in part on the first reference signal over the first beam and the second reference signal over the second beam. The operations of 1215 may be performed according to the methods described herein. In some examples, aspects of the operations of 1215 may be performed by a beam correlation metric reception component as described with reference to FIGS. 1 through 10. Based on whether or not the beam correlation metric satisfies a threshold, the method 1200 may proceed to 1220 or 1225.

At 1220, the UE or base station may determine to perform the communications with the second device according to the carrier aggregation configuration when the received beam correlation metric satisfies a threshold (e.g., when the beams are well-correlated at the second device, when the received beam correlation metric is greater than or equal to a threshold). The operations of 1220 may be performed according to the methods described herein. In some examples, aspects of the operations of 1220 may be performed by a communications configuration component as described with reference to FIGS. 1 through 10.

At 1225, the UE or base station may determine to refrain from the communications with the second device according to the carrier aggregation configuration when the received beam correlation metric does not satisfy a threshold (e.g., when the beams are not well-correlated at the second device, when the received beam correlation metric is less than or equal to a threshold). The operations of 1225 may be performed according to the methods described herein. In some examples, aspects of the operations of 1225 may be performed by a communications configuration component as described with reference to FIGS. 1 through 10.

FIG. 13 shows a flowchart illustrating a method 1300 that supports beam correlation for carrier aggregation in accordance with one or more aspects of the present disclosure. The operations of method 1300 may be implemented by a UE 115 or base station 105 or its components as described herein. For example, the operations of method 1300 may be performed by a communication manager as described with reference to FIGS. 1 through 10. In some examples, a UE or base station may execute a set of instructions to control the functional elements of the UE or base station to perform the described functions. Additionally or alternatively, a UE or base station may perform aspects of the described functions using special-purpose hardware.

At 1305, the UE or base station may receive (e.g., at a first device) a first reference signal from a second device over a first beam using a first component carrier during a first time interval. The operations of 1305 may be performed according to the methods described herein. In some examples, aspects of the operations of 1305 may be performed by a reference signal reception component as described with reference to FIGS. 1 through 10.

At 1310, the UE or base station may receive (e.g., at the first device) a second reference signal from the second device over a second beam using a second component carrier during a second time interval that at least partially overlaps with the first time interval. The operations of 1310 may be performed according to the methods described herein. In some examples, aspects of the operations of 1310 may be performed by a reference signal reception component as described with reference to FIGS. 1 through 10.

In some cases, the UE or base station may determine (e.g., at the first device) a beam correlation metric that is based at least in part on receiving the first reference signal over the first beam and receiving the second reference signal over the second beam. Such operations may be performed according to the methods described herein. In some examples, aspects of such operations may be performed by a beam correlation determination component as described with reference to FIGS. 1 through 10.

At 1315, the UE or base station may transmit a response to the second device based at least in part on determining the beam correlation metric. The operations of 1315 may be performed according to the methods described herein. In some examples, aspects of the operations of 1315 may be performed by a reference signal response transmission component as described with reference to FIGS. 1 through 10.

At 1320, the UE or base station may transmit signaling including parameters to enable carrier aggregation (e.g., at the first device) to communicate with the second device according to carrier aggregation configuration parameters, transmitting the signaling may be based at least in part on transmitting the response to the second device. The operations of 1320 may be performed according to the methods described herein. In some examples, aspects of the operations of 1320 may be performed by a communications configuration component as described with reference to FIGS. 1 through 10.

Figure 14:
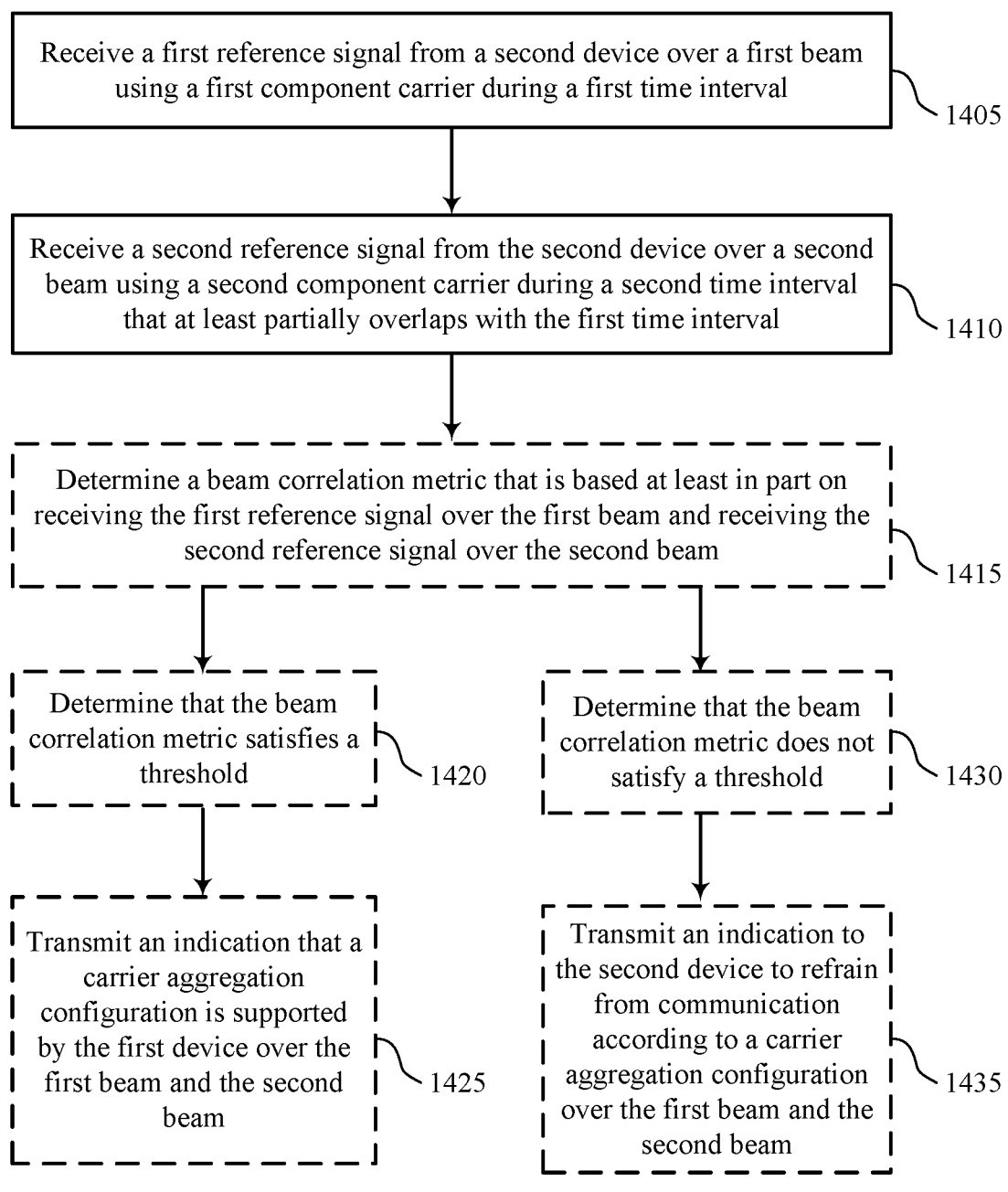

FIG. 14 shows a flowchart illustrating a method 1400 that supports beam correlation for carrier aggregation in accordance with one or more aspects of the present disclosure. The operations of method 1400 may be implemented by a UE 115 or base station 105 or its components as described herein. For example, the operations of method 1400 may be performed by a communication manager as described with reference to FIGS. 1 through 10. In some examples, a UE or base station may execute a set of instructions to control the functional elements of the UE or base station to perform the described functions. Additionally or alternatively, a UE or base station may perform aspects of the described functions using special-purpose hardware.

At 1405, the UE or base station may receive (e.g., at a first device) a first reference signal from a second device over a first beam using a first component carrier during a first time interval. The operations of 1405 may be performed according to the methods described herein. In some examples, aspects of the operations of 1405 may be performed by a reference signal reception component as described with reference to FIGS. 1 through 10.

At 1410, the UE or base station may receive (e.g., at the first device) a second reference signal from the second device over a second beam using a second component carrier during a second time interval that at least partially overlaps with the first time interval. The operations of 1410 may be performed according to the methods described herein. In some examples, aspects of the operations of 1410 may be performed by a reference signal reception component as described with reference to FIGS. 1 through 10.

At 1415, the UE or base station may determine (e.g., at the first device) a beam correlation metric that is based at least in part on receiving the first reference signal over the first beam and receiving the second reference signal over the second beam. The operations of 1415 may be performed according to the methods described herein. In some examples, aspects of the operations of 1415 may be performed by a beam correlation determination component as described with reference to FIGS. 1 through 10. The method 1400 may proceed to one or both of 1420 or 1430 (e.g., based on whether or not the beam correlation metric satisfies a threshold).

At 1420, the UE or base station may determine (e.g., at the first device) that the beam correlation metric satisfies a threshold (e.g., when the beams are well-correlated at the second device, when the beam correlation metric is greater than or equal to a threshold). The operations of 1420 may be performed according to the methods described herein. In some examples, aspects of the operations of 1420 may be performed by a beam correlation evaluation component as described with reference to FIGS. 1 through 10.

At 1425, the UE or base station may transmit an indication that a carrier aggregation configuration is supported by the first device over the first beam and the second beam (e.g., an indication that the beam correlation metric satisfies the threshold, an indication that the beam correlation metric is greater than or equal to the threshold). The operations of 1425 may be performed according to the methods described herein. In some examples, aspects of the operations of 1425 may be performed by a carrier aggregation support indication component as described with reference to FIGS. 1 through 10. In some examples, the UE or base station may configure (e.g., for the first device) for communications with the second device according to an inter-band or intra-band carrier aggregation configuration based on transmitting the indication at 1425. For example, the UE or base station may configure communications according to an assumption that the second device will implement carrier aggregation configuration using the first beam or the second beam in a subsequent transmission.

At 1430, the UE or base station may determine (e.g., at the first device) that the beam correlation metric does not satisfy a threshold (e.g., when the beams are not well-correlated at the second device, when the beam correlation metric is less than or equal to a threshold). The operations of 1430 may be performed according to the methods described herein. In some examples, aspects of the operations of 1430 may be performed by a beam correlation evaluation component as described with reference to FIGS. 1 through 10.

At 1435, the UE or base station may transmit an indication to the second device to refrain from communication according to a carrier aggregation configuration over the first beam and the second beam (e.g., an indication that the beam correlation metric does not satisfy the threshold, an indication that the beam correlation metric is less than or equal to a threshold). The operations of 1435 may be performed according to the methods described herein. In some examples, aspects of the operations of 1435 may be performed by a carrier aggregation support indication component as described with reference to FIGS. 1 through 10. In some examples, the UE or base station may configure (e.g., for the first device) for refraining from communications with the second device according to an inter-band or intra-band carrier aggregation configuration based on transmitting the indication 1435. For example, the UE or base station may configure communications according to an assumption that the second device will not implement carrier aggregation configuration using the first beam and second beam in a subsequent transmission.

The following provides an overview of examples of the present disclosure:

Aspect 1: A method for wireless communication, comprising: transmitting, based at least in part on a carrier aggregation configuration associated with a first component carrier and a second component carrier, a first reference signal to a second device over a first beam using the first component carrier during a first time interval; transmitting, based at least in part on the carrier aggregation configuration, a second reference signal to the second device over a second beam using the second component carrier during a second time interval that at least partially overlaps with the first time interval; receiving, at a first device, a response from the second device that is based at least in part on the first reference signal and the second reference signal; and transmitting signaling comprising parameters to enable carrier aggregation at the second device, the parameters associated with the carrier aggregation configuration based at least in part on the response from the second device.

Aspect 2: The method of aspect 1, the receiving the response comprising: receiving a beam correlation metric from the second device that is based at least in part on the first reference signal over the first beam and the second reference signal over the second beam.

Aspect 3: The method of aspect 2, the transmitting signaling comprising the parameters to enable carrier aggregation comprising: determining to perform communications with the second device over the first beam using the first component carrier and over the second beam using the second component carrier according to the carrier aggregation configuration when the received beam correlation metric satisfies (e.g., is greater than or equal to) a threshold.

Aspect 4: The method of aspect 2, the transmitting signaling comprising the parameters to enable carrier aggregation comprising: determining to refrain from communications with the second device over the first beam using the first component carrier and over the second beam using the second component carrier according to the carrier aggregation configuration when the received beam correlation metric does not satisfy (e.g., is less than or equal to) a threshold.

Aspect 5: The method of aspect 2, wherein the beam correlation metric is based at least in part on an angle of separation between a first direction of peak received power at the second device of the first reference signal over the first beam and a second direction of peak received power at the second device of the second reference signal over the second beam.

Aspect 6: The method of aspect 2, wherein the beam correlation metric is based at least in part on a difference between a first digital beamforming entry or direction corresponding to a highest received power of the first reference signal at the second device and a second digital beamforming entry or direction corresponding to a highest received power of the second reference signal at the second device.

Aspect 7: The method of aspect 2, wherein the beam correlation metric is based at least in part on a comparison between a first analog beamforming codebook entry or direction corresponding to a highest received power of the first reference signal at the second device and a second analog beamforming codebook entry or direction corresponding to a highest received power.

Aspect 8: The method of aspect 2, wherein the beam correlation metric is based at least in part on a comparison between an analog beamforming codebook entry or direction corresponding to a highest received power of the first reference signal at the second device and a digital beamforming codebook entry or direction corresponding to a highest received power of the second reference signal at the second device.

Aspect 9: The method of 1, wherein: receiving the response comprises receiving an indication from the second device that the carrier aggregation configuration is supported by the second device over the first beam and the second beam; and transmitting the signaling comprising the parameters to enable carrier aggregation at the second device associated with the carrier aggregation configuration comprises determining to perform communications with the second device according to the carrier aggregation configuration based at least in part on the indication that the carrier aggregation configuration is supported by the second device over the first beam and the second beam.

Aspect 10: The method of any one of aspects 1 through 9, wherein transmitting the first reference signal comprises transmitting the first reference signal during a first symbol duration; and transmitting the second reference signal comprises transmitting the second reference signal during a second symbol duration that is synchronized at the first device with the first symbol duration.

Aspect 11: The method of any one of aspects 1 through 10, further comprising: transmitting the first reference signal comprises transmitting the first reference signal using a first radio frequency (RF) chain; and transmitting the second reference signal comprises transmitting the second reference signal using a second RF chain that is different than the first RF chain.

Aspect 12: The method of any one of aspects 1 through 10, further comprising: transmitting the first reference signal comprises transmitting the first reference signal using a first radio frequency (RF) chain; and transmitting the first reference signal comprises transmitting the first reference signal using the first RF chain.

Aspect 13: The method of any one of aspects 1 through 10, wherein: transmitting the first reference signal comprises transmitting the first reference signal over a first millimeter wave band; and transmitting the second reference signal comprises transmitting the second reference signal over a second millimeter wave band that is non-overlapping with the first millimeter wave band.

Aspect 14: The method of any one of aspects 1 through 10, wherein: transmitting the first reference signal comprises transmitting the first reference signal during a first symbol duration; and transmitting the second reference signal comprises transmitting the second reference signal using a second resource block that is non-overlapping in a frequency domain with the first resource block.

Aspect 15: The method of any one of aspects 1 through 14, the transmitting signaling comprising the parameters to enable carrier aggregation comprising: configuring, at the first device, downlink communications with the second device according to the carrier aggregation configuration.

Aspect 16: The method of aspect 15, wherein: transmitting the first reference signal comprises transmitting a first channel state information reference signal (CSI-RS) over the first beam using the first component carrier; and transmitting the second reference signal comprises transmitting a second CSI-RS over the second beam using the second component carrier.

Aspect 17: The method of any one of aspects 1 through 16, the transmitting signaling comprising the parameters to enable carrier aggregation comprising: configuring, at the first device, uplink communications with the second device according to the carrier aggregation configuration.

Aspect 18: The method of aspect 1, wherein: transmitting the first reference signal comprises transmitting a first SRS over the first beam using the first component carrier; and transmitting the second reference signal comprises transmitting a second SRS over the second beam using the second component carrier.

Aspect 19: The method of any one of aspects 1 through 18, wherein the first component carrier and the second component carrier are in different frequency bands.

Aspect 20: The method of any one of aspects 1 through 18, wherein the first component carrier and the second component carrier are in the same frequency band.

Aspect 21: The method of any one of aspects 1 through 18, wherein the carrier aggregation configuration comprises an inter-band carrier aggregation configuration.

Aspect 22: The method of any one of aspects 1 through 18, wherein the carrier aggregation configuration comprises an intra-band carrier aggregation configuration.

Aspect 23: A method for wireless communication, comprising receiving, at a first device, a first reference signal from a second device over a first beam using a first component carrier during a first time interval; receiving, at the first device, a second reference signal from the second device over a second beam using a second component carrier during a second time interval that at least partially overlaps with the first time interval; transmitting a response to the second device based at least in part on determining a beam correlation metric that is based at least in part on receiving the first reference signal over the first beam and receiving the second reference signal over the second beam; and transmitting signaling comprising parameters to enable carrier aggregation at the first device to communicate with the second device according to carrier aggregation configuration parameters, transmitting the signaling may be based at least in part on transmitting the response to the second device.

Aspect 24: The method of aspect 23, wherein: transmitting the response comprises transmitting a determined beam correlation metric to the second device; and transmitting the signaling comprising the parameters to enable carrier aggregation at the first device for communications with the second device according to the carrier aggregation configuration comprises receiving configuration information from the second device that is responsive to the transmitted beam correlation metric.

Aspect 25: The method of aspect 23 or 24, further comprising: determining the beam correlation metric based at least in part on an angle of separation between a first direction of peak received power at the first device of the first reference signal over the first beam and a second direction of peak received power at the first device of the second reference signal over the second beam.

Aspect 26: The method of aspect 23 or 24, further comprising: determining the beam correlation metric based at least in part on a difference between a first digital beamforming direction corresponding to a highest received power of the first reference signal at the first device and a second digital beamforming direction corresponding to a highest received power of the second reference signal at the first device.

Aspect 27: The method of aspect 23 or 24, further comprising: determining the beam correlation metric based at least in part on a comparison between a first analog beamforming codebook entry or direction corresponding to a highest received power of the first reference signal at the first device and a second analog beamforming codebook entry or direction corresponding to a highest received power of the second reference signal at the first device.

Aspect 28: The method of aspect 23 or 24, further comprising: determining the beam correlation metric based at least in part on a comparison between an analog beamforming codebook corresponding to a highest received power of the first reference signal at the first device and a digital beamforming direction corresponding to a highest received power of the second reference signal at the first device.

Aspect 29: The method of any one of aspects 23 through 28, further comprising: determining, at the first device, that the beam correlation metric satisfies (e.g., is greater than or equal to) a threshold, wherein transmitting the response comprises transmitting an indication that the beam correlation metric satisfies (e.g., is greater than or equal to) the threshold.

Aspect 30: The method of aspect 29, the transmitting the indication that the beam correlation metric satisfies the threshold comprising: transmitting an indication that the carrier aggregation configuration is supported by the first device over the first beam using the first component carrier and over the second beam using the second component carrier.

Aspect 31: The method of any one of aspects 23 through 28, further comprising determining, at the first device, that the beam correlation metric does not satisfy (e.g., is less than or equal to) a threshold, wherein transmitting the response comprises transmitting an indication that the beam correlation metric does not satisfy (e.g., is less than or equal to) the threshold.

Aspect 32: The method of aspect 31, the transmitting the indication that the beam correlation metric satisfies the threshold comprising: transmitting an indication to the second device to refrain from communication according to the carrier aggregation configuration over the first beam using the first component carrier and over the second beam using the second component carrier.

Aspect 33: The method of any one of aspects 23 through 32, wherein: receiving the first reference signal comprises receiving the first reference signal during a first symbol duration; and receiving the second reference signal comprises receiving the second reference signal during a second symbol duration that is synchronized at the first device with the first symbol duration.

Aspect 34: The method of any of any one of aspects 23 through 33, wherein: receiving the first reference signal comprises receiving the first reference signal using a first radio frequency (RF) chain; and receiving the second reference signal comprises receiving the second reference signal using a second RF chain that is different than the first RF chain.

Aspect 35: The method of any one of aspects 23 through 33, wherein: receiving the first reference signal comprises receiving the first reference signal using a first radio frequency (RF) chain; and receiving the second reference signal comprises receiving the second reference signal using the first RF chain.

Aspect 36: The method of any one of aspects 23 through 33, wherein: receiving the first reference signal comprises receiving the first reference signal over a first millimeter wave band; and receiving the second reference signal comprises receiving the second reference signal over a second millimeter wave band that is non-overlapping with the first millimeter wave band.

Aspect 37: The method of any one of aspects 23 through 33, wherein: receiving the first reference signal comprises receiving the first reference signal during a first symbol duration; and receiving the second reference signal comprises receiving the second reference signal using a second resource block that is non-overlapping in a frequency domain with the first resource block.

Aspect 38: The method of any one of aspects 23 through 33, the transmitting signaling comprising the parameters to enable carrier aggregation comprising: configuring the first device for downlink communications with the second device according to the carrier aggregation configuration.

Aspect 39: The method of aspect 38, wherein: receiving the first reference signal comprises receiving a first channel state information reference signal (CSI-RS) over the first beam using the first component carrier; and receiving the second reference signal comprises receiving a second CSI-RS over the second beam using the second component carrier.

Aspect 40: The method of any one of aspects 23 through 39, the transmitting signaling comprising the parameters to enable carrier aggregation comprising: configuring the first device for uplink communications with the second device according to the carrier aggregation configuration.

Aspect 41: The method of aspect 40, wherein: receiving the first reference signal comprises receiving a first SRS over the first beam using the first component carrier; and receiving the second reference signal comprises receiving a second SRS over the second beam using the second component carrier.

Aspect 42: The method of any one of aspects 23 through 41, wherein the first component carrier and the second component carrier are in different frequency bands.

Aspect 43: The method of any one of aspects 23 through 41, wherein the first component carrier and the second component carrier are in the same frequency band.

Aspect 44: The method of any one of aspects 23 through 41, wherein the carrier aggregation configuration comprises an inter-band carrier aggregation configuration.

Aspect 45: The method of any one of aspects 23 through 41, wherein the carrier aggregation configuration comprises an intra-band carrier aggregation configuration.

Aspect 46: An apparatus for wireless communication comprising at least one means for performing a method of any one of aspects 1 through 22.

Aspect 47: An apparatus for wireless communication comprising a processor and memory coupled to the processor, the processor and memory configured to perform a method of any one of aspects 1 through 22.

Aspect 48: A non-transitory computer-readable medium storing code for wireless communication comprising a processor, memory in electronic communication with the processor, and instructions stored in the memory and executable by the processor to cause the apparatus to perform a method of any one of aspects 1 through 22.

Aspect 49: An apparatus for wireless communication comprising at least one means for performing a method of any one of aspects 23 through 45.

Aspect 50: An apparatus for wireless communication comprising a processor and memory coupled to the processor, the processor and memory configured to perform a method of any one of aspects 23 through 45.

Aspect 51: A non-transitory computer-readable medium storing code for wireless communication comprising a processor, memory in electronic communication with the processor, and instructions stored in the memory and executable by the processor to cause the apparatus to perform a method of any one of aspects 23 through 45.

Aspect 52: A method for wireless communication, comprising: determining, at a first device, a carrier aggregation configuration associated with a first component carrier and a second component carrier; transmitting, based at least in part on identifying the carrier aggregation configuration, a first reference signal to a second device over a first beam using the first component carrier during a first time interval; transmitting, based at least in part on identifying the carrier aggregation configuration, a second reference signal to the second device over a second beam using the second component carrier during a second time interval that at least partially overlaps with the first time interval; receiving, at the first device, a response from the second device that is based at least in part on the first reference signal and the second reference signal; and configuring communications with the second device associated with the carrier aggregation configuration based at least in part on the response from the second device.

Aspect 53: The method of aspect 52, wherein receiving the response comprises: receiving a beam correlation metric from the second device that is based at least in part on the first reference signal over the first beam and the second reference signal over the second beam.

Aspect 54: The method of aspect 53, wherein configuring communications with the second device associated with the carrier aggregation configuration comprises: determining to perform the communications with the second device over the first beam using the first component carrier and over the second beam using the second component carrier according to the carrier aggregation configuration when the received beam correlation metric satisfies (e.g., is greater than or equal to) a threshold.

Aspect 55: The method of aspect 53, wherein configuring communications with the second device associated with the carrier aggregation configuration comprises: determining to refrain from the communications with the second device over the first beam using the first component carrier and over the second beam using the second component carrier according to the carrier aggregation configuration when the received beam correlation metric does not satisfy (e.g., is less than or equal to) a threshold.

Aspect 56: The method of aspect 53, wherein the beam correlation metric is based at least in part on an angle of separation between a first direction of peak received power at the second device of the first reference signal over the first beam and a second direction of peak received power at the second device of the second reference signal over the second beam.

Aspect 57: The method of aspect 53, wherein the beam correlation metric is based at least in part on a difference between a first digital beamforming entry or direction corresponding to a highest received power of the first reference signal at the second device and a second digital beamforming entry or direction corresponding to a highest received power of the second reference signal at the second device.

Aspect 58: The method of aspect 53, wherein the beam correlation metric is based at least in part on a comparison between a first analog beamforming codebook entry or direction corresponding to a highest received power of the first reference signal at the second device and a second analog beamforming codebook entry or direction corresponding to a highest received power.

Aspect 59: The method of aspect 53, wherein the beam correlation metric is based at least in part on a comparison between an analog beamforming codebook entry or direction corresponding to a highest received power of the first reference signal at the second device and a digital beamforming codebook entry or direction corresponding to a highest received power of the second reference signal at the second device.

Aspect 60: The method of 52, wherein: receiving the response comprises receiving an indication from the second device that the carrier aggregation configuration is supported by the second device over the first beam and the second beam; and configuring communications with the second device associated with the carrier aggregation configuration comprises determining to perform the communications with the second device according to the carrier aggregation configuration based at least in part on the indication that the carrier aggregation configuration is supported by the second device over the first beam and the second beam.

Aspect 61: The method of any one of aspects 52 through 60, wherein configuring communications with the second device associated with the carrier aggregation configuration comprises: configuring, at the first device, downlink communications with the second device according to the carrier aggregation configuration.

Aspect 62: The method of aspect 61, wherein: transmitting the first reference signal comprises transmitting a first CSI-RS over the first beam using the first component carrier; and transmitting the second reference signal comprises transmitting a second CSI-RS over the second beam using the second component carrier.

Aspect 63: The method of any one of aspects 52 through 62, wherein configuring communications with the second device associated with the carrier aggregation configuration comprises: configuring, at the first device, uplink communications with the second device according to the carrier aggregation configuration.

Aspect 64: The method of aspect 63, wherein: transmitting the first reference signal comprises: transmitting a first SRS over the first beam using the first component carrier; and transmitting the second reference signal comprises transmitting a second SRS over the second beam using the second component carrier.

Aspect 65: The method of any one of aspects 52 through 64, wherein: transmitting the first reference signal comprises transmitting the first reference signal during a first symbol duration; and transmitting the second reference signal comprises transmitting the second reference signal during a second symbol duration that is synchronized at the first device with the first symbol duration.

Aspect 66: The method of any one of aspects 52 through 65, wherein: transmitting the first reference signal comprises transmitting the first reference signal using a first RF chain; and transmitting the second reference signal comprises transmitting the second reference signal using a second RF chain that is different than the first RF chain.

Aspect 67: The method of any one of aspects 52 through 65, wherein: transmitting the first reference signal comprises transmitting the first reference signal using a first RF chain; and transmitting the first reference signal comprises transmitting the first reference signal using the first RF chain.

Aspect 68: The method of any one of aspects 52 through 67, wherein: transmitting the first reference signal comprises transmitting the first reference signal over a first millimeter wave band; and transmitting the second reference signal comprises transmitting the second reference signal over a second millimeter wave band that is non-overlapping with the first millimeter wave band.

Aspect 69: The method of any one of aspects 52 through 68, wherein: transmitting the first reference signal comprises transmitting the first reference signal using a first resource block; and transmitting the second reference signal comprises transmitting the second reference signal using a second resource block that is non-overlapping in the frequency domain with the first resource block.

Aspect 70: The method of any one of aspects 52 through 69, wherein the first component carrier and the second component carrier are in different frequency bands.

Aspect 71: The method of any one of aspects 52 through 69, wherein the first component carrier and the second component carrier are in the same frequency band.

Aspect 72: The method of any one of aspects 52 through 69, wherein the carrier aggregation configuration comprises an inter-band carrier aggregation configuration.

Aspect 73: The method of any one of aspects 52 through 69, wherein the carrier aggregation configuration comprises an intra-band carrier aggregation configuration.

Aspect 74: A method for wireless communication, comprising receiving, at a first device, a first reference signal from a second device over a first beam using a first component carrier during a first time interval; receiving, at the first device, a second reference signal from the second device over a second beam using a second component carrier during a second time interval that at least partially overlaps with the first time interval; determining, at the first device, a beam correlation metric that is based at least in part on receiving the first reference signal over the first beam and receiving the second reference signal over the second beam; transmitting a response to the second device based at least in part on determining the beam correlation metric; and configuring the first device for communications with the second device according to a carrier aggregation configuration based at least in part on transmitting the response to the second device.

Aspect 75: The method of aspect 74, wherein: transmitting the response comprises transmitting the determined beam correlation metric to the second device; and configuring the first device for communications with the second device according to the carrier aggregation configuration comprises receiving configuration information from the second device that is responsive to the transmitted beam correlation metric.

Aspect 76: The method of aspect 74 or 75, wherein determining the beam correlation metric comprises: determining the beam correlation metric based at least in part on an angle of separation between a first direction of peak received power at the first device of the first reference signal over the first beam and a second direction of peak received power at the first device of the second reference signal over the second beam.

Aspect 77: The method of aspect 74 or 75, wherein determining the beam correlation metric comprises: determining the beam correlation metric based at least in part on a difference between a first digital beamforming direction corresponding to a highest received power of the first reference signal at the first device and a second digital beamforming direction corresponding to a highest received power of the second reference signal at the first device.

Aspect 78: The method of aspect 74 or 75, wherein determining the beam correlation metric comprises: determining the beam correlation metric based at least in part on a comparison between a first analog beamforming codebook entry or direction corresponding to a highest received power of the first reference signal at the first device and a second analog beamforming codebook entry or direction corresponding to a highest received power of the second reference signal at the first device.

Aspect 79: The method of aspect 74 or 75, wherein determining the beam correlation metric comprises: determining the beam correlation metric based at least in part on a comparison between an analog beamforming codebook corresponding to a highest received power of the first reference signal at the first device and a digital beamforming direction corresponding to a highest received power of the second reference signal at the first device.

Aspect 80: The method of any one of aspects 74 through 79, further comprising: determining, at the first device, that the beam correlation metric satisfies (e.g., is greater than or equal to) a threshold, wherein transmitting the response comprises transmitting an indication that the beam correlation metric satisfies (e.g., is greater than or equal to) the threshold.

Aspect 81: The method of aspect 80, wherein transmitting the indication that the beam correlation metric satisfies the threshold comprises: transmitting an indication that the carrier aggregation configuration is supported by the first device over the first beam using the first component carrier and over the second beam using the second component carrier.

Aspect 82: The method of any one of aspects 74 through 79, further comprising determining, at the first device, that the beam correlation metric does not satisfy (e.g., is less than or equal to) a threshold, wherein transmitting the response comprises transmitting an indication that the beam correlation metric does not satisfy (e.g., is less than or equal to) the threshold.

Aspect 83: The method of aspect 82, wherein transmitting the indication that the beam correlation metric satisfies the threshold comprises: transmitting an indication to the second device to refrain from communication according to the carrier aggregation configuration over the first beam using the first component carrier and over the second beam using the second component carrier.

Aspect 84: The method of any one of aspects 74 through 83, wherein configuring the first device for communications with the second device according to the carrier aggregation configuration comprises: configuring the first device for downlink communications with the second device according to the carrier aggregation configuration.

Aspect 85: The method of 84, wherein: receiving the first reference signal comprises receiving a first CSI-RS over the first beam using the first component carrier; and receiving the second reference signal comprises receiving a second CSI-RS over the second beam using the second component carrier.

Aspect 86: The method of any one of aspects 74 through 83, wherein configuring the first device for communications with the second device according to the carrier aggregation configuration comprises: configuring the first device for uplink communications with the second device according to the carrier aggregation configuration.

Aspect 87: The method of aspect 86, wherein: receiving the first reference signal comprises receiving a first SRS over the first beam using the first component carrier receiving the second reference signal comprises receiving a second SRS over the second beam using the second component carrier.

Aspect 88: The method of any one of aspects 74 through 87, wherein: receiving the first reference signal comprises receiving the first reference signal during a first symbol duration; and receiving the second reference signal comprises receiving the second reference signal during a second symbol duration that is synchronized at the first device with the first symbol duration.

Aspect 89: The method of any one of aspects 74 through 88, wherein: receiving the first reference signal comprises receiving the first reference signal using a first RF chain; and receiving the second reference signal comprises receiving the second reference signal using a second RF chain that is different than the first RF chain.

Aspect 90: The method of any one of aspects 74 through 88, wherein: receiving the first reference signal comprises receiving the first reference signal using a first RF chain; and receiving the second reference signal comprises receiving the second reference signal using the first RF chain.

Aspect 91: The method of any one of aspects 74 through 90, wherein: receiving the first reference signal comprises receiving the first reference signal over a first millimeter wave band; and receiving the second reference signal comprises receiving the second reference signal over a second millimeter wave band that is non-overlapping with the first millimeter wave band.

Aspect 92: The method of any one of aspects 74 through 91, wherein: receiving the first reference signal comprises receiving the first reference signal using a first resource block; and receiving the second reference signal comprises receiving the second reference signal using a second resource block that is non-overlapping in the frequency domain with the first resource block.

Aspect 93: The method of any one of aspects 74 through 92, wherein the first component carrier and the second component carrier are in different frequency bands.

Aspect 94: The method of any one of aspects 74 through 92, wherein the first component carrier and the second component carrier are in the same frequency band.

Aspect 95: The method of any one of aspects 74 through 92, wherein the carrier aggregation configuration comprises an inter-band carrier aggregation configuration.

Aspect 96: The method of any one of aspects 74 through 92, wherein the carrier aggregation configuration comprises an intra-band carrier aggregation configuration.

Aspect 97: An apparatus for wireless communication comprising at least one means for performing a method of any one of aspects 52 through 73.

Aspect 98: An apparatus for wireless communication comprising a processor, memory in electronic communication with the processor, and instructions stored in the memory and executable by the processor to cause the apparatus to perform a method of any one of aspects 52 through 73.

Aspect 99: A non-transitory computer-readable medium storing code for wireless communication comprising a processor, memory in electronic communication with the processor, and instructions stored in the memory and executable by the processor to cause the apparatus to perform a method of any one of aspects 52 through 73.

Aspect 100: An apparatus for wireless communication comprising at least one means for performing a method of any one of aspects 74 through 96.

Aspect 101: An apparatus for wireless communication comprising a processor, memory in electronic communication with the processor, and instructions stored in the memory and executable by the processor to cause the apparatus to perform a method of any one of aspects 74 through 96.

Aspect 102: A non-transitory computer-readable medium storing code for wireless communication comprising a processor, memory in electronic communication with the processor, and instructions stored in the memory and executable by the processor to cause the apparatus to perform a method of any one of aspects 74 through 96.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
transmitting, based at least in part on a carrier aggregation configuration associated with a first component carrier and a second component carrier, a first reference signal to a second device over a first beam using the first component carrier during a first time interval;
transmitting, based at least in part on the carrier aggregation configuration, a second reference signal to the second device over a second beam using the second component carrier during a second time interval that at least partially overlaps with the first time interval;
receiving, at a first device, a response from the second device that is based at least in part on a beam correlation metric that is based at least in part on the first reference signal and the second reference signal; and transmitting signaling comprising parameters to enable carrier aggregation at the second device, the parameters associated with the carrier aggregation configuration based at least in part on the response from the second device.

2. The method of claim 1, the receiving comprising:
receiving the beam correlation metric from the second device that is based at least in part on the first reference signal over the first beam and the second reference signal over the second beam.

3. The method of claim 2, the transmitting signaling comprising the parameters to enable carrier aggregation comprising:
determining to perform communications with the second device over the first beam using the first component carrier and over the second beam using the second component carrier according to the carrier aggregation configuration when the received beam correlation metric satisfies a threshold.

4. The method of claim 2, the transmitting signaling comprising the parameters to enable carrier aggregation comprising:
determining to refrain from communications with the second device over the first beam using the first component carrier and over the second beam using the second component carrier according to the carrier aggregation configuration when the received beam correlation metric is less than or equal to a threshold.

5. The method of claim 2, wherein the beam correlation metric is based at least in part on an angle of separation between a first direction of peak received power at the second device of the first reference signal over the first beam and a second direction of peak received power at the second device of the second reference signal over the second beam.

6. The method of claim 2, wherein the beam correlation metric is based at least in part on a difference between a first digital beamforming direction corresponding to a highest received power of the first reference signal at the second device and a second digital beamforming direction corresponding to a highest received power of the second reference signal at the second device.

7. The method of claim 2, wherein the beam correlation metric is based at least in part on a comparison between a first analog beamforming codebook entry corresponding to a highest received power of the first reference signal at the second device and a second analog beamforming codebook entry corresponding to a highest received power of the second reference signal at the second device.

8. The method of claim 2, wherein the beam correlation metric is based at least in part on a comparison between an analog beamforming codebook corresponding to a highest received power of the first reference signal at the second device and a digital beamforming direction corresponding to a highest received power of the second reference signal at the second device.

9. The method of claim 1, wherein:
receiving the response comprises receiving an indication from the second device that the carrier aggregation configuration is supported by the second device over the first beam and the second beam; and
transmitting the signaling comprising the parameters to enable carrier aggregation at the second device associated with the carrier aggregation configuration comprises determining to perform communications with the second device according to the carrier aggregation configuration based at least in part on the indication that the carrier aggregation configuration is supported by the second device over the first beam and the second beam.

10. The method of claim 1, wherein:
transmitting the first reference signal comprises transmitting the first reference signal during a first symbol duration; and
transmitting the second reference signal comprises transmitting the second reference signal during a second symbol duration that is synchronized at the first device with the first symbol duration.

11. The method of claim 1, wherein:
transmitting the first reference signal comprises transmitting the first reference signal using a first radio frequency (RF) chain; and
transmitting the second reference signal comprises transmitting the second reference signal using a second RF chain that is different than the first RF chain.

12. The method of claim 1, wherein:
transmitting the first reference signal comprises transmitting the first reference signal using a first radio frequency (RF) chain; and
transmitting the second reference signal comprises transmitting the second reference signal using the first RF chain.

13. The method of claim 1, wherein:
transmitting the first reference signal comprises transmitting the first reference signal over a first millimeter wave band; and
transmitting the second reference signal comprises transmitting the second reference signal over a second millimeter wave band that is non-overlapping with the first millimeter wave band.

14. The method of claim 1, wherein:
transmitting the first reference signal comprises transmitting the first reference signal using a first resource block; and
transmitting the second reference signal comprises transmitting the second reference signal using a second resource block that is non-overlapping in a frequency domain with the first resource block.

15. The method of claim 1, wherein the beam correlation metric is based at least in part on a correlation of receive directions or beam weights for the first reference signal and the second reference signal.

16. A method for wireless communication, comprising:
receiving, at a first device, a first reference signal from a second device over a first beam using a first component carrier during a first time interval;
receiving, at the first device, a second reference signal from the second device over a second beam using a second component carrier during a second time interval that at least partially overlaps with the first time interval;
transmitting a response to the second device based at least in part on a beam correlation metric that is based at least in part on receiving the first reference signal over the first beam and receiving the second reference signal over the second beam; and
transmitting signaling comprising parameters to enable carrier aggregation at the first device to communicate with the second device according to carrier aggregation configuration parameters, transmitting the signaling being based at least in part on transmitting the response to the second device.

17. The method of claim 16, wherein:
transmitting the response comprises transmitting the beam correlation metric to the second device; and
transmitting the signaling comprising the parameters to enable carrier aggregation at the first device for communications with the second device according to the carrier aggregation configuration parameters is based at least in part on receiving configuration information from the second device that is responsive to the transmitted beam correlation metric.

18. The method of claim 17, further comprising:
determining the beam correlation metric based at least in part on an angle of separation between a first direction of peak received power at the first device of the first reference signal over the first beam and a second direction of peak received power at the first device of the second reference signal over the second beam.

19. The method of claim 17, further comprising:
determining the beam correlation metric based at least in part on a difference between a first digital beamforming direction corresponding to a highest received power of the first reference signal at the first device and a second digital beamforming direction corresponding to a highest received power of the second reference signal at the first device.

20. The method of claim 17, further comprising:
determining the beam correlation metric based at least in part on a comparison between a first analog beamforming codebook entry corresponding to a highest received power of the first reference signal at the first device and a second analog beamforming codebook entry corresponding to a highest received power of the second reference signal at the first device.

21. The method of claim 17, further comprising:
determining the beam correlation metric based at least in part on a comparison between an analog beamforming codebook corresponding to a highest received power of the first reference signal at the first device and a digital beamforming direction corresponding to a highest received power of the second reference signal at the first device.

22. The method of claim 16, further comprising:
determining, at the first device, that the beam correlation metric satisfies a threshold, wherein transmitting the response comprises transmitting an indication that the beam correlation metric satisfies the threshold.

23. The method of claim 22, the transmitting the indication that the beam correlation metric satisfies the threshold comprising:
transmitting an indication that the carrier aggregation configuration parameters are supported by the first device over the first beam using the first component carrier and over the second beam using the second component carrier.

24. The method of claim 16, further comprising:
determining, at the first device, that the beam correlation metric is less than or equal to a threshold, wherein transmitting the response comprises transmitting an indication that the beam correlation metric is less than or equal to the threshold.

25. The method of claim 23, the transmitting the indication that the beam correlation metric satisfies the threshold comprising:
transmitting an indication to the second device to refrain from communication according to the carrier aggregation configuration parameters over the first beam using the first component carrier and over the second beam using the second component carrier.

26. The method of claim 16, wherein:
receiving the first reference signal comprises receiving the first reference signal during a first symbol duration; and
receiving the second reference signal comprises receiving the second reference signal during a second symbol duration that is synchronized at the first device with the first symbol duration.

27. The method of claim 16, wherein:
receiving the first reference signal comprises receiving the first reference signal using a first radio frequency (RF) chain; and
receiving the second reference signal comprises receiving the second reference signal using a second RF chain that is different than the first RF chain.

28. The method of claim 16, wherein:
receiving the first reference signal comprises receiving the first reference signal using a first radio frequency (RF) chain; and
receiving the second reference signal comprises receiving the second reference signal using the first RF chain.

29. The method of claim 16, wherein:
receiving the first reference signal comprises receiving the first reference signal over a first millimeter wave band; and
receiving the second reference signal comprises receiving the second reference signal over a second millimeter wave band that is non-overlapping with the first millimeter wave band.

30. The method of claim 16, wherein the beam correlation metric is based at least in part on a correlation of receive directions or beam weights for the first reference signal and the second reference signal.

31. An apparatus for wireless communication, comprising:
one or more memories; and
one or more processors coupled with the one or more memories, the one or more processors configured to cause the apparatus to:
transmit, based at least in part on a carrier aggregation configuration associated with a first component carrier and a second component carrier, a first reference signal to a second device over a first beam using the first component carrier during a first time interval;
transmit, based at least in part on the carrier aggregation configuration, a second reference signal to the second device over a second beam using the second component carrier during a second time interval that at least partially overlaps with the first time interval;
receive, at a first device, a response from the second device that is based at least in part on a beam correlation metric that is based at least in part on the first reference signal and the second reference signal; and
transmit signaling comprising parameters to enable carrier aggregation at the second device, the parameters associated with the carrier aggregation configuration based at least in part on the response from the second device.

32. The apparatus of claim 31, wherein, to receive, the one or more processors are configured to cause the apparatus to:
receive the beam correlation metric from the second device that is based at least in part on the first reference signal over the first beam and the second reference signal over the second beam.

33. The apparatus of claim 32, wherein, to transmit signaling comprising the parameters to enable carrier aggregation, the one or more processors are configured to cause the apparatus to:
determine to perform communications with the second device over the first beam using the first component carrier and over the second beam using the second component carrier according to the carrier aggregation configuration when the received beam correlation metric satisfies a threshold.

34. The apparatus of claim 32, wherein, to transmit signaling comprising the parameters to enable carrier aggregation, the one or more processors are configured to cause the apparatus to:
determine to refrain from communications with the second device over the first beam using the first component carrier and over the second beam using the second component carrier according to the carrier aggregation configuration when the received beam correlation metric is less than or equal to a threshold.

35. The apparatus of claim 31, wherein the beam correlation metric is based at least in part on a correlation of receive directions or beam weights for the first reference signal and the second reference signal.

36. An apparatus for wireless communication, comprising:
one or more memories; and
one or more processors coupled with the one or more memories, the one or more processors configured to cause the apparatus to:
receive, at a first device, a first reference signal from a second device over a first beam using a first component carrier during a first time interval;
receive, at the first device, a second reference signal from the second device over a second beam using a second component carrier during a second time interval that at least partially overlaps with the first time interval;
transmit a response to the second device based at least in part on a beam correlation metric that is based at least in part on the receipt of the first reference signal over the first beam and the receipt of the second reference signal over the second beam; and
transmit signaling comprising parameters to enable carrier aggregation at the first device to communicate with the second device according to carrier aggregation configuration parameters, the transmission of the signaling based at least in part on the transmission of the response to the second device.

37. The apparatus of claim 36, wherein the one or more processors are configured to cause the apparatus to:
transmit the beam correlation metric to the second device; and
receive configuration information from the second device that is responsive to the transmitted beam correlation metric.

38. The apparatus of claim 36, wherein the beam correlation metric is based at least in part on a correlation of receive directions or beam weights for the first reference signal and the second reference signal.

39. A non-transitory computer-readable medium storing code for wireless communication, the code comprising instructions executable by one or more processors to:
transmit, based at least in part on a carrier aggregation configuration associated with a first component carrier and a second component carrier, a first reference signal to a second device over a first beam using the first component carrier during a first time interval;

transmit, based at least in part on the carrier aggregation configuration, a second reference signal to the second device over a second beam using the second component carrier during a second time interval that at least partially overlaps with the first time interval;

receive, at a first device, a response from the second device that is based at least in part on a beam correlation metric that is based at least in part on the first reference signal and the second reference signal; and transmit signaling comprising parameters to enable carrier aggregation at the second device, the parameters associated with the carrier aggregation configuration based at least in part on the response from the second device.

40. The non-transitory computer-readable medium of claim 35, wherein, to receive the response, the instructions are executable by the one or more processors to:

receive the beam correlation metric from the second device that is based at least in part on the first reference signal over the first beam and the second reference signal over the second beam.

41. The non-transitory computer-readable medium of claim 36, wherein, to transmit signaling comprising the parameters to enable carrier aggregation, the instructions are executable by the one or more processors to:

determine to perform communications with the second device over the first beam using the first component carrier and over the second beam using the second component carrier according to the carrier aggregation configuration when the received beam correlation metric satisfies a threshold.

42. The non-transitory computer-readable medium of claim 36, wherein, to transmit signaling comprising the parameters to enable carrier aggregation, the instructions are executable by the one or more processors are configured to:

determine to refrain from communications with the second device over the first beam using the first component carrier and over the second beam using the second component carrier according to the carrier aggregation configuration when the received beam correlation metric is less than or equal to a threshold.

43. The non-transitory computer-readable medium of claim 35, wherein the beam correlation metric is based at least in part on a correlation of receive directions or beam weights for the first reference signal and the second reference signal.

44. A non-transitory computer-readable medium storing code for wireless communication, the code comprising instructions executable by one or more processors to:

receive, at a first device, a first reference signal from a second device over a first beam using a first component carrier during a first time interval;

receive, at the first device, a second reference signal from the second device over a second beam using a second component carrier during a second time interval that at least partially overlaps with the first time interval;

transmit a response to the second device based at least in part on a beam correlation metric that is based at least in part on receiving the first reference signal over the first beam and receiving the second reference signal over the second beam; and transmit signaling comprising parameters to enable carrier aggregation at the first device to communicate with the second device according to carrier aggregation configuration parameters, transmitting the signaling being based at least in part on transmitting the response to the second device.

45. The non-transitory computer-readable medium of claim 39, wherein:

to transmit the response, the instructions are executable by the one or more processors to transmit the beam correlation metric to the second device; and to transmit the signaling comprising the parameters to enable carrier aggregation at the first device for communications with the second device according to the carrier aggregation configuration parameters, the instructions are executable by the one or more processors to receive configuration information from the second device that is responsive to the transmitted beam correlation metric.

46. The non-transitory computer-readable medium of claim 39, wherein the beam correlation metric is based at least in part on a correlation of receive directions or beam weights for the first reference signal and the second reference signal.

47. An apparatus for wireless communication, comprising:

means for transmitting, based at least in part on a carrier aggregation configuration associated with a first component carrier and a second component carrier, a first reference signal to a second device over a first beam using the first component carrier during a first time interval;

means for transmitting, based at least in part on the carrier aggregation configuration, a second reference signal to the second device over a second beam using the second component carrier during a second time interval that at least partially overlaps with the first time interval;

means for receiving, at a first device, a response from the second device that is based at least in part on a beam correlation metric that is based at least in part on the first reference signal and the second reference signal; and means for transmitting signaling comprising parameters to enable carrier aggregation at the second device, the parameters associated with the carrier aggregation configuration based at least in part on the response from the second device.

48. The apparatus of claim 47, the means for receiving comprising:

means for receiving the beam correlation metric from the second device that is based at least in part on the first reference signal over the first beam and the second reference signal over the second beam.

49. The apparatus of claim 48, the means for transmitting signaling comprising the parameters to enable carrier aggregation comprising:

means for determining to perform communications with the second device over the first beam using the first component carrier and over the second beam using the second component carrier according to the carrier aggregation configuration when the received beam correlation metric satisfies a threshold.

50. The apparatus of claim 48, the means for transmitting signaling comprising the parameters to enable carrier aggregation comprising:

means for determining to refrain from communications with the second device over the first beam using the first component carrier and over the second beam using the second component carrier according to the carrier aggregation configuration when the received beam correlation metric is less than or equal to a threshold.

51. The apparatus of claim 47, wherein the beam correlation metric is based at least in part on a correlation of receive directions or beam weights for the first reference signal and the second reference signal.

52. An apparatus for wireless communication, comprising:

means for receiving, at a first device, a first reference signal from a second device over a first beam using a first component carrier during a first time interval;

means for receiving, at the first device, a second reference signal from the second device over a second beam using a second component carrier during a second time interval that at least partially overlaps with the first time interval;

means for transmitting a response to the second device based at least in part on a beam correlation metric that is based at least in part on the receipt of the first reference signal over the first beam and the receipt of the second reference signal over the second beam; and means for transmitting signaling comprising parameters to enable carrier aggregation at the first device to communicate with the second device according to carrier aggregation configuration parameters, the transmission of the signaling being based at least in part on the transmission of the response to the second device.

53. The apparatus of claim 52, wherein:

the means for transmitting the response comprises means for transmitting the beam correlation metric to the second device; and wherein the apparatus further comprises:

means for receiving configuration information from the second device that is responsive to the transmitted beam correlation metric.

54. The apparatus of claim 52, wherein the beam correlation metric is based at least in part on a correlation of receive directions or beam weights for the first reference signal and the second reference signal.

\* \* \* \* \*